(12) United States Patent
Ishida et al.

(10) Patent No.: US 10,886,869 B2
(45) Date of Patent: Jan. 5, 2021

(54) CONTROL APPARATUS AND VEHICLE DRIVE SYSTEM

(71) Applicant: DENSO CORPORATION, Kariya (JP)

(72) Inventors: Minoru Ishida, Kariya (JP); Naoki Katayama, Kariya (JP); Tsubasa Sakuishi, Kariya (JP); Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/532,661

(22) Filed: Aug. 6, 2019

(65) Prior Publication Data

US 2020/0052639 A1 Feb. 13, 2020

(30) Foreign Application Priority Data

Aug. 8, 2018 (JP) .................. 2018-149747

(51) Int. Cl.
| | |
|---|---|
| *H02P 29/00* | (2016.01) |
| *B60L 15/20* | (2006.01) |
| *H02K 7/00* | (2006.01) |
| *B60W 10/04* | (2006.01) |

(52) U.S. Cl.
CPC .......... *H02P 29/0016* (2013.01); *B60L 15/20* (2013.01); *B60W 10/04* (2013.01); *H02K 7/006* (2013.01); *B60W 2720/28* (2013.01)

(58) Field of Classification Search
CPC ...... H02P 29/0016; B60L 15/20; H02K 7/006
USPC ........................................... 318/9, 34
See application file for complete search history.

(56) References Cited

U.S. PATENT DOCUMENTS

| | | | | |
|---|---|---|---|---|
| 6,507,991 | B1* | 1/2003 | Ozawa | H02K 1/12 29/596 |
| 8,362,669 | B2* | 1/2013 | Suzuki | H02K 15/0471 310/184 |
| 9,013,083 | B2* | 4/2015 | Morita | H02K 1/146 310/156.78 |
| 10,135,374 | B2* | 11/2018 | Shimizu | H02P 21/18 |
| 2013/0073162 | A1 | 3/2013 | Kim | |

FOREIGN PATENT DOCUMENTS

| | | |
|---|---|---|
| WO | 2019/017496 A1 | 1/2019 |
| WO | 2019/026979 A1 | 2/2019 |

* cited by examiner

*Primary Examiner* — David Luo
(74) *Attorney, Agent, or Firm* — Oliff PLC

(57) ABSTRACT

A control apparatus is applied to a vehicle including (i) a rotating electrical machine and (ii) a wheel speed sensor detecting a wheel speed. The control apparatus sets a rotation angle of the rotating electrical machine based on an estimated value of the rotation angle which is estimated based on a detection value of the wheel speed sensor.

14 Claims, 39 Drawing Sheets

COMPARATIVE

| | α |
|---|---|
| STEERING ANGLE < THRESHOLD | α0 |
| STEERING ANGLE ≥ THRESHOLD | α1 (>α0) |

CONTROL APPARATUS AND VEHICLE DRIVE SYSTEM

CROSS REFERENCE RELATED APPLICATION

The present application claims the benefit of priority from Japanese Patent Application No. 2018-149747 filed on Aug. 8, 2018. The entire disclosure of the above application is incorporated herein by reference.

TECHNICAL FIELD

The present disclosure relates to a control apparatus and a vehicle drive system.

BACKGROUND

There is a technique which uses a resolver of a drive motor for vehicle traveling so as to detect a wheel speed of the vehicle, in place of a wheel speed sensor. This technique is provided with a speed reducer between the wheel and the drive motor in order to obtain the output torque required by the vehicle. The technique estimates the wheel speed by multiplying the rotation speed of the drive motor, which is detected by the resolver, by the reduction ratio due to the speed reducer.

SUMMARY

According to an embodiment of the present disclosure, a control apparatus is provided as follows. The control apparatus is applied to a vehicle including (i) a rotating electrical machine and (ii) a wheel speed sensor detecting a wheel speed. The control apparatus sets a rotation angle of the rotating electrical machine based on an estimated value of the rotation angle which is estimated based on a detection value of the wheel speed sensor.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Figure 1:
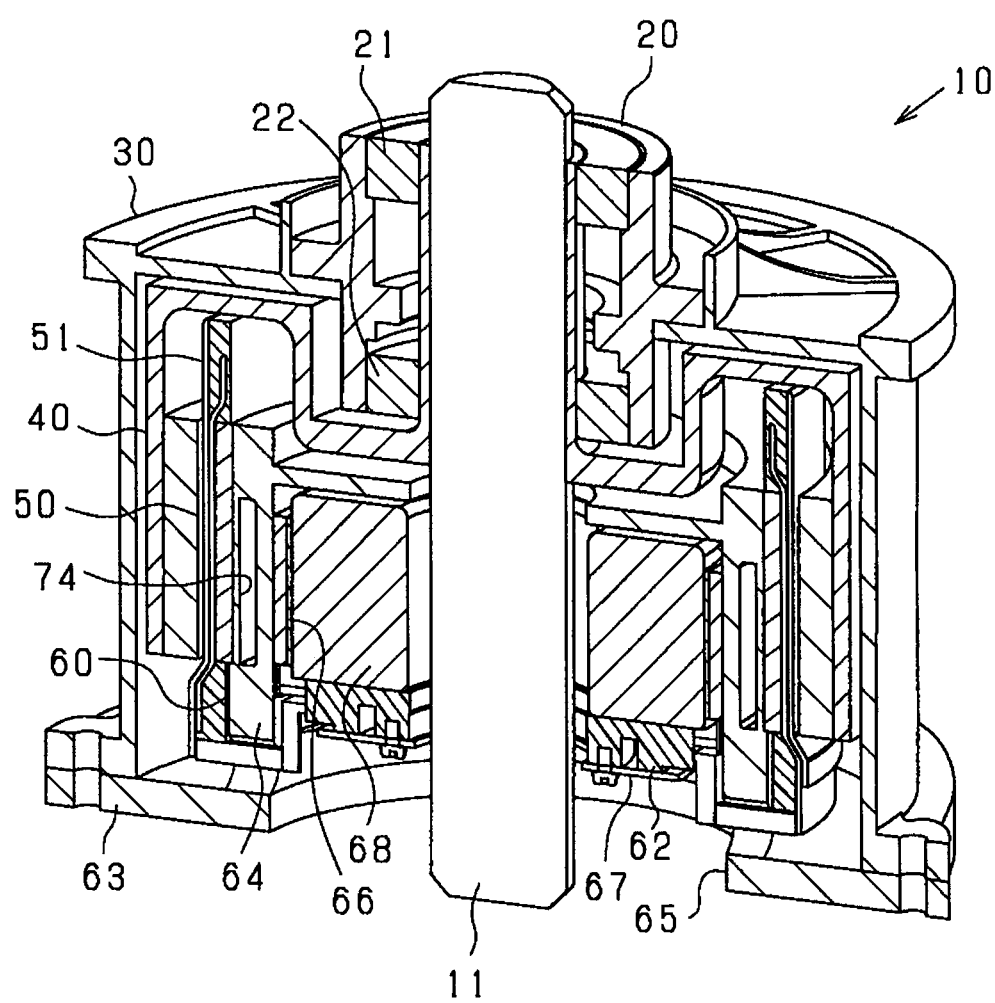
FIG. 1 is a longitudinal sectional perspective view of a rotating electrical machine according to a first embodiment.

Hereinafter, embodiments will be described with reference to the drawings. In the following respective embodiments, parts that are the same as or equivalent to each other are denoted by the same reference signs in the drawings, and a description of the parts denoted by the same reference signs is referred to.

First Embodiment

A rotating electrical machine according to a first embodiment is used, for example, as a vehicle power source, that is, a drive source for vehicle traveling. Note that the rotating electrical machine can be widely used for industrial use, for vehicles, for home appliances, for OA (Office Automation) equipment, for game machines and the like.

(Schematic Configuration of Rotating Electrical Machine)

Figure 2:
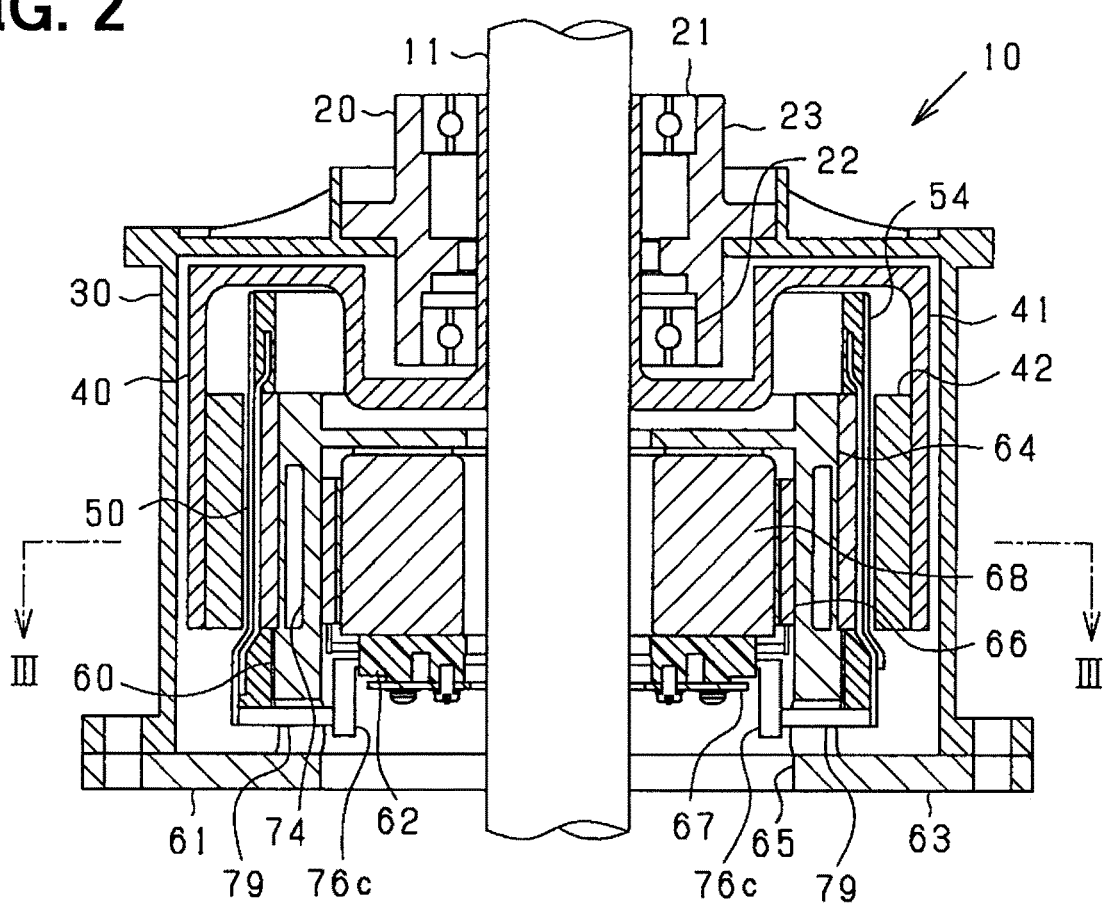
FIG. 2 is a longitudinal sectional view of a rotating electrical machine.
Figure 3:
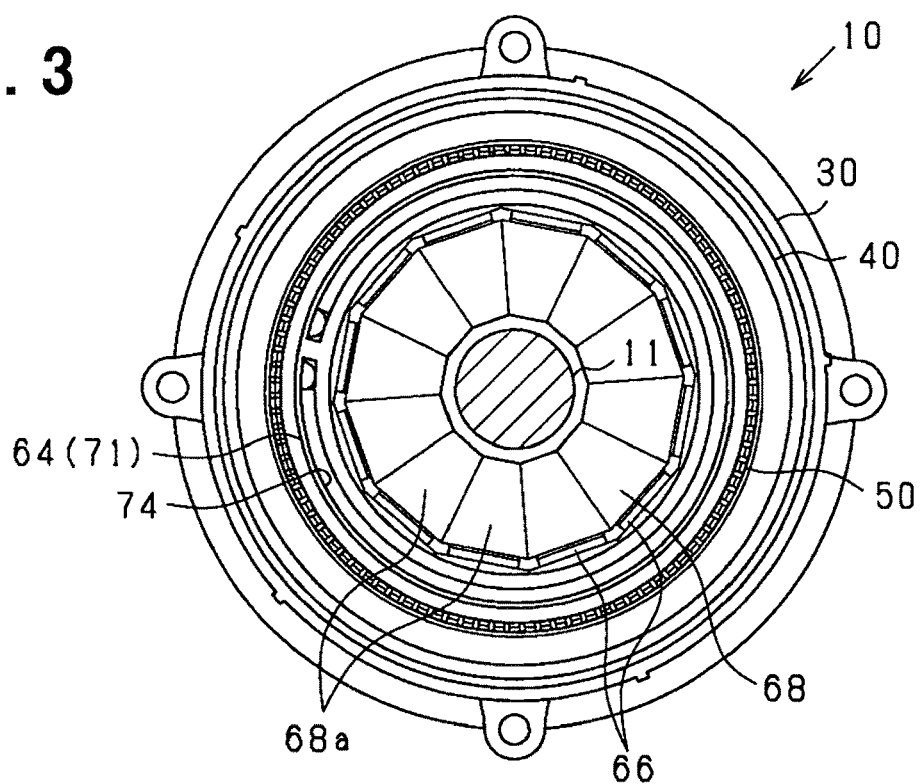
FIG. 3 is a sectional view taken along line in FIG. 2.
Figure 4:
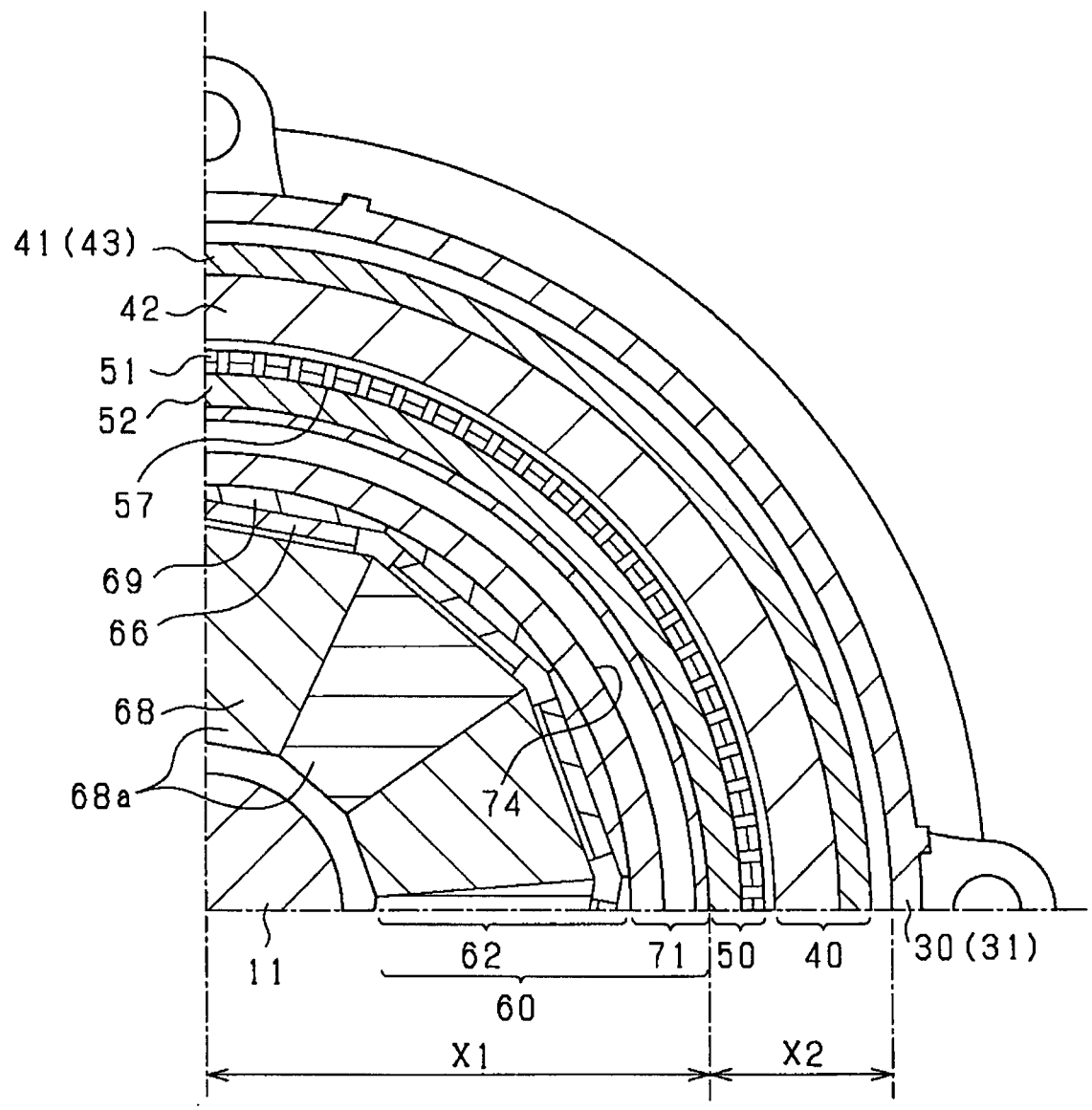
FIG. 4 is an enlarged sectional view showing a part of FIG. 3.
Figure 5:
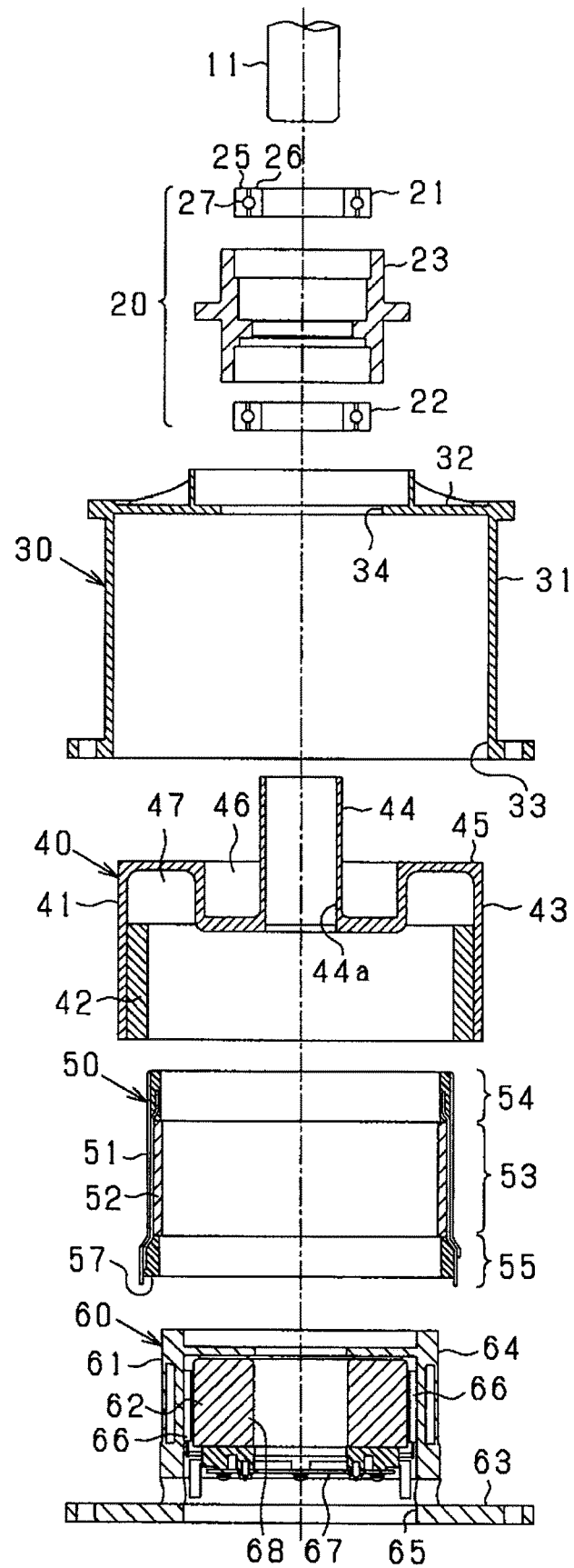
FIG. 5 is an exploded view of a rotating electrical machine.

The schematic configuration of the rotating electrical machine 10 will be described based on FIGS. 1 to 5. The rotating electrical machine 10 may be also referred to as a dynamo-electric machine. FIG. 1 is a longitudinal sectional perspective view of a rotating electrical machine 10. FIG. 2 is a longitudinal sectional view in the direction along the rotating shaft 11 of the rotating electrical machine 10. FIG. 3 is a transverse sectional view of the rotating electrical machine 10 in a direction orthogonal to the rotating shaft 11 (a sectional view along the line Ill-Ill in FIG. 2). FIG. 4 is an enlarged sectional view showing a part of FIG. 3. FIG. 5 is an exploded view of the rotating electrical machine 10. In FIG. 3, for convenience of illustration, hatching indicating a cut surface is omitted except for the rotating shaft 11. In the following description, the direction in which the rotating shaft 11 extends is taken as an axial direction, the direction extending radially from the center of the rotating shaft 11 is taken as a radial direction, and the direction extending circumferentially around the rotating shaft 11 is taken as a circumferential direction.

The rotating electrical machine 10 of the present embodiment is a synchronous multiphase AC motor, with an outer rotor structure (i.e., an outer rotation structure). The rotating electrical machine 10 includes a bearing unit 20, a housing 30, a rotor 40, a stator 50, and an inverter unit 60. Each of these elements is disposed coaxially with the rotating shaft 11, and is assembled in the axial direction in a predetermined order to configure the rotating electrical machine 10.

The bearing unit 20 includes (i) two bearings 21 and 22 which are arranged to be separated from each other in the axial direction, and (ii) a holding member 23 for holding the bearings 21 and 22. The bearings 21 and 22 are, for example, radial ball bearings, and each have an outer ring 25, an inner ring 26, and a plurality of balls 27 disposed between the outer ring 25 and the inner ring 26. The holding member 23 has a cylindrical shape; the bearings 21 and 22 are assembled to be radially inside the holding member 23 (i.e., to be inside the holding member 23 in the radial direction). The rotating shaft 11 and the rotor 40 are rotatably supported to be radially inside the bearings 21 and 22.

The housing 30 includes (i) a cylindrical peripheral wall portion 31 and (ii) an end surface portion 32 provided in one axial end side of both the axial end sides of the peripheral wall portion 31. In the other axial end side, an opening 33 is provided to be opposite the end surface portion 32. The housing 30 is thus configured such that the other axial end side opposite the end surface portion 32 is fully opened by the opening 33. The end surface portion 32 includes a circular hole 34 in the center thereof. The bearing unit 20 is inserted into the circular hole 34 to be fixed by a fixing tool such as a screw or a rivet.

The rotor 40 and the stator 50 are accommodated in the housing 30, that is, in the internal space defined by the peripheral wall portion 31 and the end surface portion 32. In the present embodiment, the rotating electrical machine 10 is of an outer rotor type; namely, in the housing 30, the stator 50 is disposed to be radially inside the cylindrical rotor 40. The rotor 40 is cantilevered, in the axial direction, on the rotating shaft 11 on the side where the end surface portion 32 is disposed.

The rotor 40 includes (i) a rotor main body 41 formed in a hollow cylindrical shape and (ii) an annular magnet unit 42 provided to be radially inside the rotor main body 41. The rotor main body 41 has a substantially cup shape, and has a function as a magnet holding member. The rotor main body 41 includes (i) a cylindrical magnet holding portion 43, (ii) a fixing portion 44 which is similarly cylindrical and smaller in diameter than the magnet holding portion 43; and (iii) an intermediate portion 45 serving as a portion connecting the magnet holding portion 43 and the fixing portion 44. The magnet unit 42 is attached to the inner peripheral surface of the magnet holding portion 43.

The rotating shaft 11 is inserted into a through hole 44a of the fixing portion 44; in such an inserted state, the fixing portion 44 is fixed to the rotating shaft 11. That is, the rotor main body 41 is fixed to the rotating shaft 11 by the fixing portion 44. The fixing portion 44 may be fixed to the rotating shaft 11 by spline connection using an unevenness, key connection, welding, caulking, or the like. Thus, the rotor 40 rotates integrally with the rotating shaft 11.

The bearings 21 and 22 of the bearing unit 20 are assembled on the radially outer side of the fixing portion 44. As described above, since the bearing unit 20 is fixed to the end surface portion 32 of the housing 30, the rotating shaft 11 and the rotor 40 are rotatably supported by the housing 30. Thereby, the rotor 40 is rotatable in the housing 30.

The fixing portion 44 is provided on only one axial end side of the rotor 40 of both axial end sides (in the axial direction); thereby the rotor 40 is supported in a cantilever manner on the rotating shaft 11. Here, the fixing portion 44 of the rotor 40 is rotatably supported by the bearings 21 and 22 of the bearing unit 20 at two different positions in the axial direction. That is, the rotor 40 is rotatably supported by the bearings 21 and 22 at two different axial positions on one axial end side of both the axial end sides of the rotor main body 41. Therefore, the stable rotation of the rotor 40 is realized even though the rotor 40 is supported by the rotating shaft 11 in a cantilever manner. In this case, the rotor 40 is supported by the bearings 21 and 22 at the positions shifted to one side (i.e., upper side in FIG. 5) from the center position of the rotor 40 in the axial direction.

Further, in the bearing unit 20, the bearing 22 (upper side in FIG. 5) near the center of the rotor 40 and the bearing 21 (lower side in FIG. 5) disposed upper than the bearing 22 are different in the dimension of the gap between (i) the outer ring 25 and the inner ring 26 and (ii) the balls 27. For example, the dimension of the gap of the bearing 22 is larger than that of the bearing 21. In this case, even if the vibration due to swing of the rotor 40 or imbalance due to component tolerance acts on the bearing unit 20 on the side near the center of the rotor 40, the influence of the swing or vibration is well absorbed.

Specifically, by causing the size of a play portion (the gap size) in the bearing 22 to be larger by preload, the vibration generated in the cantilever structure is absorbed by such a play portion. The preload may be a home position preload, or may be applied by inserting a preload spring, a wave washer, or the like in a step on the axially outer side (upper side in FIG. 5) of the bearing 22.

The intermediate portion 45 includes, in the radial direction, a radially inner side and a radially outer side; the intermediate portion 45 includes a step between the radially inner side and the radially outer side (i.e., a step elevated from the radially inner side to the radially outer side). In the intermediate portion 45, the radially inner side and the radially outer side have a difference (axial positional difference) in position in the axial direction; thereby, the magnet holding portion 43 and the fixing portion 44 partially overlap when viewed from the radial direction by the axial positional difference. That is, the magnet holding portion 43 protrudes outward in the axial direction from the base end portion (the lower end portion in FIG. 5) of the fixing portion 44. In this configuration, it is possible for the rotating shaft 11 to support the rotor 40 at a position near the center of gravity of the rotor 40 as compared with the case where the intermediate portion 45 is provided in a flat plate shape without a step. A stable operation of the rotor 40 can be thus realized.

Due to the configuration of the intermediate portion 45 described above, the rotor 40 is provided with a bearing receiving recess 46 and a coil receiving recess 47. The bearing receiving recess 46 is annularly formed above the radially inner side of the intermediate portion 45 so as to surround the fixing portion 44 for receiving a portion of the bearing unit 20. The coil receiving recess 47 is annually formed below the radially outer side of the intermediate portion 45 so as to surround the bearing receiving recess 46 for receiving the coil end portion 54 of the stator winding 51 of the stator 50 described later. These receiving recesses 46 and 47 are arranged to adjoin each other on the radially inner side and the radially outer side, respectively. That is, a part of the bearing unit 20 and the coil end portion 54 of the stator winding 51 are arranged, respectively, on the radially inner side and the radially outer side to be overlapped with each other when viewed from the radial direction. This can shorten the axial dimension of the rotating electrical machine 10.

The coil end portion 54 can be bent radially inward or outward; thus, the axial dimension of the coil end portion 54 can be reduced, and the axial length of the stator 50 can be shortened. The bending direction of the coil end portion 54 may be determined depending on the assembly with the rotor 40. Assuming that the stator 50 is assembled to be radially inside the rotor 40 and thus inserted into the rotor 40, the inserted tip side of the coil end portion 54 may be bent radially inward to distance the rotor 40. Although the bending direction on the opposite side may be arbitrary, it is preferable in terms of manufacture to bend towards the radially outer side having a space.

The magnet unit 42 is configured by a plurality of magnets arranged to be radially inside the magnet holding portion 43 so that the magnetic poles alternate along the circumferential direction. Details of the magnet unit 42 will be described later.

The stator 50 is provided to be arranged radially inside the rotor 40. The stator 50 includes (i) a stator winding 51 wound in a substantially cylindrical shape, and (ii) a stator core 52 disposed radially inside the stator winding 51. The stator winding 51 is disposed to face the annular magnet unit 42 with a predetermined air gap therebetween. The stator winding 51 is composed of a plurality of phase windings. Each phase winding is configured by connecting a plurality of conductors arranged in the circumferential direction with a predetermined pitch. The present embodiment employs U-phase, V-phase, and W-phase three-phase windings and (ii) X-phase, Y-phase, and Z-phase three-phase windings; by employing these two three-phase windings, the stator winding 51 is configured as a six-phase winding.

The stator core 52 is formed in an annular shape by a laminated steel plate made of a soft magnetic material and is assembled radially inside the stator winding 51.

The stator winding 51 includes (i) a coil side portion 53 and (ii) coil end portions 54 and 55. The coil side portion 53 is radially outside the stator core 52 and is a portion overlapping the stator core 52 when viewed from the radial direction. The coil side portion 53 faces the stator core 52 in the radial direction from an outer side; in contrast, the coil side portion 53 faces the magnet unit 42 of the rotor 40 in the radial direction from an inner side. The coil end portions 54 and 55 are provided to project, respectively, upward and downward (in FIG. 5) from the coil side portion 53 (i.e., to project, respectively, upward and downward from one end side and the other end side of the stator core 52 in the axial direction). Of the coil end portions 54, 55 on both (axial) end sides in the axial direction, the coil end portion 54 is on the side of the bearing unit 20 (the upper side in FIG. 5). In a state where the stator 50 is disposed inside the rotor 40, the coil end portion 54 is accommodated in the coil receiving recess 47 formed by the rotor main body 41. Details of the stator 50 will be described later.

The inverter unit 60 includes (i) a unit base 61 fixed to the housing 30 by a fastener such as a bolt, and (ii) an electrical component 62 assembled to the unit base 61. The unit base 61 includes (i) an end plate portion 63 fixed to an end of the housing 30 on the opening 33 side, and (ii) a casing portion 64 integrally provided on the end plate portion 63 and extending axially upward from the end plate portion 63. The end plate portion 63 has a circular opening 65 at its central portion; the casing portion 64 is formed to stand up from the peripheral edge of the opening 65.

The stator 50 is attached to the outer peripheral surface of the casing portion 64. That is, the outer diameter dimension of the casing portion 64 is equal to or slightly less than the inner diameter dimension of the stator core 52. The stator core 52 is assembled to the outside of the casing portion 64; thereby the stator 50 and the unit base 61 are integrated with each other. In addition, when the unit base 61 is fixed to the housing 30, the stator 50 is integrated with the housing 30 in the state where the stator core 52 is assembled to the casing portion 64.

A space radially inside the casing portion 64 is a housing space for housing the electrical component 62; the electrical component 62 is disposed in the housing space so as to surround the rotating shaft 11. The casing portion 64 has a role as a portion forming a housing space. The electrical component 62 includes (i) a semiconductor module 66 constituting an inverter circuit, (ii) a control board 67, and (iii) a capacitor module 68.

(Details of Inverter Unit)

Figure 6:
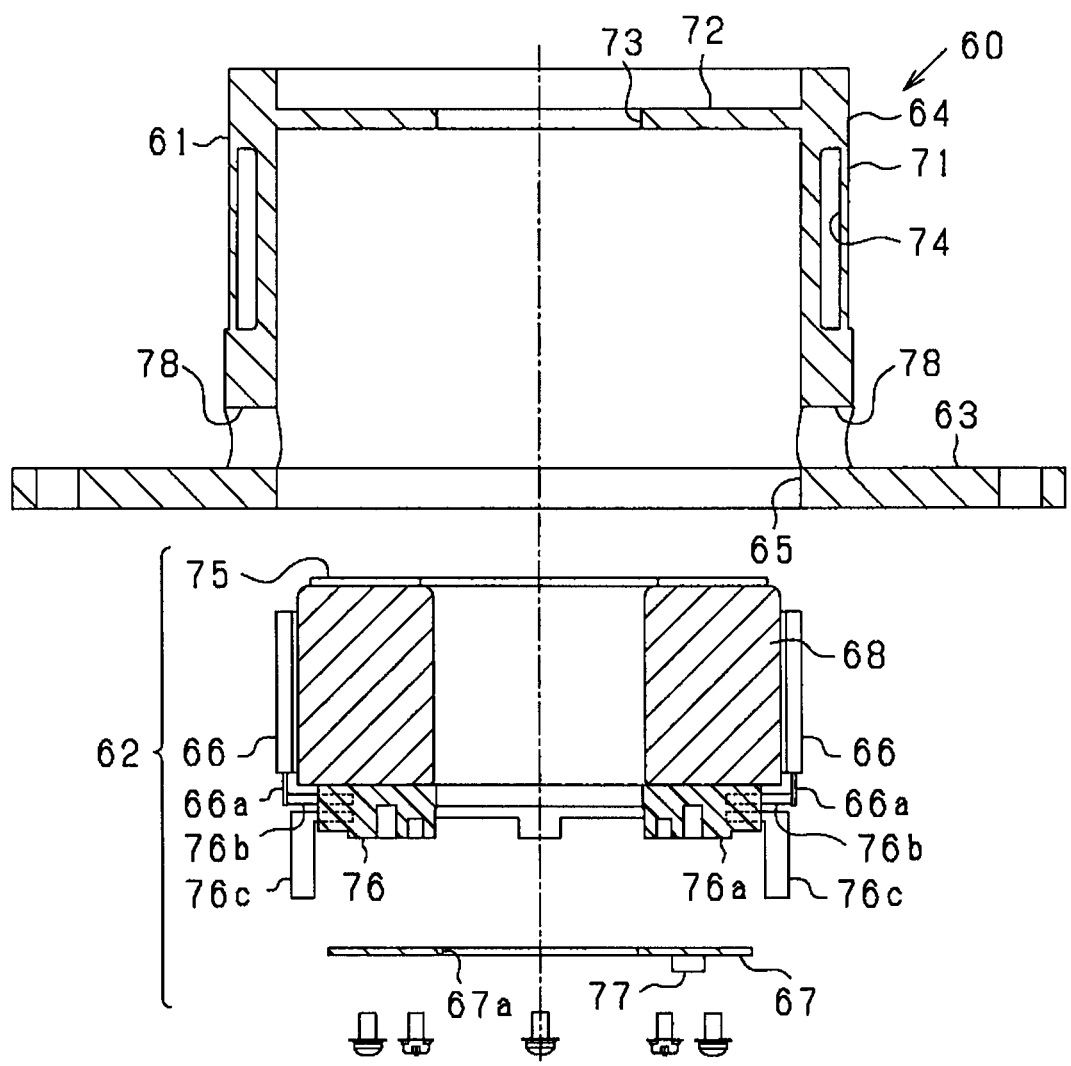
FIG. 6 is an exploded view of an inverter unit.

The configuration of the inverter unit 60 will be further described based on FIGS. 1 to 6. FIG. 6 is an exploded view of the inverter unit 60.

In the unit base 61, the casing portion 64 includes (i) a cylindrical portion 71 and (ii) an end surface portion 72 provided on one of both axial end sides of the cylindrical portion 71 (i.e., the one of both axial end sides being the side facing toward the bearing unit 20). Of both axial end sides, the other one opposite the end surface portion 72 is entirely open through the opening 65 of the end plate portion 63. A circular hole 73 is formed at the center of the end surface portion 72; the rotating shaft 11 can be inserted through the hole 73.

The cylindrical portion 71 of the casing portion 64 serves as a partition portion that divides between (i) the rotor 40 and the stator 50 which are disposed radially outside and (ii) the electrical component 62 disposed radially inside. Here, (i) the rotor 40 and the stator 50 and (ii) the electrical component 62 are, respectively, arranged on a radially outer side and a radially inner side of the cylindrical portion 71; namely, the cylindrical portion 71 is interposed between (i) the rotor 40 and the stator 50 and (ii) the electrical component 62, when viewed from the radial direction.

The electrical component 62 is an electrical component included in an inverter circuit. The electrical component 62 includes (i) a power running function and (ii) an electric-power generating function. The power running function is to rotate the rotor 40 by supplying current in a predetermined order to each phase winding of the stator winding 51. The an electric-power generating function is to (i) input a three-phase alternating current flowing in the stator winding 51 as the rotating shaft 11 rotates and (ii) output the generated electric power to the outside. The electrical component 62 may have only either the power running function or the electric-power generating function. For example, when the rotating electrical machine 10 is used as a vehicle power source, the electric-power generating function is a regenerative function that outputs the power as regenerative power to the outside.

The electrical component 62 includes (i) a hollow cylindrical capacitor module 68 provided around the rotating shaft 11, and (ii) a plurality of semiconductor modules 66 arranged side by side circumferentially on the outer peripheral surface of the capacitor module 68. The capacitor module 68 includes a plurality of smoothing capacitors 68a connected in parallel with one another. Specifically, the capacitor 68a is a laminated film capacitor formed by laminating a plurality of film capacitors, and has a trapezoidal transverse section. The capacitor module 68 is configured by arranging twelve capacitors 68a in a ring shape.

In the manufacturing process of the capacitor 68a, for example, a long film of a predetermined width formed by laminating a plurality of films is used. A capacitor element is produced by cutting a long film into an equal leg trapezoidal shape such that (i) the film width direction is a trapezoidal height direction and (ii) the upper and lower bases of the trapezoid alternate. Then, by attaching an electrode or the like to the capacitor element, the capacitor 68a is manufactured.

The semiconductor module 66 includes, for example, semiconductor switching elements such as MOSFETs or IGBTs, and is formed in a substantially plate shape. In the present embodiment, the rotating electrical machine 10 includes two sets of three-phase windings; an inverter circuit is provided for each of the three-phase windings. The electrical component 62 includes a total of twelve semiconductor modules 66.

The semiconductor module 66 is disposed to be interposed between (i) the cylindrical portion 71 of the casing portion 64 and (ii) the capacitor module 68. The outer peripheral surface of the semiconductor module 66 is in contact with the inner peripheral surface of the cylindrical portion 71; the inner peripheral surface of the semiconductor module 66 is in contact with the outer peripheral surface of the capacitor module 68. In this case, the heat generated in the semiconductor module 66 is transmitted to the end plate portion 63 via the casing portion 64 and is released from the end plate portion 63.

It is preferable that a spacer 69 be disposed to be interposed between the semiconductor module 66 and the cylindrical portion 71 in the radial direction. In the transverse section orthogonal to the axial direction, the capacitor module 68 has a cross-section shaped of a regular dodecagon whereas the inner peripheral surface of the cylindrical portion 71 has a cross-section shaped of a circular. The spacer 69 thus has a flat inner surface and a curved outer surface. The spacers 69 may be integrally provided to be continuously connected in an annular shape on the radially outer side of each semiconductor module 66. In addition, it is also possible to make the transverse sectional shape of the inner peripheral surface of the cylindrical portion 71 into the same dodecagon as the capacitor module 68. In this case, it is preferable that the inner and outer peripheral surfaces of the spacer 69 be flat.

In the present embodiment, a cooling water passage 74 for circulating the cooling water is formed in the cylindrical portion 71 of the casing portion 64. The heat generated by the semiconductor module 66 is thus also released to the cooling water flowing through the cooling water passage 74. That is, the casing portion 64 is provided with a water cooling mechanism. As shown in FIGS. 3 and 4, the cooling water passage 74 is annularly formed so as to surround the electrical component 62 (the semiconductor module 66 and the capacitor module 68). The semiconductor module 66 is disposed along the inner peripheral surface of the cylindrical portion 71 (i.e., disposed radially inside the cylindrical portion 71); the cooling water passage 74 is provided so as to be overlapped with the semiconductor module 66 when viewed from the radial direction.

The stator 50 is disposed outside the cylindrical portion 71, and the electrical component 62 is disposed inside the cylindrical portion 71. Therefore, the cylindrical portion 71 receives the heat of the stator 50 from the outside, and the heat of the semiconductor module 66 from the inside. In this case, the stator 50 and the semiconductor module 66 can be cooled simultaneously; therefore, the heat of the heat generating member of the rotating electrical machine 10 can be efficiently released.

The electrical component 62 includes (i) an insulating sheet 75 provided on one (axial) end side of the capacitor module 68 in the axial direction and (ii) a wiring module 76 provided on the other (axial) end side of the capacitor module 68. One of the axial end sides of the capacitor module 68 (the end side facing toward the bearing unit 20) faces towards the end surface portion 72 of the casing portion 64 and is overlapped with the end surface portion 72 via the insulating sheet 75 interposed therebetween. Also, the wiring module 76 is assembled to the other end side (the end side facing toward the opening 65).

The wiring module 76 includes (i) a circular plate-like main body 76a made of a synthetic resin material and (ii) a plurality of bus bars 76b and 76c embedded in the main body 76a. The bus bars 76b and 76c are used for electrical connection with the semiconductor module 66 and the capacitor module 68. Specifically, the semiconductor module 66 includes a terminal 66a extending from the end side in the axial direction; the terminal 66a is connected to the bus bar 76b radially outside the main body 76a. The bus bar 76c extends from a position radially outside the main body 76a in a direction opposite to the capacitor module 68. As shown in FIG. 2, the extending tip of the bus bar 76c is connected to the wiring member 79.

As described above, the insulating sheet 75 and the wiring module 76 are provided on both axial end sides of the capacitor module 68. Such a configuration forms, as a heat radiation path of the capacitor module 68, the paths from the both axial end sides of the capacitor module 68 to the end surface portion 72 and the cylindrical portion 71. Thus, the heat can be dissipated from the end sides of the capacitor module 68 other than the outer peripheral surface on which the semiconductor module 66 is provided. That is, not only the radiation in the radial direction but also the radiation in the axial direction are possible.

The capacitor module 68 has a hollow cylindrical shape; the rotating shaft 11 is disposed on the inner periphery of the hollow cylindrical shape with a predetermined gap. Therefore, the heat of the capacitor module 68 can be released also from its hollow portion. In this case, the flow of air is generated by the rotation of the rotating shaft 11, so that the cooling effect is enhanced.

The disk-shaped control board 67 is attached to the wiring module 76. The control board 67 includes a printed circuit board (PCB) on which a predetermined wiring pattern is formed; a control device 77 including various ICs, a microcomputer, etc. is mounted on the printed board. The control board 67 is fixed to the wiring module 76 by a fixing tool such as a screw. The control board 67 includes an insertion hole 67a at its central portion for inserting the rotating shaft 11.

The control board 67 is provided on the side opposite to the capacitor module 68 among both axial sides of the wiring module 76; the bus bars 76c of the wiring module 76 extend from one side of both sides of the control board 67 to the other side. In such a configuration, the control board 67 may be provided with a cut off for avoiding interference with the bus bar 76c. For example, it is preferable that a part of the outer edge portion of the circular control board 67 be cut away.

Thus, the electrical component 62 is accommodated in the space surrounded by the casing portion 64; the housing 30, the rotor 40, and the stator 50 are arranged in layers radially outside the casing portion 64. According to this configuration, electromagnetic noise generated in the inverter circuit is preferably shielded. In the inverter circuit, switching control in each semiconductor module 66 is performed using PWM control with a predetermined carrier frequency; it is conceivable that electromagnetic noise may be generated by the switching control. The electromagnetic noise can however be suitably shielded by the housing 30, the rotor 40, the stator 50, and the like radially outside the electrical component 62.

The cylindrical portion 71 includes a through hole 78 that is adjacent to the end plate portion 63; the through hole 78 is provided for inserting the wiring member 79 for electrically connecting the stator 50 on the outside thereof and the electrical component 62 on the inside thereof. As shown in FIG. 2, the wiring member 79 is configured to connect the end of the stator winding 51 and the bus bar 76c of the wiring module 76 by pressure bonding, welding or the like. The wiring member 79 is, for example, a bus bar, of which the joint surface may be desirably crushed flat. The through hole(s) 78 may be provided at one or more locations, and are provided at two locations in the present embodiment. The configuration provided with the through holes 78 at two locations enables easy connection of the winding terminals extending from two sets of three-phase windings with the wiring member 79. This is preferable for performing multiphase connection.

In the housing 30, as shown in FIG. 4, the rotor 40 and the stator 50 are provided in order from the radially outer side to the radially inner side; the inverter unit 60 is provided to be radially inside the stator 50. Here, assuming that the radius of the inner peripheral surface of the housing 30 is d. The rotor 40 and the stator 50 are disposed to be radially outside the distance of d×0.705 from the rotation center (i.e., disposed to be radially outside a virtual circle having a radius equal to the distance of d×0.705 from the rotation center). In this case, assuming that a region radially inside the inner peripheral surface of the stator 50 (i.e., the inner peripheral surface of the stator core 52) be a first region X1, and a region from the inner peripheral surface of the stator 50 to the housing 30 be a second region X2. The area of the transverse section of the first region X1 is larger than the area of the transverse section of the second region X2. Further, the volume of the first region X1 is larger than the volume of the second region X2 in a range where the magnet unit 42 and the stator winding 51 of the rotor 40 overlap with each other when viewed from the radial direction.

Assuming that the rotor 40 and the stator 50 are magnetic circuit components. In the housing 30, the first region X1 radially inside the inner circumferential surface of the magnetic circuit components has a volume larger than that of the second region X2 radially from the inner circumferential surface of the magnetic circuit components to the housing 30.

(Details of Rotor and Stator)

There is generally known a configuration of a stator in a rotating electrical machine; in such a configuration, a plurality of slots are provided in a circumferential direction on an annular stator core made of laminated steel plates, and stator windings are wound in the slots. Specifically, the stator core has a plurality of teeth which radially extend from the yoke portion and which are arranged in the circumferential direction at predetermined intervals; each slot is formed between the teeth adjacent in the circumferential direction. In the slot, for example, a plurality of layers of conductors are accommodated in the radial direction, and the stator windings are configured by the conductors.

Note that, in the above-described stator configuration, when the stator winding is energized, magnetic saturation occurs at the teeth of the stator core as the magnetomotive force of the stator winding increases. It is conceivable that such magnetic saturation limits the torque density of the rotating electrical machine. That is, in the stator core, it is considered that magnetic saturation occurs when the rotating magnetic flux generated by energization of the stator winding is concentrated on the teeth.

Also, there is generally known a configuration of an IPM (Interior Permanent Magnetic) rotor in a rotating electrical machine; in such a configuration, permanent magnets are disposed on a d axis, while a rotor core is disposed on a q axis. In such a case, by exciting the stator winding in the vicinity of the d axis, an excitation magnetic flux flows from the stator to the q axis of the rotor according to Fleming's law. It is also considered that, due to the excitation magnetic flux, a wide range of magnetic saturation occurs in the q-axis core portion of the rotor.

Figure 7:
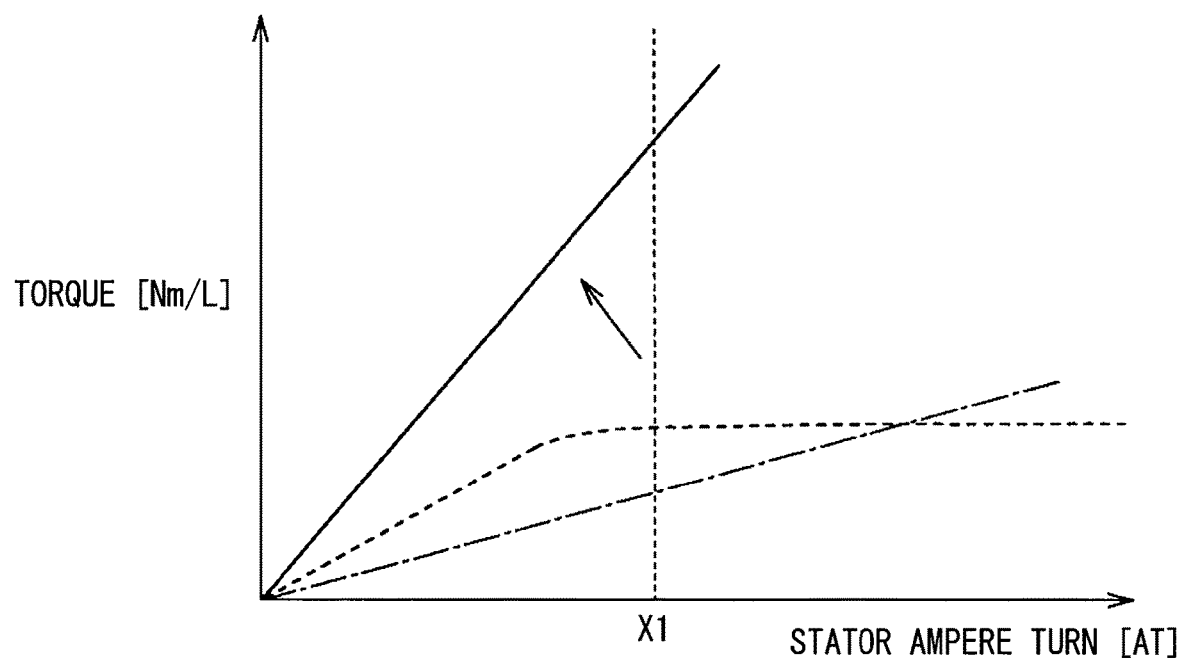
FIG. 7 is a torque diagram showing the relationship between torque density and ampere turn of a stator winding.

FIG. 7 is a torque diagram showing a relationship between a torque density [Nm/L] and an ampere turn [AT] indicating a magnetomotive force of a stator winding. The broken line shows the characteristics of a general IPM rotor type rotating electric machine. As shown in FIG. 7, in a general rotating electric machine, magnetic saturation occurs in two places of (i) the teeth portion between the slots and (ii) the q-axis core portion, by increasing the magnetomotive force in the stator. The increase in torque is thereby limited. Thus, in the general rotating electric machine, the ampere-turn design value is limited to X1.

In this embodiment, in order to eliminate the torque limit resulting from the magnetic saturation, the rotating electrical machine 10 is provided with the configuration or techniques shown below. That is, a first technique is to eliminate magnetic saturation occurring in the stator core teeth in the stator, by adopting a slotless structure in the stator 50 and simultaneously adopting an SPM (Surface Permanent Magnetic) rotor to eliminate the magnetic saturation occurring in the q-axis core portion of the IPM rotor. The first technique can eliminate the above two locations where the magnetic saturation occurs, but may reduce the torque in the low current region (see the dashed line in FIG. 7). Thus, in order to overcome the torque reduction by increasing the magnetic flux of the SPM rotor, a second technique is to adopt a pole anisotropic structure in which the magnetic path is increased to increase the magnetic force in the magnet section 42 of the rotor 40.

In addition, a third technique is to overcome the torque reduction by adopting a flattened conductor structure in which the thickness of the conductor 82 in the radial direction is reduced in the coil side portion 53 of the stator winding 51. The flattened conductor structure will be described in detail later. That is, in the flattened conductor structure, the cross-section of the conductor 82 has a corner-rounded rectangular shape having shorter sides in the radial direction and longer sides in the circumferential direction. Here, it is conceivable that a larger eddy current is generated in the opposing stator winding 51 due to the above-described pole anisotropic structure. However, according to the third technique, it is possible to suppress the generation of the eddy current in the radial direction in the stator winding 51 because of the flattened conductor structure where the cross-section of the conductor 82 has a shorter length in the radial direction and a longer length in the circumferential direction. As described above, according to the first to third techniques, as shown by a solid line in FIG. 7, a magnet having a high magnetic force is employed to expect a significant improvement in torque characteristics, while a concern of the generation of large eddy currents, which can occur due to the high magnetic force magnets, can also be improved.

Furthermore, a fourth technique is to adopt a magnet unit 42 having a magnetic flux density distribution close to a sine wave by utilizing a pole anisotropic structure. This can enhance the torque by increasing the sine wave matching rate by pulse control or the like described later, and can further suppress the eddy current loss due to the gradual magnetic flux change as compared with the radial magnet.

Further, a fifth technique is to adopt a wire conductor structure of the stator winding 51, in which a plurality of wires are gathered. This wire conductor structure can flow a large current by connecting the wires in parallel while reducing the area of the cross-section of each wire. Reducing the area of the cross-section of each wire can suppress the generation of eddy current, which occurs in the conductor 82 spreading in the circumferential direction in the flattened conductor structure, more effectively than the third technique that reduces the thickness (i.e., the length) of the conductor 82 in the radial direction. Then, when a plurality of wires are gathered and twisted, relating to the magnetomotive force from the conductor body, the structure of a plurality of wires being twisted can offset the eddy current due to the magnetic flux generated by the right-handed screw law with respect to the current conduction direction.

Thus, when the fourth technique and the fifth technique are further added, the torque enhancement can be performed while suppressing the eddy current loss due to the high magnetic force even though adopting the second technique employing the magnet with the high magnetic force.

Hereinafter, the slotless structure of the stator 50, the flattened conductor structure of the stator winding 51, and the pole anisotropic structure of the magnet unit 42 will be individually described.

Figure 8:
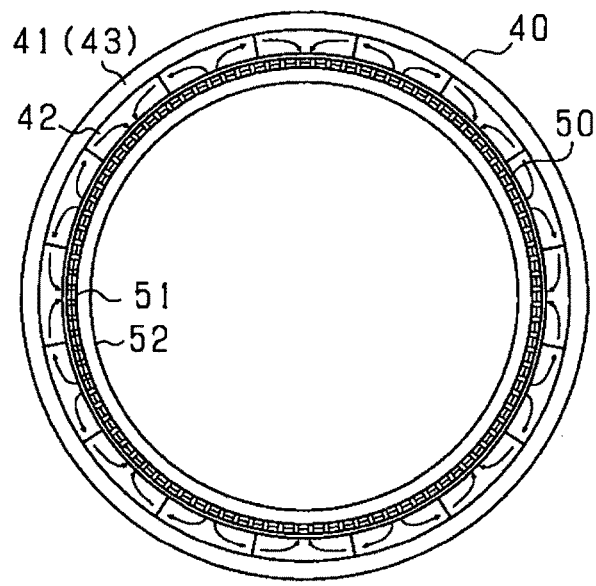
FIG. 8 is a transverse sectional view of a rotor and a stator.
Figure 9:
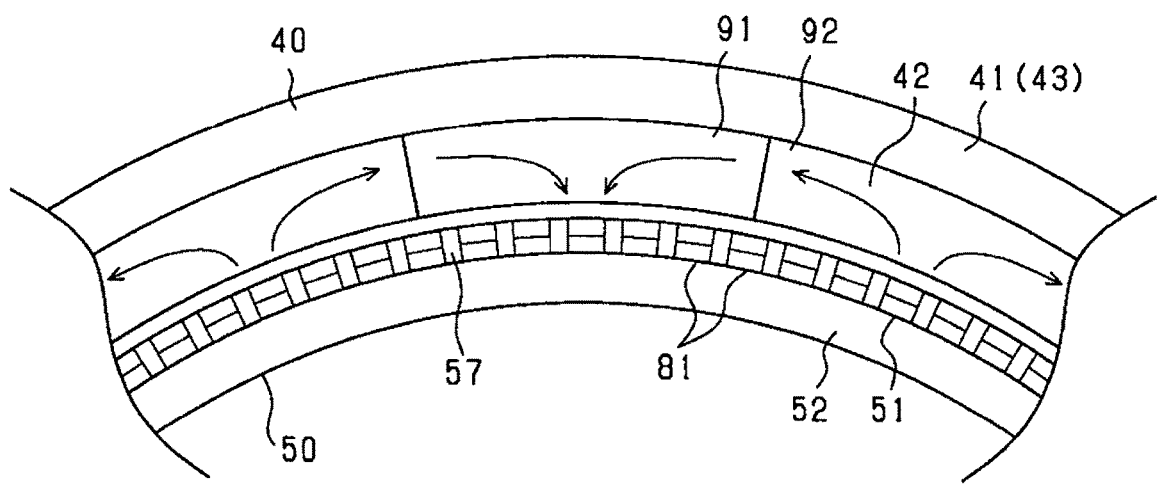
FIG. 9 is an enlarged view of a part of FIG. 8.
Figure 10:
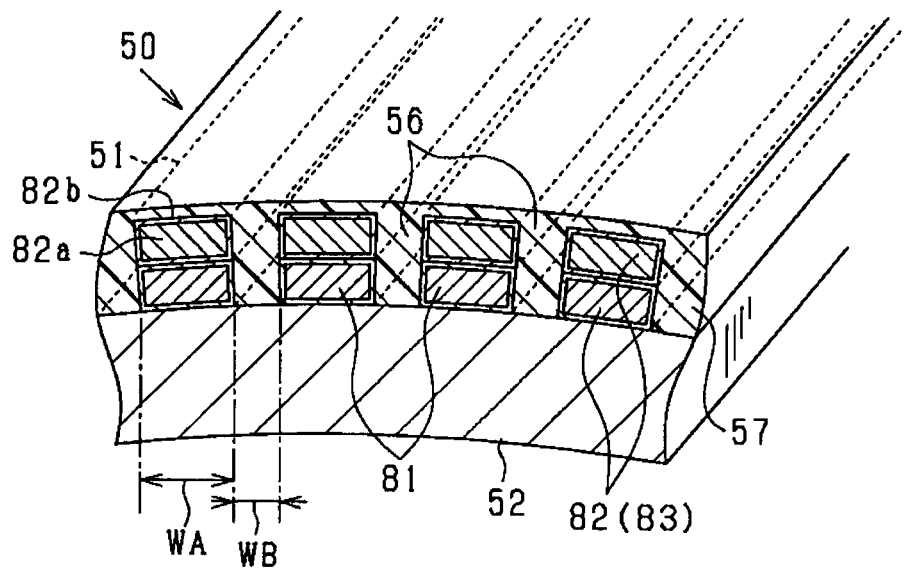
FIG. 10 is a transverse sectional view of a stator.
Figure 11:
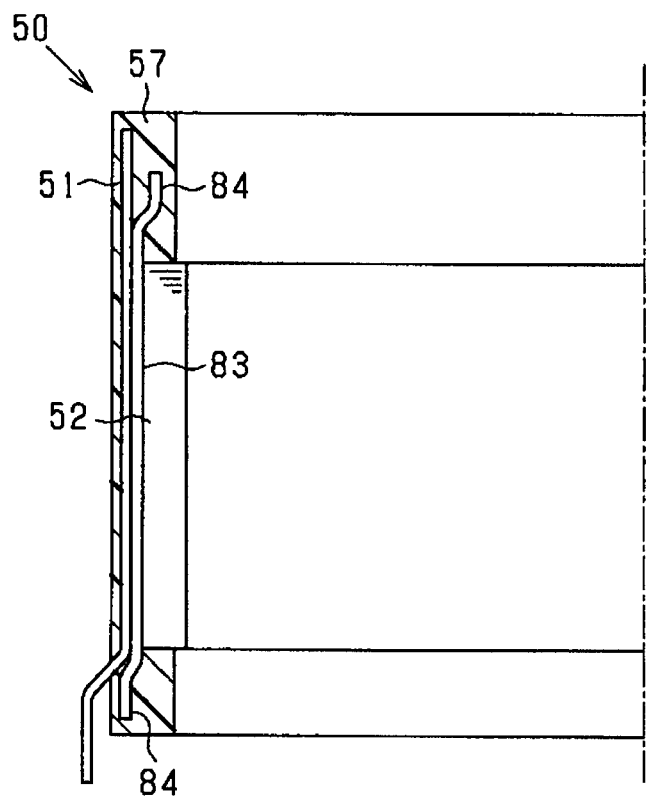
FIG. 11 is a longitudinal sectional view of a stator.
Figure 12:
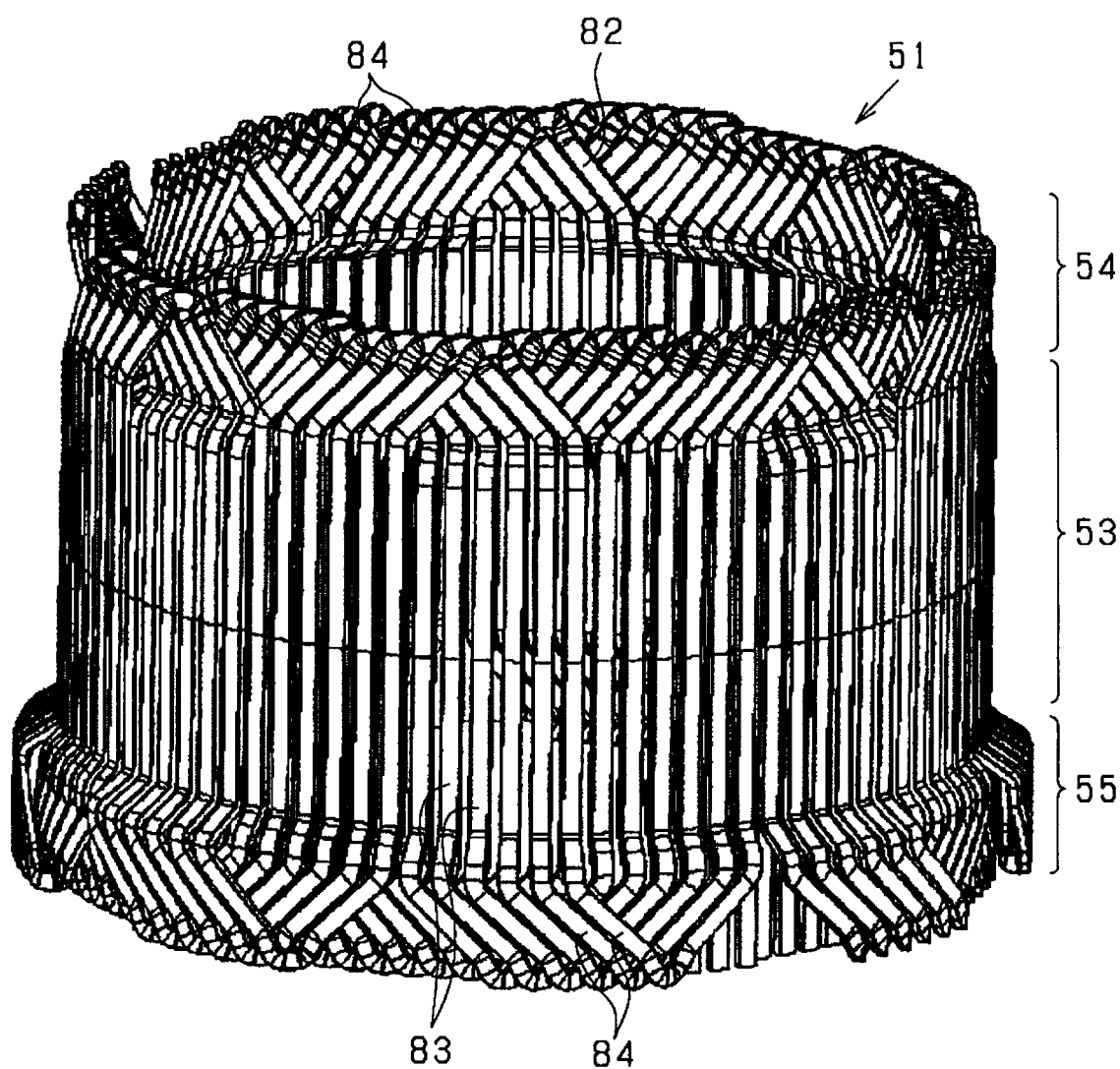
FIG. 12 is a perspective view of a stator winding.

First, the slotless structure and the flattened conductor structure will be described. FIG. 8 is a transverse sectional view of the rotor 40 and the stator 50. FIG. 9 is an enlarged view of a part of the rotor 40 and the stator 50 shown in FIG. 8. FIG. 10 is a transverse sectional view of the stator 50. FIG. 11 is a longitudinal sectional view of the stator 50. FIG. 12 is a perspective view of the stator winding 51. In FIGS. 8 and 9, the magnetization direction of the magnet in the magnet unit 42 is indicated by an arrow.

As shown in FIGS. 8 to 11, the stator core 52 has a cylindrical shape in which a plurality of electromagnetic steel plates are stacked in the axial direction and has a predetermined thickness in the radial direction; the stator winding 51 is to be assembled to be radially outside the stator core 52. A space facing the outer peripheral surface of the stator core 52 is a portion for installing the conductors 82 or the conductor groups 81. The outer peripheral surface of the stator core 52 is in the form of a curved surface without irregularities; on that outer peripheral surface, a plurality of conductor groups 81 are provided to adjoin each other along the circumferential direction.

The stator core 52 functions as a back yoke that is part of a magnetic circuit for rotating the rotor 40. In this case, a slotless structure is provided where any teeth (i.e., iron cores) made of a soft magnetic material are not provided between the conductor groups 81 adjoining each other in the circumferential direction. The present embodiment is provided with a configuration in which the resin material of the sealing portion 57 is embedded in gaps 56, each of which is provided between the conductor groups 81 adjoining each other in the circumferential direction. That is, in a state before the sealing portion 57 is practically sealed, the stator 50 having a slotless structure is configured such that the conductor groups 81 are disposed radially outside the stator core 52 to be arranged in the circumferential direction at predetermined intervals while each of the gaps 56 is interposed as a region between the conductor groups adjoining each other.

Note that the configuration in which the teeth are provided between the conductor groups arranged in the circumferential direction signifies a configuration in which the teeth each have a predetermined thickness in the radial direction and a predetermined width in the circumferential direction, to thereby form a part of the magnetic circuit (i.e., a magnet path) between the conductor groups. In this respect, the configuration in which the teeth are not provided between the conductor groups 81 as in the present embodiment signifies a configuration in which the above magnetic circuit is not formed.

As shown in FIGS. 10 and 11, the stator winding 51 is sealed by the sealing portion 57. In the transverse section in FIG. 10, the sealing portion 57 is provided by filling the synthetic resin material between the conductor groups 81, that is, in the gaps 56. In the configuration, providing the sealing portion 57 signifies providing an insulating member to be interposed between the conductor groups 81. That is, the sealing portion 57 functions as an insulating member in the gap 56. The sealing portion 57 is provided in the radial direction with a range covering all the conductor groups 81 in the radially outer side of the stator core 52; namely, the radial thickness dimension the length in the radial direction) of the sealing portion 57 is larger than that of each conductor group 81.

Further, when viewed in the transverse section of FIG. 11, the sealing portion 57 is provided with a range covering the turn portion 84 of the stator winding 51. In a range radially inside the stator winding 51, the sealing portion 57 is provided as covering at least a part of the axial end side of the stator core 52. In this case, the stator winding 51 is resin-sealed substantially in its entirety except the end of the phase winding of each phase (i.e., the connection terminal with the inverter circuit).

In the configuration in which the sealing portion 57 is provided in a range including the axial end side of the stator core 52, the laminated steel plates of the stator core 52 can be pressed axially inward by the sealing portion 57. Thereby, the lamination state of each steel plate can be held using the sealing portion 57. In the present embodiment, the inner peripheral surface of the stator core 52 is not resin-sealed; alternatively, the entire stator core 52 including the inner peripheral surface of the stator core 52 itself may be resin-sealed.

In the case where the rotating electrical machine 10 is used as a vehicle power source, the sealing portion 57 is preferably made of a high heat resistant resin, such as fluororesin, epoxy resin, PPS resin, PEEK resin, LCP resin, silicon resin, PAI resin, PI resin, etc. Further, in view of the linear expansion coefficient to suppress cracking due to the expansion difference, it is desirable that the material is the same as the outer coating of the conductor of the stator winding 51. That is, a silicone resin whose linear expansion coefficient is generally twice or more that of other resins is desirably excluded. In electric products such as electric vehicles which do not have an engine utilizing combustion, the resin having heat resistance of about 180 degrees C. such as PPO resin, phenol resin, or FRP resin may be also employed. This is not the case in the field where the ambient temperature of the rotating electrical machine 10 is considered to be less than 100 degrees C.

The torque of the rotating electrical machine 10 is proportional to the magnitude of the magnetic flux. Here, if the stator core has teeth, the maximum amount of magnetic flux at the stator is limited depending on the saturation flux density at the teeth. In contrast, when the stator core 52 does not have teeth as in the present embodiment, the maximum amount of magnetic flux in the stator 50 is not limited. Therefore, the configuration is advantageous in increasing the current supplied to the stator winding 51 to increase the torque of the rotating electrical machine 10.

Each conductor group 81 provided to be radially outside the stator core 52 is configured by aligning a plurality of conductors 82 in the radial direction; each conductor 82 has a cross-section shaped of a corner-rounded flattened rectangle. Each conductor 82 is in a form of a line or wire and may thus be also referred to as a linear conductor 82 or a wire-formed conductor 82. The respective conductors 82 are arranged in a direction such that, in the cross-section, "radial dimension (i.e., the length in the radial direction)<circumferential dimension (i.e., the length in the circumferential direction)". Thereby, the thickness (i.e., the length) in the radial direction is reduced in each conductor group 81. Moreover, while achieving such thickness reduction in the radial direction, the area of a conductor extends flatly into the area where teeth conventionally exist, to form a flattened conductor area structure. Thereby, the increase in the calorific value of the conductor which is concerned by the reduction of the cross-sectional area due to the thickness reduction is suppressed by extending flatly in the circumferential direction to increase the cross-sectional area of the conductor. Suppose a configuration where a plurality of conductors are aligned in the circumferential direction and connected in parallel. Even in such a configuration, although the area of the cross-section is reduced due to the conductive film, the same effect can be obtained.

Since there is no slot, the stator winding 51 in the present embodiment can be designed such that the area of the conductor body in the entire circumference be larger than the area of the gaps in the same entire circumference. In a known vehicle rotating electrical machine, it is natural that the ratio of the area of the conductor body to the area of the gaps in the entire circumference of the stator winding is 1 or less. In contrast, the present embodiment provides the conductor groups 81 such that the ratio of the area of the conductor body to the gap area in the entire circumference is 1 or greater. See FIG. 10 in which the conductors 82 (that is, the straight portions 83 described later) are aligned along the circumferential direction. As shown in FIG. 10, the area (or the length in the circumferential direction) of the conductors is referred to as a conductor area WA, and the area (or the length in the circumferential direction) between the conductors 82 is referred to as an inter-conductor area WB. Here, the conductor area WA is designed to be greater than the inter-conductor area WB.

The torque of the rotating electrical machine 10 is approximately inversely proportional to the thickness (i.e., the length in the radial direction or the radial length) of the conductor group 81. In this respect, the configuration which reduces the radial length of the conductor group 81 radially outside the stator core 52 is advantageous in achieving an increase in torque of the rotating electrical machine 10. The reason is that the magnetic resistance can be reduced by reducing the distance from the magnet unit 42 of the rotor 40 to the stator core 52, that is, reducing the distance of the portion without iron. Such a configuration can increase the interlinkage flux of the stator core 52 by the permanent magnet, and enhance the torque.

The conductor 82 is made of a coated conductor in which the surface of the conductor body 82a is covered with an insulating film 82b. Insulating properties are thus secured between the respective conductors 82 overlapping each other when view from the radial direction and also between the conductors 82 and the stator core 52. The thickness of the insulating film 82*b* is, for example, 80 µm, which is thicker than the film thickness (20 to 40 µm) of a commonly used conductor. Thereby, even if insulating paper etc. are not interposed between the conductors 82 and the stator core 52, the insulation between both can be ensured.

In addition, each phase winding is configured by the conductors 82 such that the insulating property by the insulating film 82*b* is maintained except for the exposed portion for connection. The exposed portion is, for example, an input/output terminal portion or a neutral point portion in a star connection. In the conductor group 81, the conductors 82 adjoining each other in the radial direction are fixed to each other using a resin fixing or a self-fusion coated wire. Thereby, dielectric breakdown, vibration, and sound due to rubbing between the conductors 82 are suppressed.

Figure 13:
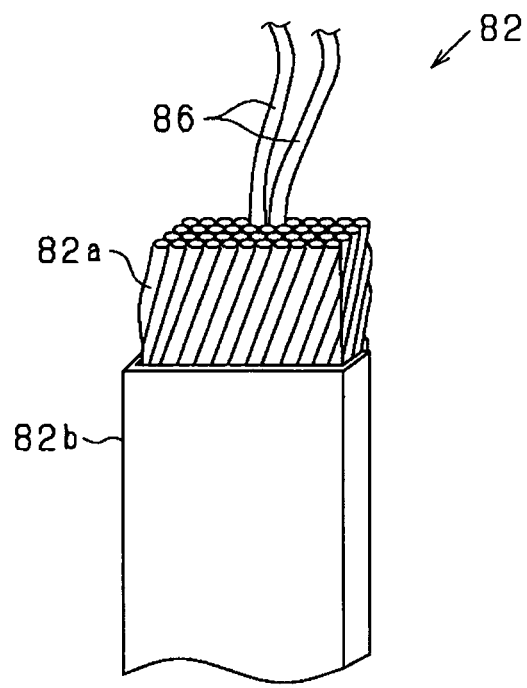
FIG. 13 is a perspective view showing a configuration of a conductor.
Figure 14:
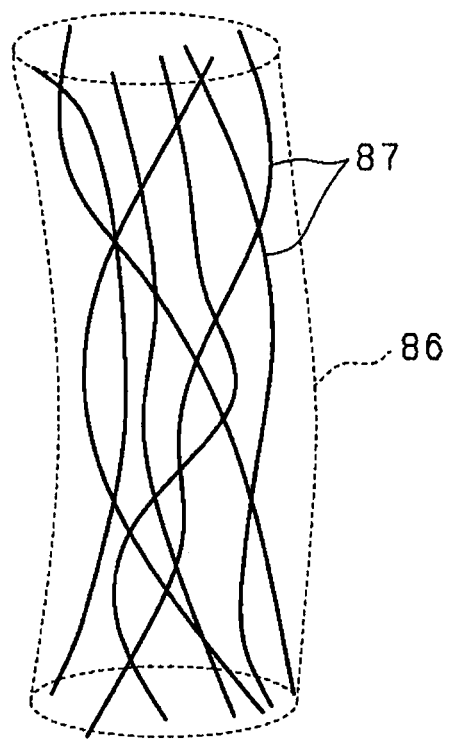
FIG. 14 is a schematic view showing a configuration of a wire.

In the present embodiment, the conductor body 82*a* is configured as an assembly of a plurality of wires 86. Specifically, as shown in FIG. 13, the conductor body 82*a* is formed in a twisted thread shape by twisting a plurality of wires 86. Further, as shown in FIG. 14, the wires 86 are configured as a composite obtained by bundling thin fibrous conductive materials 87. The wire 86 may be also referred to as a strand wire. For example, the wire 86 is a composite of CNT (carbon nanotube) fibers; as the CNT fibers, fibers including boron-containing fine fibers in which at least a part of carbon is replaced with boron are used. As carbon-based fine fibers, vapor grown carbon fibers (VGCF) or the like can be used in addition to CNT fibers, but it is preferable to use CNT fibers. The surface of the wire 86 is covered with a polymer insulating layer such as enamel.

The conductor body 82*a* is formed by twisting a plurality of wires 86. Therefore, generation of eddy current in each wire 86 is suppressed; the eddy current in the conductor body 82*a* can thus be reduced. In addition, the wires 86 are twisted; thus, in one wire 86, portions where the application directions of the magnetic field are reverse to each other are generated, to offset the back electromotive force. Therefore, the eddy current can be reduced as well. In particular, by forming the wires 86 with the fibrous conductive materials 87, it is possible to reduce the thickness of wires and to significantly increase the number of times of twisting, to thereby more preferably reduce the eddy current.

As described above, each of the conductors 82 has a corner rounded rectangular shape in cross-section, and a plurality of conductors are arranged in the radial direction. For example, the conductor 82 may be configured by a plurality of wires 86 that are gathered together and twisted; in that state, it is preferable that the conductor 82 may be solidified into a desired shape by using a synthetic resin or the like.

Each conductor 82 is bent so as to be arranged in a predetermined arrangement pattern along the circumferential direction, whereby a phase winding for each phase is formed as the stator winding 51. As shown in FIG. 12, each conductor 82 is configured to include (i) a straight portion 83 linearly extended in the axial direction and (ii) a turn portion 84. Further, as shown in FIG. 12, in the stator winding 51, a coil side portion 53 and coil end portions 54 and 55 are formed. The coil side portion 53 is configured by the straight portions 83 of the conductors 82. The coil end portions 54 and 55 are configured by the turn portions 84, respectively, protruding upward (in FIG. 12) and downward (in FIG. 12) from the coil side portion 53.

Each conductor 82 is configured as a string of wave-like conductor by alternately repeating the straight portion 83 and the turn portion 84. The straight portions 83 are disposed at corresponding positions facing toward the magnet unit 42 in the radial direction. The straight portions 83 in the same phase are arranged at a predetermined interval and are connected to each other via the turn portion 84 at a position axially outside the magnet unit 42. The straight portion 83 may be referred to a portion facing toward the magnet unit 42 in the radial direction.

In the present embodiment, the stator winding 51 is wound in an annular shape by distributed winding. In this case, in the coil side portion 53, the straight portions 83 are aligned in the circumferential direction at a pitch corresponding to one pole pair of the magnet unit 42 for each phase. In each of the coil end portions 54 and 55, the straight portions 83 for each phase are connected to each other by the turn portion 84 formed in a substantially V shape. The directions of the currents of the straight portions 83 corresponding to one pole pair are opposite to each other. Further, the combination of the pair of straight portions 83 connected by the turn portion 84 is different between the one coil end portion 54 and the other coil end portion 55. Such connection of the coil end portions 54 and 55 is repeated in the circumferential direction, whereby the stator winding 51 is formed in a substantially cylindrical shape.

More specifically, the stator winding 51 constitutes a winding for each phase using two pairs of conductors 82 for each phase. Of the stator windings 51, one three-phase winding (U-phase, V-phase, W-phase) and the other three-phase winding (X-phase, Y-phase, Z-phase) are provided, respectively, in two layers on the radially inner side and the radially outer side. In this case, assuming that the number of phases of the winding is S and the number of the conductors 82 in one conductor group 81 is m, 2×S×m=2Sm conductor groups 81 are formed for each pole pair. In this embodiment, since the number "S" of phases is 3, the number "m" of the conductors 82 in the conductor group 81 is 2, and the rotating electrical machine 10 is an 8-pole pair (16 poles), the conductor groups 81 of 2×3×2×8=96 are circumferentially arranged.

In the stator winding 51 shown in FIG. 12, in the coil side portion 53, the straight portions 83 in the two layers on the radially inner side and the radially outer side are disposed so as to overlap each other in the radial direction (i.e., to overlap each other when viewed from a direction orthogonal to the axial direction of the rotating shaft 11). In contrast, in each of the coil end portions 54 and 55, the two turn portions 84 from the overlapping straight portions 83 on the radially inner side and the radially outer side extend in different directions opposite to each other in the circumferential direction. That is, in the conductors 82 adjacent in the radial direction, the directions of the corresponding turn portions 84 are opposite to each other except for the portion serving as a coil end.

Figure 15A:
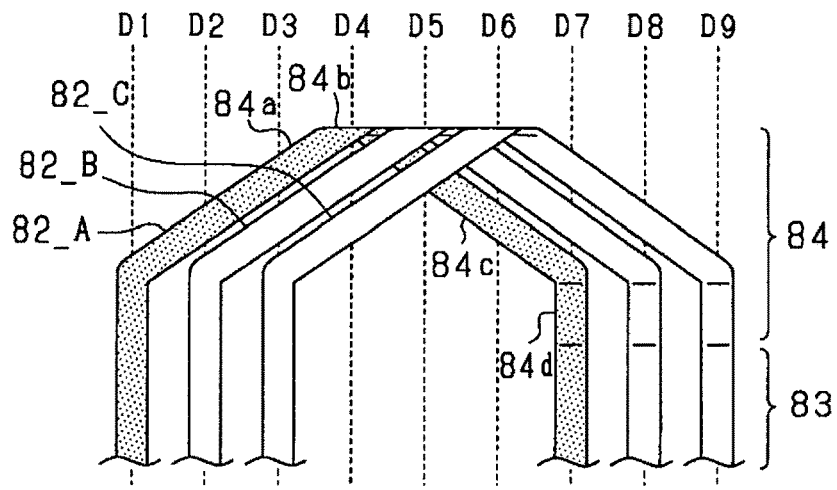
FIG. 15A is a view showing the form of each conductor in the nth layer.
Figure 15B:
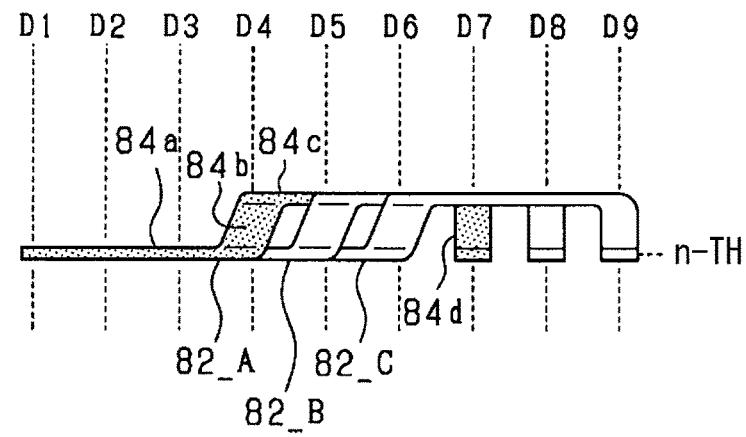
FIG. 15B is a view showing the form of each conductor in the nth layer.

Here, the winding configuration of the conductors 82 in the stator winding 51 will be specifically described. In the present embodiment, a plurality of conductors 82 formed by wave winding are provided so as to be overlapped in a plurality of layers (for example, two layers) on the inner side and outer side in the radial direction (i.e., radially inner side and outer side). Each of FIGS. 15A and 15B is a view showing a configuration or form of each conductor 82 in an n-th layer. FIG. 15A shows the shape of the conductor 82 viewed from a direction orthogonal to the axial direction of the stator winding 51 (i.e., from the side facing the stator winding 51 in a direction orthogonal to the axial direction), and FIG. 15B shows the shape of the conductor 82 viewed from one end side in the axial direction of the stator winding 51. In FIGS. 15A and 15B, the positions at which the conductor groups 81 are disposed are indicated as D1, D2, D3, .... Moreover, for convenience of explanation, only three conductors 82 are shown, which are referred to as a first conductor 82_A, a second conductor 82_B, and a third conductor 82_C.

In each of the conductors 82_A to 82_C, the straight portions 83 are disposed at the n-th layer position, that is, at the same position in the radial direction. The straight portions 83 separated from each other by six positions (3×m) in the circumferential direction are connected to each other by the turn portion 84. In other words, in each of the conductors 82_A to 82_C, a first straight portion 83 is connected with a second straight portion 83 via a turn portion 84; other five straight portions 83 are interposed between the first straight portion 83 and the second straight portion 83. The first straight portion 83, the second straight portion 83, and the other five straight portions 83 are disposed in the same pitch circle centered on the axis of the rotor 40. For example, in the first conductor 82_A, a pair of straight portions 83 are disposed at D1 and D7, respectively, and such a pair of straight portions 83 are connected by an inverted V-shaped turn portion 84. Further, the other conductors 82_B and 82_C are arranged in the same n-th layer while shifting their circumferential positions, respectively, by one and by two from the first conductor 82_A. In this case, since all the conductors 82_A to 82_C are disposed in the same layer, it is conceivable that the turn portions 84 interfere with each other. Therefore, the present embodiment is provided with an interference avoidance portion in which a part of the turn portion 84 is offset in the radial direction, in each of the conductors 82_A to 82C.

Specifically, the turn portion 84 of each of the conductors 82_A to 82_C includes (i) a first-side inclined portion 84a which is a portion extending in the circumferential direction on the same pitch circle, (ii) a top portion 84b which shifts radially inward (upward in FIG. 15B) from the pitch circle of the first-side inclined portion 84a to the different pitch circle and starts to extend in the circumferential direction on the different pitch circle, (iii) a second-side inclined portion 84c, and (iv) a returning portion 84d. The top portion 84b, the second-side inclined portion 84c, and the returning portion 84d correspond to the interference avoidance portion. The second-side inclined portion 84c may be configured to shift radially outward with respect to the first-side inclined portion 84a.

That is, the turn portion 84 of each of the conductors 82_A to 82_C includes the first-side inclined portion 84a and the second-side inclined portion 84c on both end sides of the top portion 84b which is a central position in the circumferential direction. The radial positions of the first-side and second-side inclined portions 84a and 84c are different from each other. The radial positions of the first-side and second-side inclined portions 84a and 84c are positions in the front-rear direction in FIG. 15A, and positions in the top-bottom direction in FIG. 15B. For example, the turn portion 84 of the first conductor 82_A is configured to: extend along the circumferential direction starting from D1 position of the n-th layer; turn radially (for example, radially inward) at the top portion 84b which is a central position in the circumferential direction; turn again to the circumferential direction and extend again along the circumferential direction; turn radially (e.g., radially outward) at the returning portion 84d; and reach D7 position of the n-th layer which is the end position.

According to the above configuration, the conductors 82_A to 82_C are configured as follows (i), (ii), (iii). That is, (i) the first-side inclined portions 84a are arranged vertically in the top to bottom order of the first conductor 82_A the second conductor 82_B the third conductor 82_C. (ii) The vertical positions of the conductor 82_A to 82_C are interchanged at the top portions 84b. (iii) The second-side inclined portions 84c are arranged vertically in the top to bottom order of the third conductor 82_C→the second conductor 82_B→the first conductor 82_A. Therefore, the conductors 82_A to 82_C can be arranged along the circumferential direction without interfering with each other.

Here, a plurality of conductors 82 are overlapped in the radial direction (i.e., when viewed from the radial direction) to form the conductor group 81. The straight portions 83 of the conductors 82 include a plurality of layers of the straight portions 83 including the radially inner straight portion 83 and the radially outer straight portion 83. In such a configuration of the conductor group 81, the turn portion 84 connected to the radially inner straight portion 83 and the turn portion 84 connected to the radially outer straight portion 83 are preferably arranged to be radially apart from each other more than the radially inner straight portion 83 and the radially outer straight portion 83 are. Also, suppose a case where the conductors 82 of a plurality of layers are bent on the same direction in the radial direction at the end of the turn portions 84, that is, near the boundaries with the straight portions 83. In such a case, it is preferable not to cause the insulation property to be impaired due to the interference between the conductors 82 of the adjacent layers.

Figure 16:
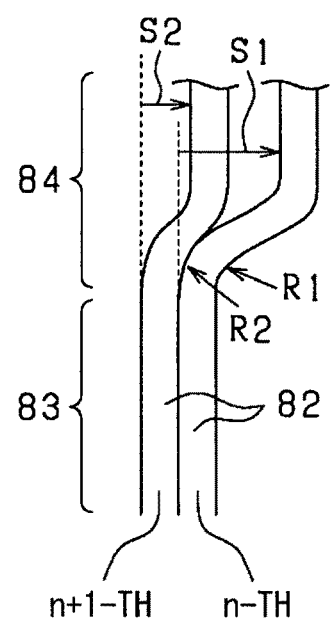
FIG. 16 is a side view showing the conductor in the n-th layer and the n+1-th layer.

For example, in D7 to D9 of FIGS. 15A and 15B, the conductors 82 overlapping in the radial direction are bent in the radial direction at the returning portions 84d of the turn portions 84 individually. In this case, as shown in FIG. 16, the bending radius of the bent portion may be made different between the n-th conductor 82 and the n+1-th conductor 82. Specifically, the bending radius R1 of the radially inside (n-th layer) conductor 82 is less than the bending radius R2 of the radially outside (n+1-th layer) conductor 82.

Further, it is preferable to make the shift amount in the radial direction different between the n-th conductor 82 and the n+1-th conductor 82. Specifically, the shift amount S1 of the radially inside (n-th layer) conductor 82 is made larger than the shift amount S2 of the radially outside (n+1-th) conductor 82.

According to the above configuration, even when the radially overlapping conductors 82 are bent in the same direction, mutual interference of the conductors 82 can be suitably avoided. Thereby, good insulation can be obtained.

Next, the configuration of the magnet unit 42 in the rotor 40 will be described. In this embodiment, a permanent magnet which is included in the magnet unit 42 is supposed to have a residual magnetic flux density Br=1.0 [T] and coercive force bHc=400 [kA/m] or more. Here, 5000 to 10000 [AT] is applied by excitation between phases. If a permanent magnet having the length of 25 [mm] is used with one pole pair, bHc=10000 [A], indicating that demagnetization is not performed. Here, the present embodiment employs a permanent magnet in which the axis of easy magnetization is controlled by orientation. The magnetic circuit length inside the magnet can be thus made longer as compared with the magnetic circuit length of the linearly oriented magnet which conventionally emits 1.0 [T] or more. That is, the magnetic circuit length per one pole pair can be achieved with a small amount of magnet, and the reversible demagnetization range is maintained even when exposed to severe high-temperature conditions as compared with the design using a conventional linearly oriented magnet. In addition, the inventor of the present application has found a configuration that can obtain characteristics close to that of a polar anisotropic magnet even when using a known magnet.

As shown in FIGS. 8 and 9, the magnet unit 42 has an annular shape, and is provided inside the rotor main body 41, more specifically, radially inside the magnet holding portion 43. The magnet unit 42 includes a first magnet 91 and a second magnet 92. The first magnet 91 and the second magnet 92, which are polar anisotropic magnets, have the mutually different magnetic poles from each other. The first magnets 91 and the second magnets 92 are alternately arranged in the circumferential direction. The first magnet 91 is a magnet that is an N pole in the rotor 40; the second magnet 92 is a magnet that is an S pole in the rotor 40. The first magnet 91 and the second magnet 92 are permanent magnets made of a rare earth magnet such as a neodymium magnet, for example.

Figure 17:
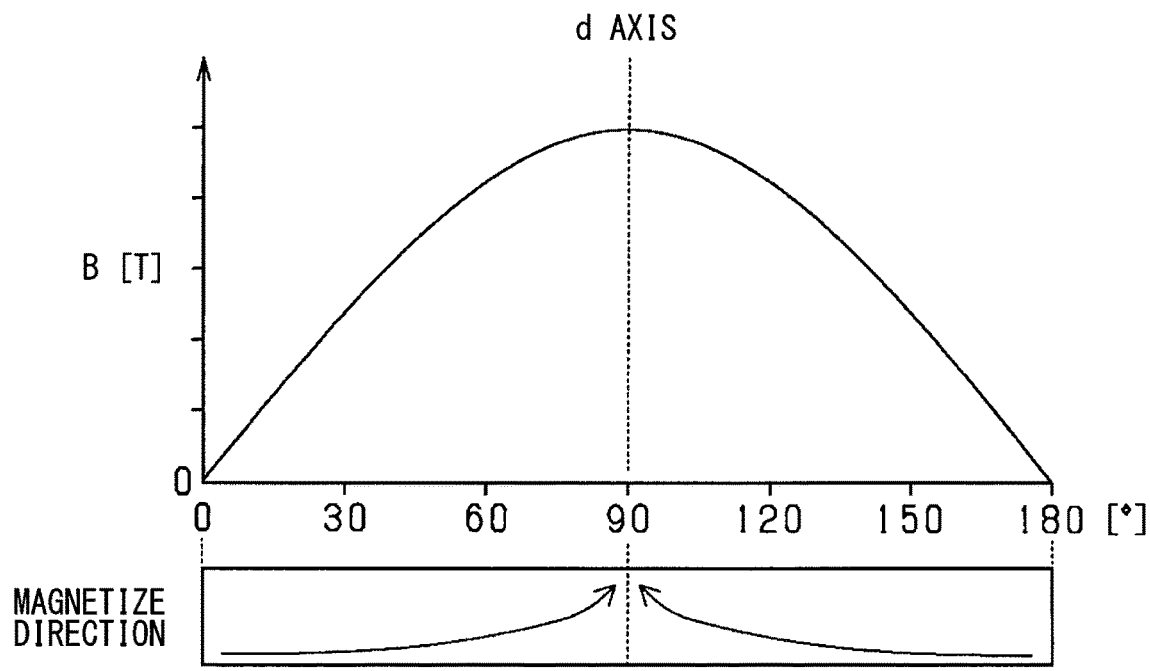
FIG. 17 is a diagram showing the relationship between the electrical angle and the magnetic flux density for the magnet of the embodiment.
Figure 18:
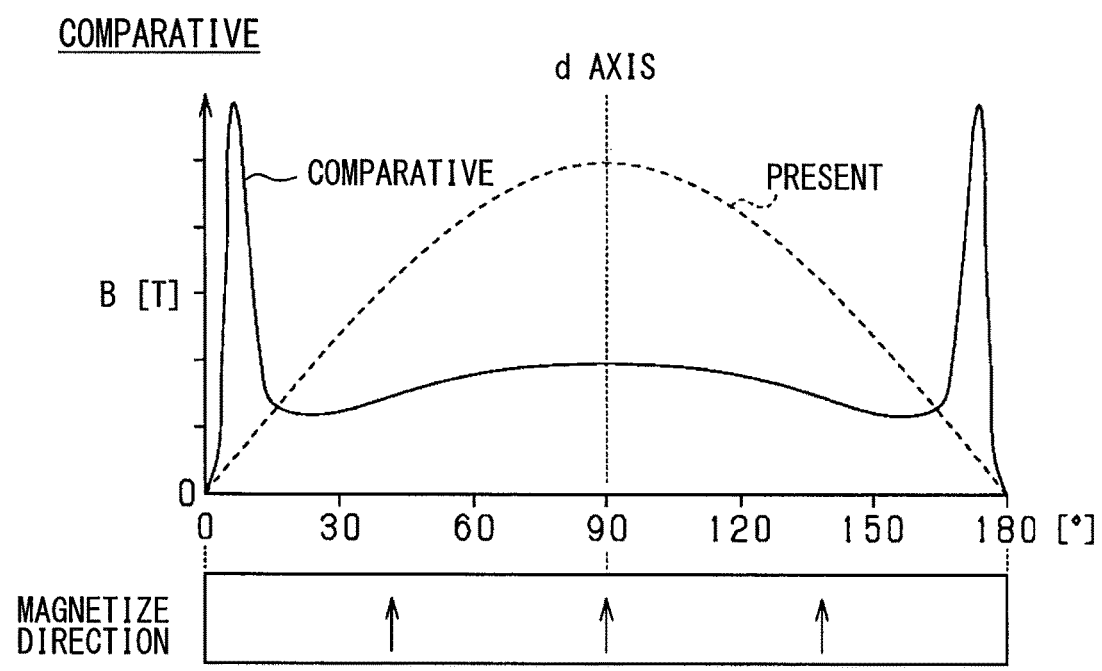
FIG. 18 is a diagram showing the relationship between the electrical angle and the magnetic flux density for the magnet of a comparative example.

In each of the magnets 91 and 92, the magnetization direction extends in an arc shape between the d-axis at the magnetic pole center and the q-axis at the magnetic pole boundary. In each of the magnets 91 and 92, the magnetization direction is the radial direction on the d-axis side, and the magnetization direction is the circumferential direction on the q-axis side. In the magnet unit 42, the magnetic flux flows like an arc between adjacent N and S poles by the magnets 91 and 92. For example, the magnet magnetic path is longer than that of the radial anisotropic magnet. For this reason, as shown in FIG. 17, the magnetic flux density distribution is close to a sine wave. As a result, unlike the magnetic flux density distribution of the radial anisotropic magnet shown as a comparative example in FIG. 18, the magnetic flux can be concentrated at the magnetic pole position, and the torque of the rotating electrical machine 10 can be increased. In FIG. 17 and FIG. 18, the horizontal axis shows the electrical angle, and the vertical axis shows the magnetic flux density. Further, in FIG. 17 and FIG. 18, 90 degree on the horizontal axis indicates the d-axis (that is, the pole center), and 0 degree and 180 degrees on the horizontal axis indicate the q-axis.

The sine wave matching rate of the magnetic flux density distribution only needs to be, for example, 40% or more. In this way, the amount of magnetic flux in the central portion of the waveform can be reliably improved as compared to the case of using a parallel oriented magnet or a radially oriented magnet having a sinusoidal matching rate of about 30%. Further, if the sine wave matching ratio is set to 60% or more, the amount of magnetic flux in the central portion of the waveform can be surely improved as compared with the magnetic flux concentration array called Halbach array.

In the comparative example shown in FIG. 18, the magnetic flux density changes sharply near the q axis. As the change in magnetic flux density is steeper, the eddy current generated in the stator winding 51 is increased. In contrast, in the present embodiment, the magnetic flux density distribution is close to a sine wave. Therefore, in the vicinity of the q-axis, the change in magnetic flux density is less than the change in magnetic flux density of the radial anisotropic magnet. Thereby, the generation of the eddy current can be suppressed.

By the way, in the magnet unit 42, a magnetic flux is generated in the direction orthogonal to the pole face in the vicinity of the d axis (that is, the center of the pole) of each of the magnets 91 and 92. The magnetic flux is arc-shaped so as to be separated from the d-axis as it is separated from the pole face. Further, as the magnetic flux becomes orthogonal to the magnetic pole face, the magnetic flux becomes strong. In this respect, in the rotating electrical machine 10 according to the present embodiment, each conductor group 81 is thinned in the radial direction as described above. The radial center position of the conductor group 81 thus becomes close to the pole face of the magnet unit 42. The stator 50 can receive a strong magnetic flux from the rotor 40.

In the stator 50, the cylindrical stator core 52 is provided to be radially inside the stator winding 51, that is, such that the stator winding 51 is interposed between the rotor 40 and the stator core 52. Therefore, the magnetic flux extending from the pole faces of the magnets 91 and 92 is attracted to the stator core 52, and circulates while using the stator core 52 as a part of the magnetic path. In this case, the direction and path of the magnet flux can be optimized.

(Effect of Rotating Electrical Machine)

In the rotating electrical machine 10 described above, the stator 50 is configured such that any teeth made of soft magnetic material are not provided between the straight portions 83 adjoining each other in the circumferential direction of the stator winding 51, that is, between the adjacent portions facing the magnetics. According to the above configuration, the conductor cross-sectional area can be increased by bringing the adjacent straight portions 83 closer to each other as compared with the case where the teeth are provided between the straight portions 83. This can reduce the heat generation that occurs with the current flow. In a so-called slotless structure in which no teeth are provided between the straight portions 83, the absence of teeth between the straight portions 83 enables the elimination of the magnetic saturation, thereby increasing the current flow to the stator winding 51. In this case, the present embodiment can suitably cope with an increase in the amount of heat generation as the current flows. As described above, the heat dissipation performance of the stator 50 can be optimized.

The present embodiment provides a configuration where any teeth made of a soft magnetic material are not provided between the straight portions 83 adjacent in the circumferential direction under an assemble state where the stator core 52 is assembled to the stator winding 51. In this case, the straight portion 83 is provided in the radial direction between the rotor 40 and the stator core 52 which functions as a back yoke. Thus, an appropriate magnetic circuit can be obtained even if there is no teeth between the straight portions 83.

The stator winding 51 is sealed by the sealing portion 57, whereby an insulating member is provided between the straight portions 83 adjacent in the circumferential direction in the stator winding 51. Even if the straight portions 83 are arranged in the mutually near positions in the circumferential direction, a preferable insulation in the straight portions 83 is thus securable.

Since the conductor 82 is flattened in the stator winding 51 to reduce the radial thickness (i.e., the length in the radial direction) of the straight portion 83, the radial center position of the straight portion 83 can be close to the magnet unit 42 of the rotor 40. This can enhance the torque by increasing the magnetic flux density in the straight portion 83 of the stator winding 51 while suppressing the magnetic saturation in the stator 50 by adopting the slotless structure. Further, as described above, since the straight portions 83 adjacent in the circumferential direction can be brought close to each other, the conductor cross-sectional area can be secured even if the conductors 82 are flattened.

Since each conductor 82 of the stator winding 51 is an assembly of a plurality of wires 86, the current flow path in the conductor 82 can be thinned. Thus, even if an eddy current is generated when the magnetic field from the magnet unit 42 links the conductor 82, the eddy current suppression effect of the conductor 82 on the eddy current can be obtained. As a result, the eddy current flowing in the conductor 82 can be reduced.

In addition, each conductor 82 is formed by twisting the wires 86. Thus, in each of the wires 86, portions where the application direction of the magnetic field is opposite to each other appear; thus, the back electromotive force caused by the interlinking magnetic field is canceled. As a result, the reduction effect of the eddy current flowing in the conductor 82 can be enhanced.

Since each wire 86 is made of the fibrous conductive materials 87, the current flow path in the conductor 82 can be further thinned, and the number of times of twisting of the current flow path can be further increased. Thereby, the reduction effect of an eddy current can be enhanced. In addition, it is preferable that the wire 86 be made of the carbon nanotube fiber at least.

In the stator 50 having the slotless structure, the teeth are not provided; thus, the conductor area WA (in FIG. 10) being an area where the conductors 82 are present can be expanded in the circumferential direction compared to the inter-conductor area WB (in FIG. 10) being an area interposed between the conductors 82. This can achieve the configuration in which the conductor area WA is larger than the inter-conductor area WB in the circumferential direction.

Each turn portion 84 of the stator winding 51 is shifted in the radial direction and has an interference avoidance portion that avoids interference with another turn portion 84. The different turn portions 84 are thus arranged radially apart from each other. The heat dissipation can thus be improved also in the turn portions 84; as a result, the heat dissipation performance of the stator 50 can be further enhanced.

The configuration to avoid mutual interference in the turn portions 84 of the respective conductors 82 on the same pitch circle of the stator 50 is provided as follows. That is, the turn portion 84 includes (i) a first-side inclined portion 84*a* which is a portion extending in the circumferential direction on the same pitch circle; (ii) a top portion 84*b* which shifts radially inward from the same pitch circle of the first-side inclined portion 84*a* to a different pitch circle and which starts to extend in the circumferential direction on the different pitch circle; (iii) a second-side inclined portion 84*c* and (iv) a returning portion 84*d*. Thereby, mutual interference in the turn portions 84 can be properly avoided.

Further, (i) a turn portion 84 connected to the radially inner straight portion 83 among a plurality of layers of straight portions 83, and (ii) a turn portion 84 connected to the radially outer straight portion 83 are arranged radially apart from each other more than the radially inner straight portion 83 and the radially outer straight portion 83. The heat dissipation performance of the turn portions 84 can thus be enhanced.

The bending radius of the bent portion in the turn portion 84 connected to the radially inner straight portion 83 is differentiated from that in the turn portion 84 connected to the radially outer straight portion 83. The respective turn portions 84 can be suitably spaced apart.

The radial shift amount of the bent portion in the turn portion 84 connected to the radially inner straight portion 83 is differentiated from that in the turn portion 84 connected to the radially outer straight portion 83. The respective turn portions 84 can thus be suitably spaced apart.

In addition, the above-mentioned configuration may be applied to a rotating electrical machine of an inner rotor configuration (internal rotation configuration). In this case, for example, in the housing 30, the stator 50 is arranged to be radially outside the rotor 40. Then, the inverter unit 60 may be arranged to be radially inside the rotor 40.

(Control System of Rotating Electrical Machine)

Figure 19:
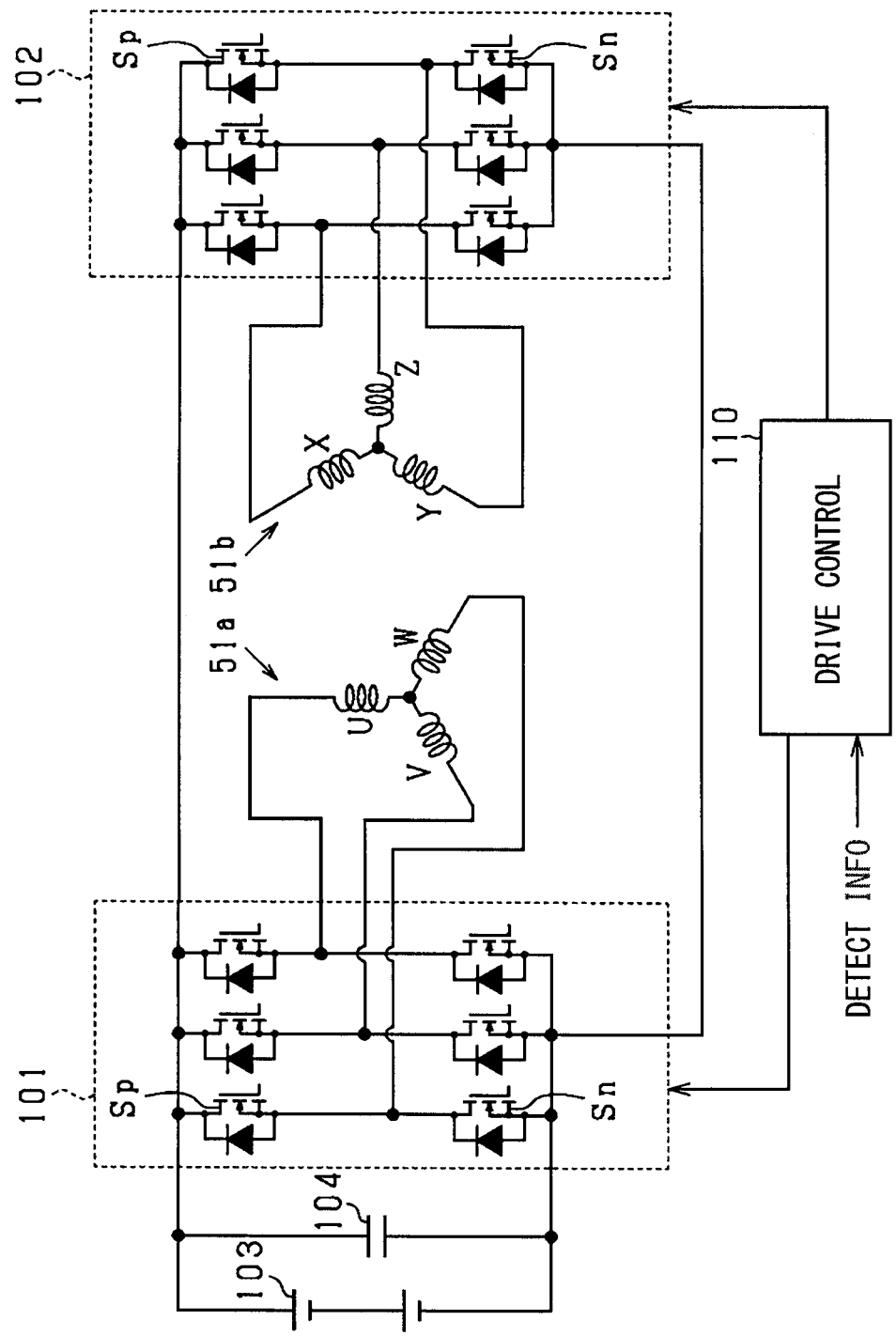
FIG. 19 is an electric circuit diagram of a control system of a rotating electrical machine.
Figure 20:
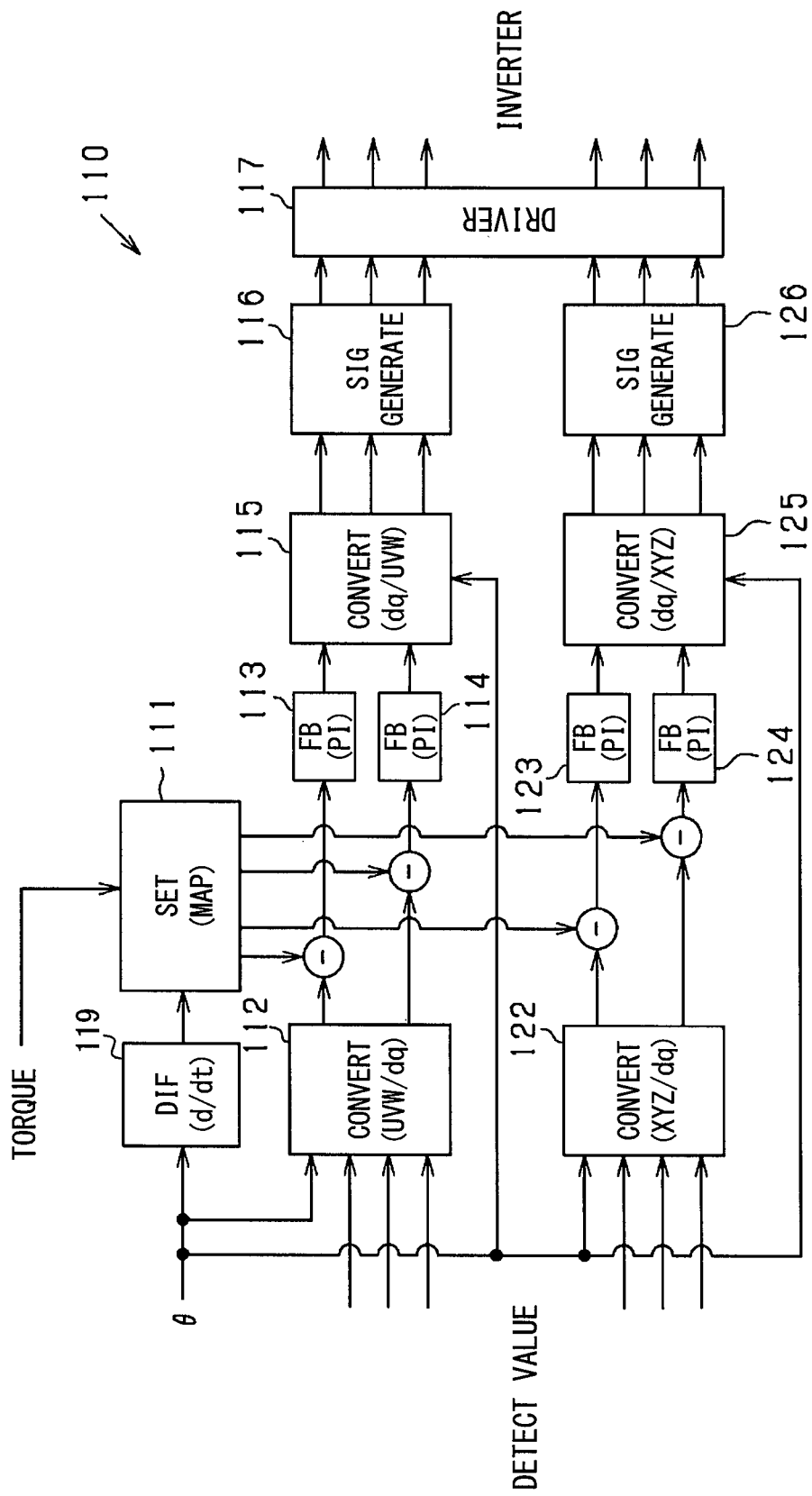
FIG. 20 is a functional block diagram showing current feedback control processing by a control apparatus.
Figure 21:
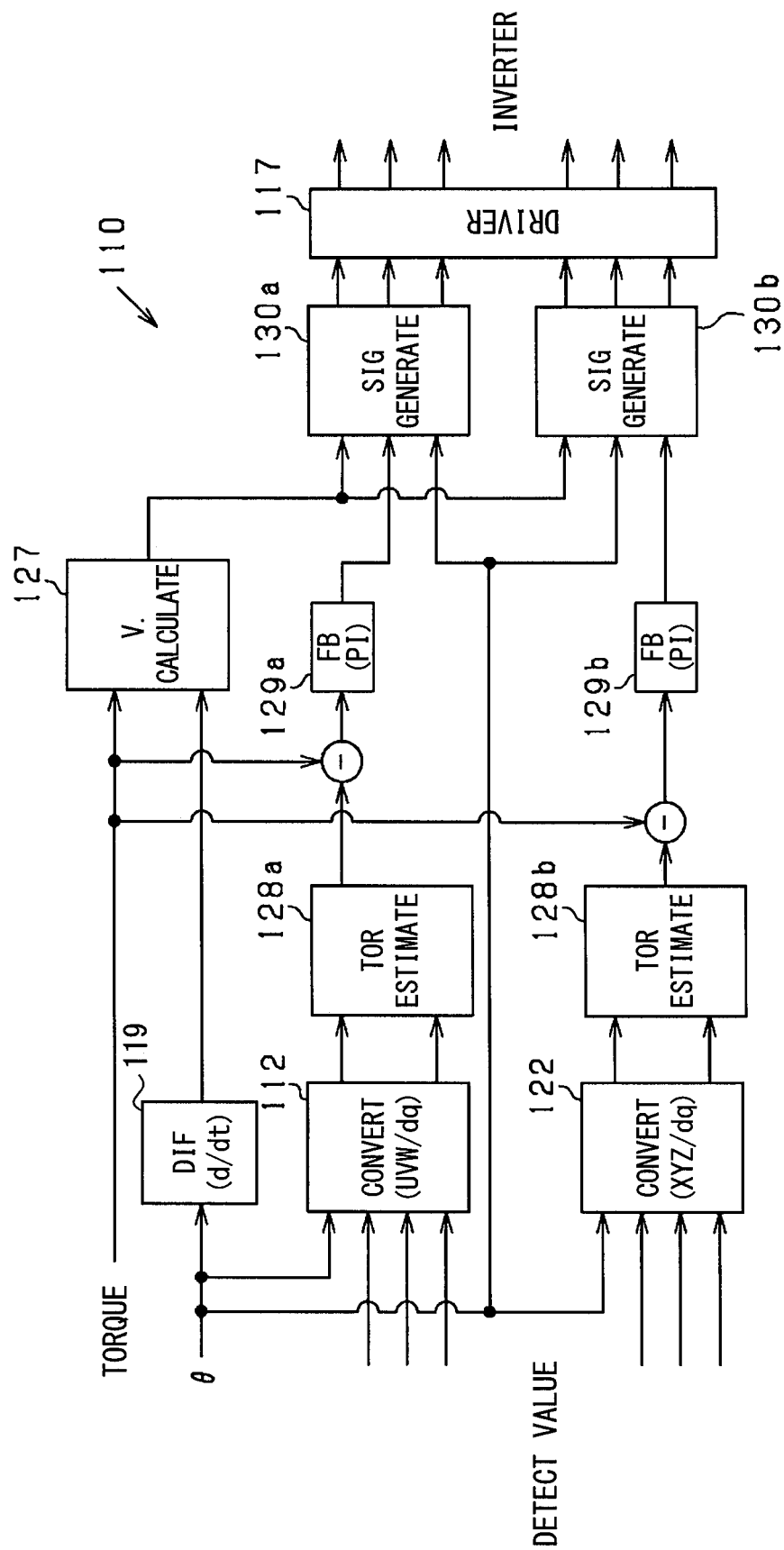
FIG. 21 is a functional block diagram showing a torque feedback control processing by a control apparatus.

The configuration of a control system that controls the rotating electrical machine 10 will be described with reference to FIGS. 19 to 21. FIG. 19 is an electric circuit diagram of a control system of the rotating electrical machine 10. FIG. 20 is a functional block diagram showing a current feedback control process by a drive control unit 110. FIG. 21 is a functional block diagram showing a torque feedback control process by the drive control unit 110.

In FIG. 19, a first three-phase winding 51*a* and a second three-phase winding 51*b* are shown as the stator winding 51. The first three-phase winding 51*a* includes a U-phase winding, a V-phase winding, and a W-phase winding. The second three-phase winding 51*b* includes an X-phase winding, a Y-phase winding, and a Z-phase winding. A first inverter 101 and a second inverter 102 are provided for the first three-phase winding 51*a* and the second three-phase winding 51*b*, respectively. The inverters 101 and 102 are configured by a full bridge circuit having upper and lower arms the number of which is equal to the number of phases of the phase winding. A conduction current is adjusted in each phase winding of the stator winding 51 by turning on and off a switch (semiconductor switching element) provided in each arm.

A direct current (DC) power supply 103 and a smoothing capacitor 104 are connected in parallel in each of the inverters 101 and 102. The direct current (DC) power supply 103 is configured by, for example, a battery pack in which a plurality of unit cells are connected in series. The switches of the inverters 101 and 102 correspond to the semiconductor module 66 shown in FIG. 1 and the like; the capacitor 104 corresponds to the capacitor module 68 shown in FIG. 1 or the like.

The drive control unit 110 may be also referred to as a drive controller or a motor driver. The drive control unit 110 includes a microcomputer having a CPU and various memories, performs energization control by turning on and off each switch in the inverters 101 and 102 based on various detection information in the rotating electrical machine 10 and a request for power running drive and electric-power generating. The drive control unit 110 is equivalent to the control device 77 shown in FIG. 6. The detection information of the rotating electrical machine 10 includes, for example, (i) the rotation angle (electrical angle information) of the rotor 40 detected by an angle detector such as a resolver, and (ii) a power supply voltage (inverter input voltage) detected by the voltage sensor and (iii) a conduction current of each phase detected by the current sensor. The drive control unit 110 generates and outputs operation signals for operating the switches of the inverters 101 and 102. The electric-power generating request is, for example, a request for regenerative drive when the rotating electrical machine 10 is used as a vehicle power source.

The first inverter 101 is provided with a series connection of an upper arm switch Sp and a lower arm switch Sn in each of three phases consisting of a U phase, a V phase and a W phase. The high potential terminal of the upper arm switch Sp of each phase is connected to the positive terminal of the DC power supply 103, and the low potential terminal of the lower arm switch Sn of each phase is connected to the negative terminal (ground) of the DC power supply 103. One end of each of a U-phase winding, a V-phase winding, and a W-phase winding is connected to an intermediate connection point between the upper arm switch Sp and the lower arm switch Sn of each phase. These respective phase windings are star-connected (Y-connected), and the other ends of the respective phase windings are connected to each other at a neutral point.

The second inverter 102 has a configuration similar to that of the first inverter 101, and includes a series connection of an upper arm switch Sp and a lower arm switch Sn in each of three phases consisting of an X phase, a Y phase, and a Z phase. The high potential terminal of the upper arm switch Sp of each phase is connected to the positive terminal of the DC power supply 103, and the low potential terminal of the lower arm switch Sn of each phase is connected to the negative terminal (ground) of the DC power supply 103. One end of each of an X-phase winding, a Y-phase winding, and a Z-phase winding is connected to an intermediate connection point between the upper arm switch Sp and the lower arm switch Sn of each phase. These respective phase windings are star-connected (Y-connected), and the other ends of the respective phase windings are connected to each other at a neutral point.

FIG. 20 shows current feedback control processing for controlling each phase current of U, V and W phases, and current feedback control processing for controlling each phase current of X, Y and Z phases. Here, first, control processing on the U, V, and W phases will be described.

In FIG. 20, a current command value setting unit 111 sets a d-axis current command value and a q-axis current command value by using a torque-dq map based on (i) a power running torque command value or an electric-power generating torque command value for the rotating electrical machine 10, or (ii) an electrical angular velocity ω obtained through time differentiation of electrical angle θ by a differential unit 119. The current command value setting unit 111 is provided in common for each of the U, V, W phase and the X, Y, Z phase. The electric-power generating torque command value is, for example, a regenerative torque command value when the rotating electrical machine 10 is used as a vehicle power source.

The dq conversion unit 112 converts the current detection value (each phase current) by the current sensor provided for each phase into the d-axis current and the q-axis current, which are components of the orthogonal two-dimensional rotational coordinate system where the field direction is the d axis.

The d-axis current feedback control unit 113 calculates a d-axis command voltage as an operation amount for feedback controlling the d-axis current to the d-axis current command value. The q-axis current feedback control unit 114 calculates a q-axis command voltage as an operation amount for feedback controlling the q-axis current to the q-axis current command value. Each of these feedback control units 113 and 114 calculates a command voltage using a PI feedback method based on the deviation of the d-axis current and the q-axis current from the current command value.

The three-phase conversion unit 115 converts the d-axis and q-axis command voltages into U-phase, V-phase, and W-phase command voltages. Each of the units 111 to 115 described above is a feedback control unit that performs feedback control of the fundamental wave current according to the dq conversion theory; the command voltages of the U phase, the V phase and the W phase are feedback control values.

The operation signal generation unit 116 generates an operation signal of the first inverter 101 based on the three-phase command voltage using a known triangular wave carrier comparison method. Specifically, the operation signal generation unit 116 generates a switch operation signal (duty signal) of the upper and lower arms in each phase by the PWM control based on the comparison in the magnitude between (i) the signal obtained by standardizing the three-phase command voltage with the power supply voltage and (ii) the carrier signal such as a triangular wave signal.

In addition, the same configuration is provided for the X, Y, Z phase. That is, the dq conversion unit 122 converts the current detection value (each phase current) by the current sensor provided for each phase into the d-axis current and the q-axis current which are components of the orthogonal two-dimensional rotational coordinate system where the field direction is the d axis.

The d-axis current feedback control unit 123 calculates the d-axis command voltage; the q-axis current feedback control unit 124 calculates the q-axis command voltage. The three-phase conversion unit 125 converts the d-axis and q-axis command voltages into X-phase, Y-phase, and Z-phase command voltages. Then, the operation signal generation unit 126 generates an operation signal of the second inverter 102 based on the three-phase command voltages. Specifically, the operation signal generation unit 126 generates switch operation signal (duty signal) of the upper and lower arms in each phase by the PWM control based on the comparison in the magnitude between (i) the signal obtained by standardizing the three-phase command voltage with the power supply voltage and (ii) the carrier signal such as a triangular wave signal.

The driver 117 turns on and off the three-phase switches Sp and Sn in the inverters 101 and 102 based on the switch operation signals generated by the operation signal generation units 116 and 126.

Subsequently, torque feedback control processing will be described. This process is mainly used for the purpose of increasing the output of the rotating electrical machine 10 and reducing the loss under operating conditions, such as a high rotation area and a high output area, in which the output voltage of each of the inverters 101 and 102 is increased. The drive control unit 110 selects and executes either (i) the torque feedback control processing or (ii) the current feedback control processing, based on the operating conditions of the rotating electrical machine 10.

FIG. 21 shows torque feedback control processing corresponding to the U, V, and W phases, and torque feedback control processing corresponding to the X, Y, and Z phases. In FIG. 21, the same components as in FIG. 20 are assigned the same reference signs and descriptions thereof will be omitted. Here, first, control processing on the U, V, and W phases will be described.

The voltage amplitude calculation unit 127 calculates a voltage amplitude command, which is a command value of the magnitude of the voltage vector, based on (i) a power running torque command value or an electric-power generating torque command value for the rotating electrical machine 10 and (ii) an electric angular velocity w obtained by time-differentiating the electrical angle θ.

The torque estimation unit 128a calculates a torque estimated value corresponding to the U, V, and W phases based on the d-axis current and the q-axis current converted by the dq conversion unit 112. The torque estimation unit 128a may calculate the voltage amplitude command based on the map information in which the d-axis current, the q-axis current, and the voltage amplitude command are associated.

The torque feedback control unit 129a calculates a voltage phase command that is a command value of the phase of the voltage vector, as an operation amount for feedback controlling the torque estimated value to the power running torque command value or the electric-power generating torque command value. The torque feedback control unit 129a calculates a voltage phase command using a PI feedback method based on the deviation of the torque estimated value against the power running torque command value or the electric-power generating torque command value.

The operation signal generation unit 130a generates an operation signal of the first inverter 101 based on the voltage amplitude command, the voltage phase command, and the electrical angle θ. Specifically, the operation signal generation unit 130a calculates three-phase command voltages based on the voltage amplitude command, voltage phase command, and electrical angle θ; further, the operation signal generation unit 130a generates a switch operation signal of the upper and lower arms in each phase by the PWM control based on the comparison in the magnitude between (i) the signal obtained by standardizing the calculated three-phase command voltages with the power supply voltage and (ii) the carrier signal such as a triangular wave signal.

Incidentally, the operation signal generation unit 130a may generate a switch operation signal based on (i) pulse pattern information which is map information in which a voltage amplitude command, a voltage phase command, an electrical angle θ, and a switch operation signal are associated, (ii) a voltage amplitude command, (iii) a voltage phase command, and (iv) an electrical angle θ.

In addition, the same configuration is provided for the X, Y, Z phase. That is, the torque estimation unit 128b calculates a torque estimated value corresponding to the X, Y, Z phases based on the d-axis current and the q-axis current converted by the dq conversion unit 122.

The torque feedback control unit 129b calculates a voltage phase command as an operation amount for performing feedback control of the torque estimated value to the power running torque command value or the electric-power generating torque command value. The torque feedback control unit 129b calculates a voltage phase command using a PI feedback method based on the deviation of the torque estimated value against the power running torque command value or the electric-power generating torque command value.

The operation signal generation unit 130b generates an operation signal of the second inverter 102 based on the voltage amplitude command, the voltage phase command, and the electrical angle θ. Specifically, the operation signal generation unit 130b calculates three-phase command voltages based on the voltage amplitude command, voltage phase command, and electrical angle θ; further, the operation signal generation unit 130b generates a switch operation signal of the upper and lower arms in each phase by the PWM control based on the comparison in the magnitude between (i) the signal obtained by standardizing the calculated three-phase command voltages with the power supply voltage and (ii) the carrier signal such as a triangular wave signal. The driver 117 turns on and off the three-phase switches Sp and Sn in the inverters 101 and 102 based on the switch operation signals generated by the operation signal generation units 130a and 130b.

Incidentally, the operation signal generation unit 130b may generate a switch operation signal based on (i) pulse pattern information which is map information in which a voltage amplitude command, a voltage phase command, an electrical angle θ, and a switch operation signal are associated, (ii) a voltage amplitude command, (iii) a voltage phase command, and (iv) an electrical angle θ.

(Control Apparatus and Vehicle Drive System)

Figure 22:
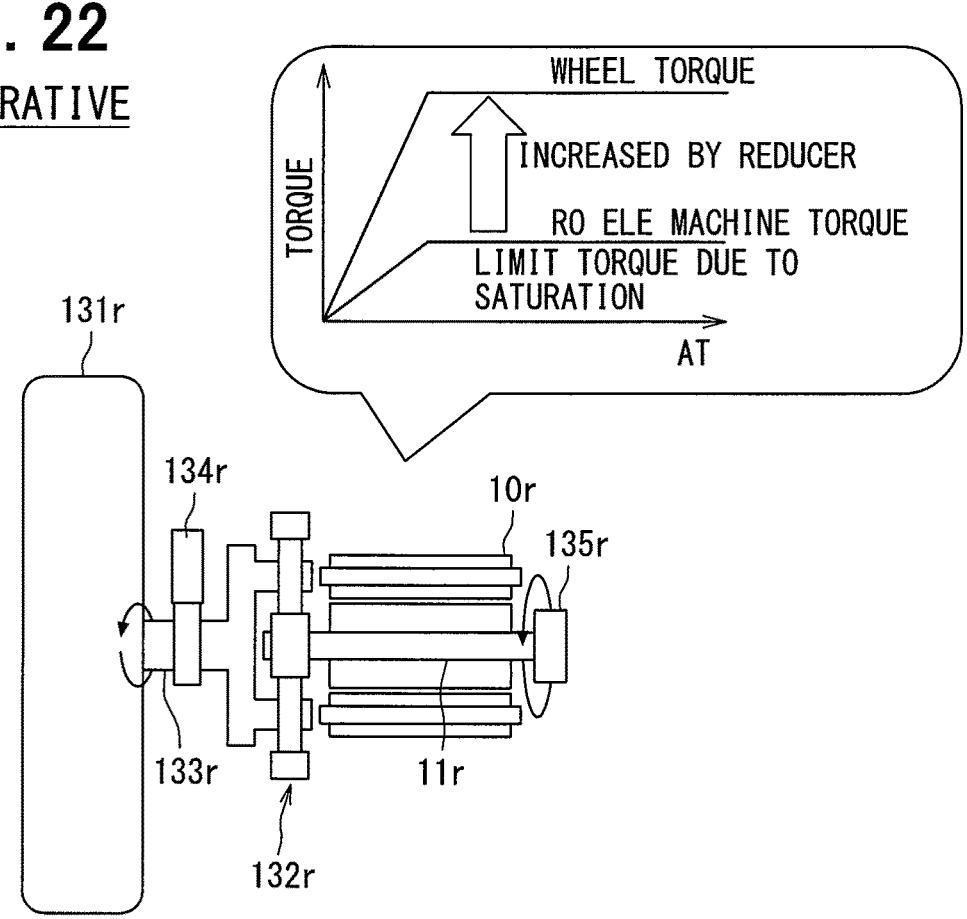
FIG. 22 shows a comparative example.
Figure 23:
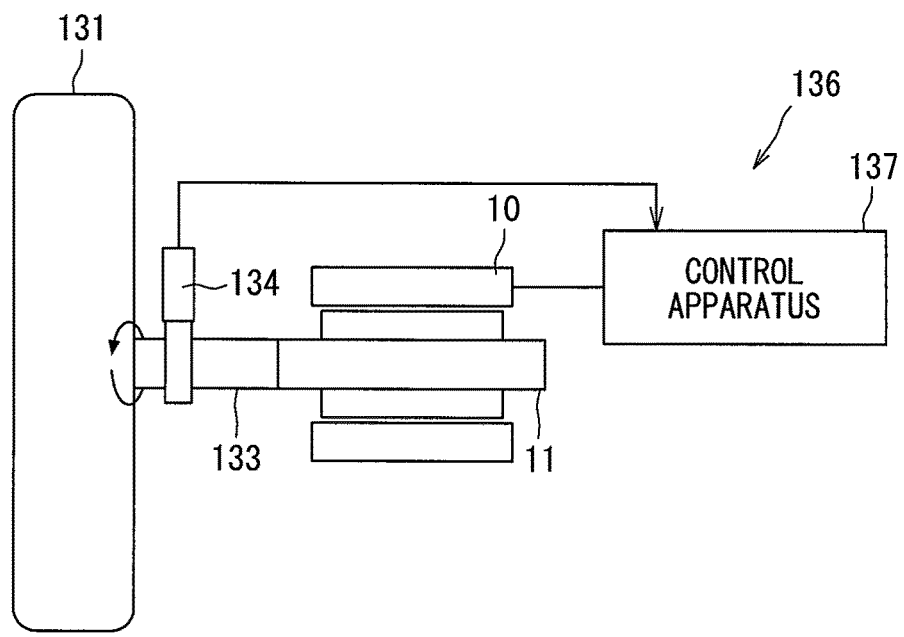
FIG. 23 is a diagram showing a vehicle drive system according to the first embodiment.

The control apparatus and the vehicle drive system will be described based on FIGS. 22 to 24. FIG. 22 and FIG. 23 shows a rotating electrical machine of inner rotor structure for convenience. However, it is also possible to apply to the outer rotor structure shown in FIG. 1 or the like. A comparative example shown in FIG. 22 assigns a reference sign obtained by adding r to the end of the reference sign of the element shown in the present embodiment.

The rotating electrical machine 10r according to a comparative example shown in FIG. 22 has a known configuration; the torque of the rotating electrical machine 10r is limited due to magnetic saturation. For this reason, a speed reducer 132r such as a planetary gear is provided between the wheel 131r and the rotating electrical machine 10r to amplify torque up to the wheel torque (torque required of the vehicle) required by the speed reducer 132r. The rotating shaft 11r of the rotating electrical machine 10r is connected to an axle 133r via the speed reducer 132r. The rotation speed of the wheel 131r is detected by a wheel speed sensor 134r, and the rotation angle (electrical angle) of the rotor of the rotating electrical machine 10r is detected by a rotation angle sensor 135r.

As described above, in the configuration using the known rotating electrical machine 10r, a difference in the number of rotations corresponding to the speed reduction ratio occurs between the rotating electrical machine 10r and the wheel 131r. For example, the speed reduction ratio is set to about 10. In addition, a magnetoresistive element (MR element) is generally used as the wheel speed sensor 134r, and a resolver is used as the rotation angle sensor 135r. The resolution of the wheel speed sensor 134r is lower than that of the resolver. Therefore, in order to use the wheel speed sensor 134r instead of the rotation angle sensor 135r, it is necessary to increase the resolution of the wheel speed sensor 134r, which causes an issue such as an increase in manufacturing cost and an increase in size.

In contrast, in the rotating electrical machine 10 of the present embodiment, the magnetic saturation is suppressed by the slotless structure or the like as described above, and the torque is enhanced (see FIG. 7). The present embodiment can therefore provide a configuration in which a speed reducer is not disposed between the rotating electrical machine 10 and the wheel 131, or a configuration in which the reduction ratio is less than that in a known art even if a speed reducer is disposed. In the present embodiment, as shown in FIG. 23, a speed reducer is not interposed between the rotating electrical machine 10 and the wheel 131. The rotating shaft 11 of the rotating electrical machine 10 is connected to the axle 133 without a speed reducer; thus, the rotation speed of the rotating electrical machine 10 is substantially the same as the rotation speed of the wheel 131.

The vehicle drive system 136 includes the rotating electrical machine 10 and a control apparatus 137. The rotating electrical machine 10 does not have a rotation angle sensor (resolver). That is, the sensorless rotating electrical machine 10 is employed.

Figure 24:
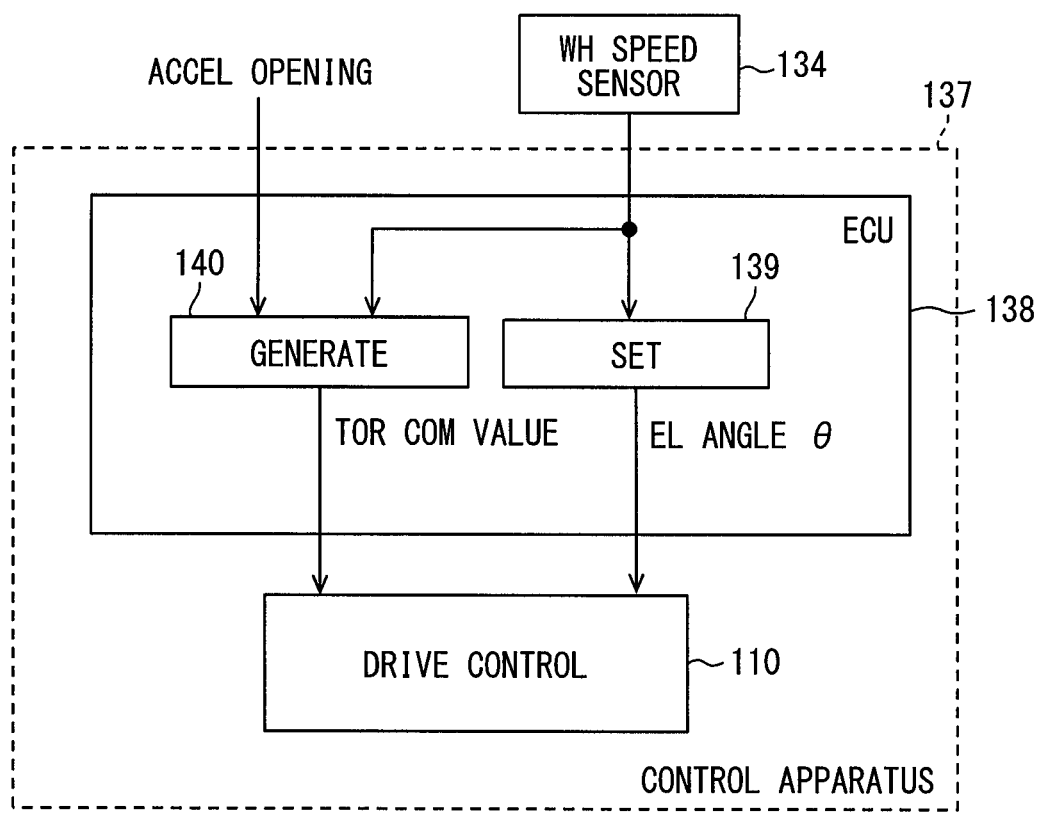
FIG. 24 is a functional block diagram showing a control apparatus.

As shown in FIG. 24, the control apparatus 137 is configured to include the drive control unit 110 described above and an ECU 138. ECU is an abbreviation of "Electronic Control Unit". The ECU 138 may be also referred to as an electronic control circuit. The ECU 138 includes a setting unit 139 and a command generation unit 140. The setting unit 139 may be also referred to as a setting circuit 139 or a rotation angle setting circuit 139. The command generation unit 139 may be also referred to as a command generation circuit 140. As one example of the present embodiment, the ECU 138 may be configured to include at least one microcomputer; however, there is no need to be limited thereto. In other words, the ECU 138 may be provided not only as a single ECU but also as a plurality of ECUs (i.e., at least one ECU) to provide a plurality of functions; the ECU 138 includes units or circuits to achieve the respective functions. An individual one of the units or circuits in the ECU 138 or an individual ECU of the at least one ECU 138 may be configured to include any one of (i) a hardware circuit including an analog and/or a digital circuit, (ii) a central processing unit along with memory storing instructions executed by the central processing unit, and (iii) the hardware circuit and the central processing unit along with memory.

The setting unit 139 estimates the electrical angle θ based on the detection value of the wheel speed sensor 134, and sets the estimated value as the electrical angle θ. Then, the set electrical angle θ (estimated value) is output to the drive control unit 110. The command generation unit 140 generates a torque command value based on the detection value of the wheel speed sensor 134 and the accelerator opening degree. Then, the generated torque command value is output to the drive control unit 110.

As described above, the drive control unit 110 controls the drive of the rotating electrical machine 10 based on the torque command value generated by the ECU 138 and the electrical angle θ set by the ECU 138.

Thus, in the present embodiment, for example, since there is no magnetic saturation at the teeth of the magnetic body, the maximum torque of the rotating electrical machine 10 can be increased. That is, it is possible to increase the torque of the rotating electrical machine 10. The use of such a rotating electrical machine 10 can provide a configuration in which no speed reducer is disposed between the rotating electrical machine 10 and the wheel 131, or a configuration in which the reduction ratio is less than that in a known art can be achieved even if the speed reducer is disposed. As a result, the difference in rotation speed between the wheel 131 and the rotating electrical machine 10 disappears or becomes less than in a known art. Therefore, even if the wheel speed sensor 134 does not have high resolution, the electrical angle θ can be estimated based on the output of the wheel speed sensor 134, and the rotating electrical machine 10 can thereby be controlled. In addition, since it is not necessary to provide a rotation angle sensor such as a resolver, it is possible to reduce the number of parts and the cost.

The control apparatus 137 may include at least the setting unit 139 and the drive control unit 110. The setting unit 139 may be integrated with the circuit including the drive control unit 110, without the ECU 138.

Thus, the vehicle drive system 136 may include a wheel speed sensor 134 in addition to the rotating electrical machine 10 and the control apparatus 137. The number of wheel speed sensors 134 is not limited to one, and may be several.

Second Embodiment

The present embodiment can refer to the preceding embodiment. Therefore, the description of the parts common to the rotating electrical machine 10, the vehicle drive system 136, and the control apparatus 137 shown in the preceding embodiment will be omitted.

Figure 25:
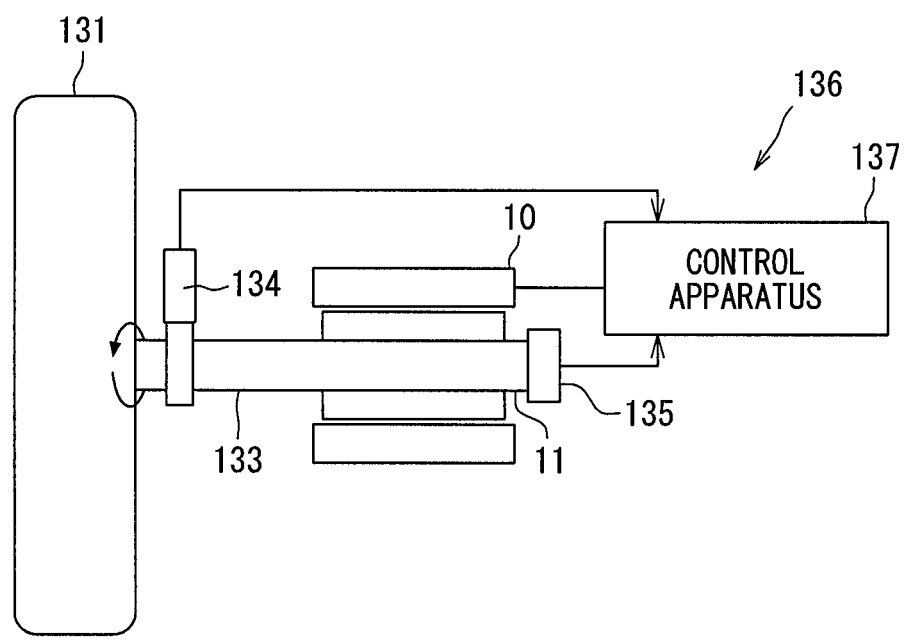
FIG. 25 is a diagram showing a vehicle drive system according to a second embodiment.

As shown in FIG. 25, the rotating electrical machine 10 of the present embodiment includes a rotation angle sensor 135. The rotation angle sensor 135 may employ a resolver or a Hall sensor using a Hall element.

Figure 26:
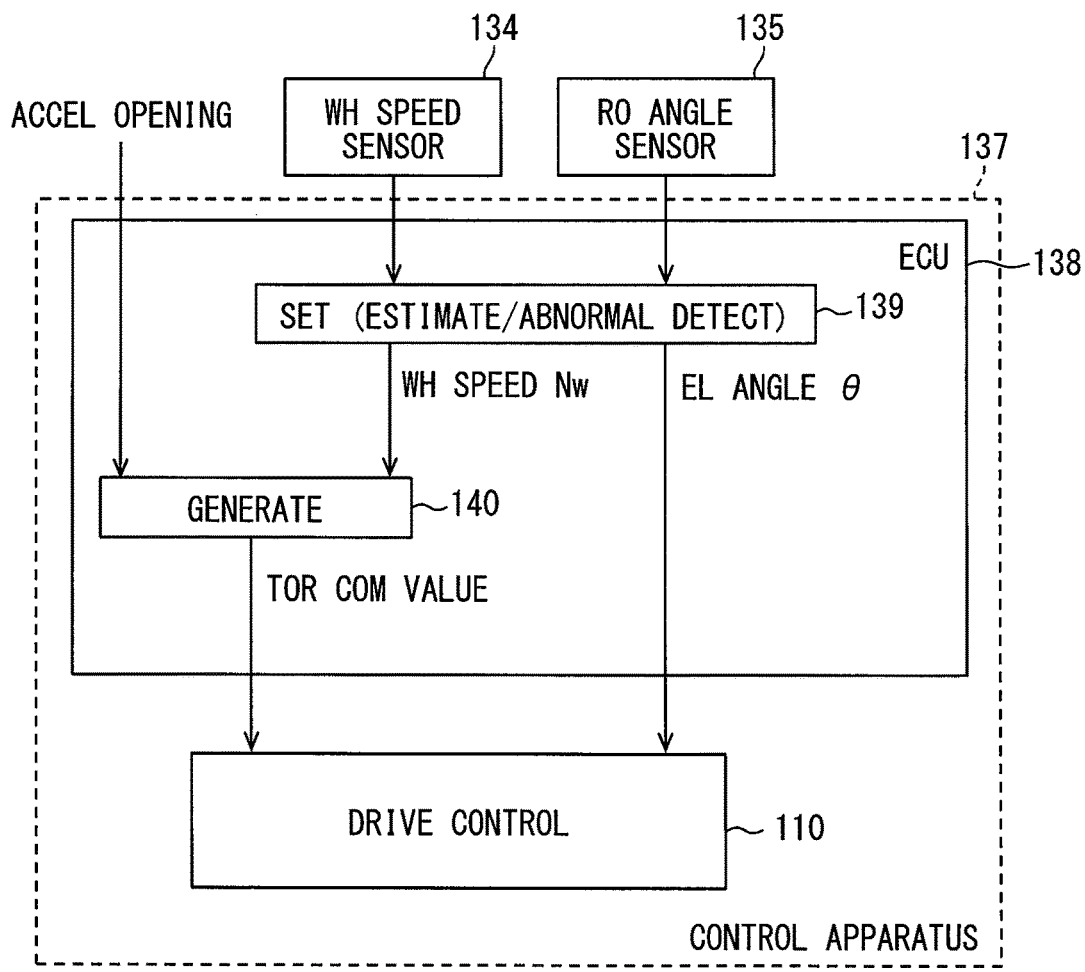
FIG. 26 is a functional block diagram showing a control apparatus.

The setting unit 139 of the present embodiment has a plurality of functions in addition to the functions of estimating and setting the electrical angle θ from the detection value of the wheel speed sensor 134. As shown in FIG. 26, the setting unit 139 has a function of estimating the wheel speed Nw from the detection value of the rotation angle sensor 135. The setting unit 139 has a function of detecting that either (i) the wheel speed sensor 134 or (ii) the rotation angle sensor 135 has an abnormality based on the detection value of the wheel speed sensor 134 and the detection value of the rotation angle sensor 135.

The setting unit 139 sets the electrical angle θ based on the detection value of the rotation angle sensor 135 when the rotation angle sensor 135 is normal. In contrast, the setting unit 139 sets a rotation angle based on an estimated value of the electrical angle which is estimated by using the wheel speed sensor 134 when the rotation angle sensor 135 is abnormal. Further, the setting unit 139 sets the wheel speed Nw based on the detection value of the wheel speed sensor 134 when the wheel speed sensor 134 is normal. In contrast, the setting unit 139 sets a wheel speed based on an estimated value of the wheel speed which is estimated by using the rotation angle sensor 135 when the wheel speed sensor 134 is abnormal.

Thus, the setting unit 139 detects an abnormality in the wheel speed sensor 134 or the rotation angle sensor 135, and sets an electrical angle θ and a wheel speed Nw according to the occurrence state of the abnormality. Then, the set electrical angle θ and the wheel speed Nw are output.

The command generation unit 140 generates a torque command value based on the accelerator opening and the wheel speed Nw set by the setting unit 139, and outputs the generated torque command value to the drive control unit 110. Therefore, the command generation unit 140 may also function a process execution unit (or a process execution circuit) that executes a predetermined process based on the wheel speed Nw set by the setting unit 139. The drive control unit 110 controls the drive of the rotating electrical machine 10 based on (i) the torque command value generated by the command generation unit 140 and (ii) the electrical angle θ set by setting unit 139.

Figure 27:
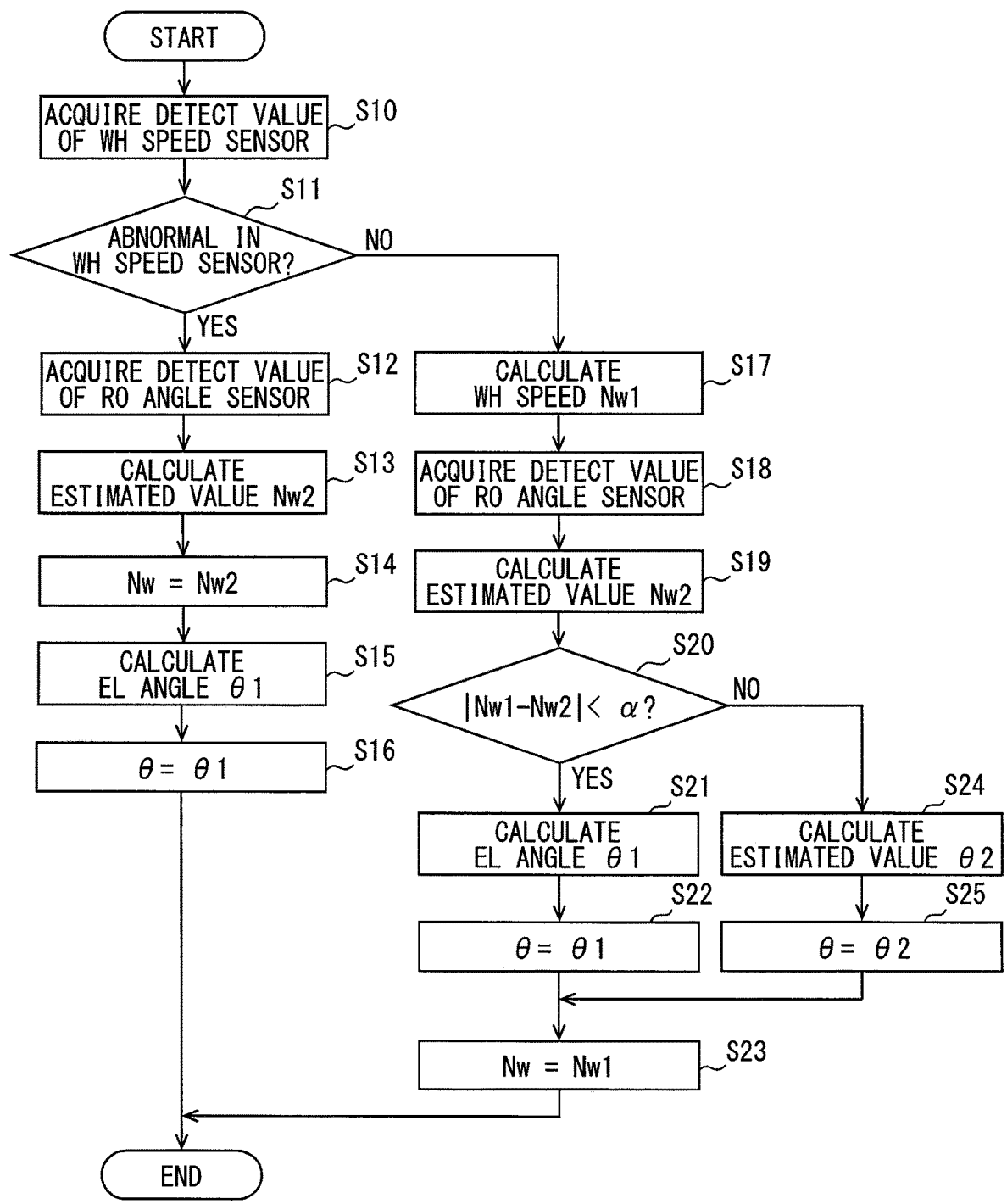
FIG. 27 is a flowchart diagram illustrating processing executed by a setting unit.

FIG. 27 is a flowchart showing processing performed by the setting unit 139. The setting unit 139 repeatedly executes the processing described below in a predetermined cycle. The following will illustrate an example in which the wheel speed sensor 134 has an abnormality self-diagnosis function. Further, an example will be illustrated in which a comparison target of abnormality detection is a wheel speed.

First, the setting unit 139 acquires the detection value of the wheel speed sensor 134 (S10). Then, based on the acquired detected value, it is determined whether or not an abnormality occurs in the wheel speed sensor 134 (S11). As described above, the wheel speed sensor 134 has a self-diagnosis function (an abnormality detection function of its own), and the output of the wheel speed sensor 134 includes information indicating whether the wheel speed sensor 134 itself is abnormal or not. The wheel speed sensor 134 can self-diagnose the presence or absence of an abnormality, for example, by comparison between a detection value at the time of stop of the vehicle and a threshold value or by comparison between estimated vehicle speeds based on an onboard camera and GPS data. The setting unit 139 can determine whether there is an abnormality in the wheel speed sensor 134 by acquiring the detection value of the wheel speed sensor 134.

When it is determined that the wheel speed sensor 134 has an abnormality, the setting unit 139 acquires a detection value of the rotation angle sensor 135 (S12). Then, the estimated value Nw2 of the wheel speed is calculated based on the acquired detected value (S13), and the estimated value Nw2 is set as the wheel speed Nw (S14). Further, the setting unit 139 calculates the electrical angle θ1 based on the detection value of the rotation angle sensor 135 acquired in S12 (S15), and sets the calculated electrical angle θ1 as the electrical angle θ (S16).

As described above, when there is an abnormality in the wheel speed sensor 134, the setting unit 139 sets and outputs the estimated wheel speed Nw2 and the electrical angle θ1 based on the detection value. After the processing in S16 is performed, a series of processing are ended.

In contrast, when it is determined in S11 that no abnormality occurs in the wheel speed sensor 134, the setting unit 139 calculates the wheel speed Nw1 based on the detection value of the wheel speed sensor 134 acquired in S10 (S17). Next, the setting unit 139 acquires the detection value of the rotation angle sensor 135 (S18), and calculates the estimated value Nw2 of the wheel speed based on the acquired detection value (S19). Then, it is determined whether the absolute value of the difference between the wheel speeds Nw1 and Nw2 is less than a predetermined value α set in advance, that is, whether the rotation angle sensor 135 is normal (S20). The absolute value of the difference between the wheel speeds Nw1 and Nw2 is hereinafter simply referred to as a difference.

When it is determined that the difference is less than the predetermined value α, that is, the rotation angle sensor 135 is normal, the setting unit 139 calculates the electrical angle θ1 based on the detection value of the rotation angle sensor 135 acquired in S18 (S21) and sets the electrical angle θ1 as the electrical angle θ (S22). Next, the setting unit 139 sets the value Nw1 calculated in S17 as the wheel speed Nw (S23).

As described above, when no abnormality occurs in any of the wheel speed sensor 134 and the rotation angle sensor 135, the setting unit 139 sets and outputs the wheel speed Nw1 based on the detected value and the electrical angle θ1 based on the detected value. After the processing in S23 is performed, a series of processing are ended.

In contrast, when it is determined that the difference is equal to or greater than the predetermined value α, that is, the rotation angle sensor 135 is abnormal, the setting unit 139 calculates the estimated value θ2 of the electrical angle based on the detection value of the wheel speed sensor 134 acquired in S10 (S24), and sets the electrical angle θ based on or by using the estimated value θ2 (S25). Next, the setting unit 139 executes the processing in S23 described above.

As described above, when an abnormality occurs in the rotation angle sensor 135, the setting unit 139 sets and outputs the wheel speed Nw1 based on the detection value and the estimated electrical angle θ2.

When no abnormality occurs in the wheel speed sensor 134 and the rotation angle sensor 135, the drive control unit 110 controls the drive of the rotating electrical machine 10 using the torque command value set based on the detection value of the wheel speed sensor 134 and the electrical angle θ1 set based on the detection value of the rotation angle sensor 135. When an abnormality occurs in the wheel speed sensor 134, the drive control unit 110 controls the drive of the rotating electrical machine 10 using the torque command value set based on the wheel speed Nw2 estimated from the detection value of the rotation angle sensor 135 and the electrical angle θ1 set based on the detection value of the rotation angle sensor 135. When an abnormality occurs in the rotation angle sensor 135, the drive control unit 110 controls the drive of the rotating electrical machine 10 using the torque command value set based on the detection value of the wheel speed sensor 134 and the electrical angle θ2 estimated from the detection value of the wheel speed sensor 134.

According to the control apparatus 137 and the vehicle drive system 136 of the present embodiment, when an abnormality occurs in the wheel speed sensor 134, the rotation angle sensor 135 can be substituted. When an abnormality occurs in the rotation angle sensor 135, the wheel speed sensor 134 can be substituted. Thus, the wheel speed sensor 134 and the rotation angle sensor 135 can be substituted for each other. That is, mutual compatibility can be ensured.

Although the comparison target for abnormality detection is the wheel speed, an electrical angle (rotation angle) may be a comparison target.

Although the wheel speed sensor 134 is illustrated as having an abnormality self-diagnosis function, the rotation angle sensor 135 may have an abnormality self-diagnosis function.

The execution order of the processing by the setting unit 139 is not limited to the above example. After the end of S12, the processing in S15 and S16 may be performed before the processing in S13 and S14. Further, the processing order of S23 only need to be after the processing in S17.

Thus, the vehicle drive system 136 may include a wheel speed sensor 134 and a rotation angle sensor 135 in addition to the rotating electrical machine 10 and the control apparatus 137. The present embodiment can also be applied to a configuration including at least a plurality of wheel speed sensors 134 or at least a plurality of rotation angle sensors 135. For example, in a configuration including a plurality of wheel speed sensors 134 and one rotation angle sensor 135, when an abnormality occurs in a plurality of wheel speed sensors 134, the rotation angle sensor 135 can be substituted.

Although the example of the command generation unit 140 which generates a torque command value as a process execution unit is described, there is no need to be limited to this. The process execution unit may be any unit that executes a predetermined process based on the wheel speed set by the setting unit 139. For example, the processing execution unit may be a brake control unit that executes brake control of the vehicle, an orientation control unit that controls the orientation of the vehicle, or the like. Along with the command generation unit 140, another process execution unit may be included.

When an abnormality is detected in the wheel speed sensor 134 or the rotation angle sensor 135, the occupant may be notified that an abnormality has occurred. In a vehicle having an automatic driving function or a driving support function such as cruise control, the driving authority may be transferred to the driver when an abnormality is detected. In addition, when an abnormality is detected, it may be made to shift to evacuation travel. For example, as described above, when one of the wheel speed sensor 134 and the rotation angle sensor 135 has an abnormality, the other one (being normal) is substituted for the one (being abnormal). Such a substitution may be used or allowed only at the time of the evacuation travel.

Third Embodiment

The present embodiment can refer to the preceding embodiments. Therefore, the description of the parts common to the rotating electrical machine 10, the vehicle drive system 136, and the control apparatus 137 shown in the preceding embodiments will be omitted.

Figure 28:
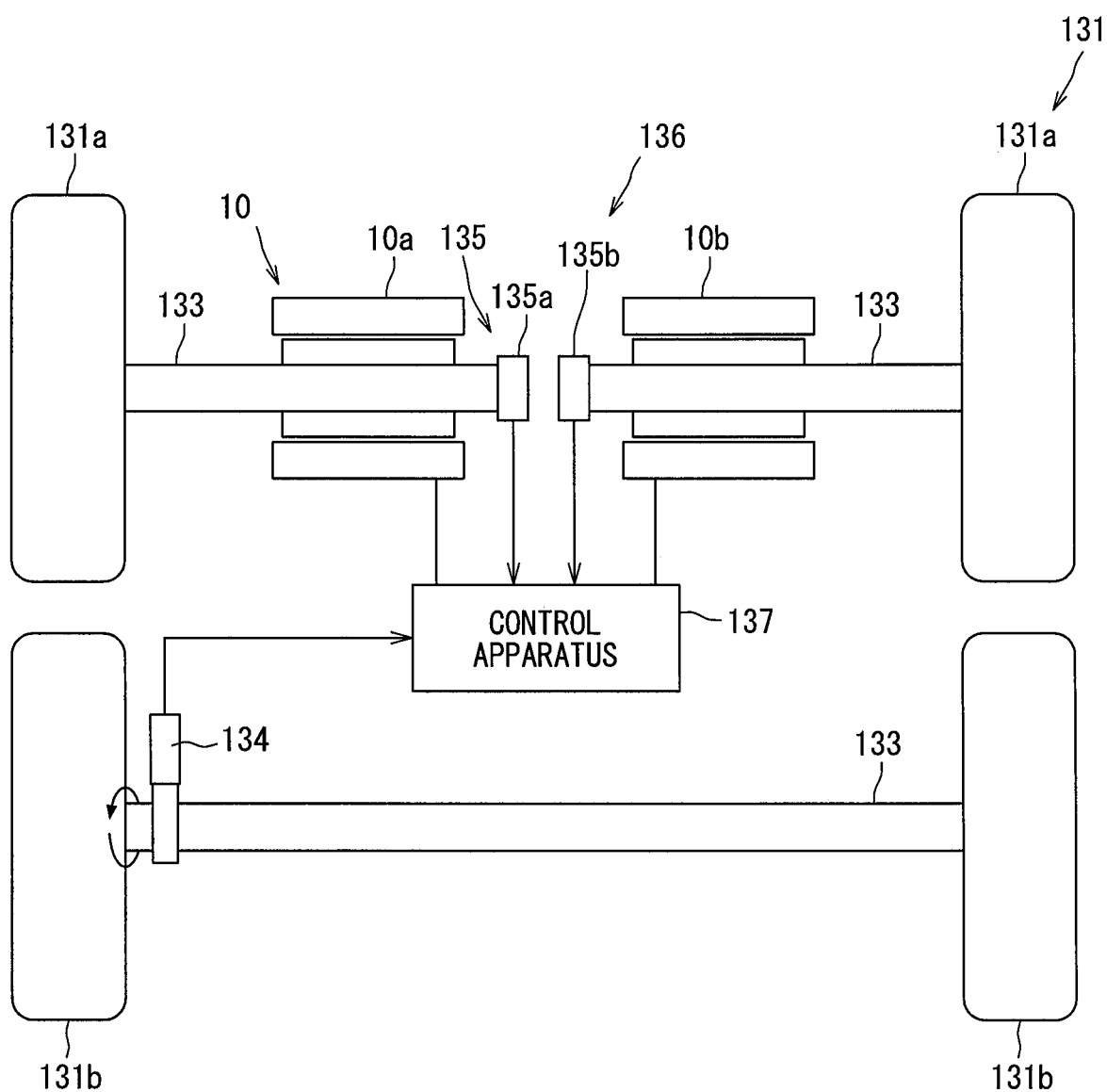
FIG. 28 is a diagram showing a vehicle drive system according to a third embodiment.

As shown in FIG. 28, in the present embodiment, four wheels 131 are included in a vehicle. A front wheel 131a at the front of the vehicle is a driving wheel; a rear wheel 131b at the rear of the vehicle is a driven wheel. The vehicle is provided with two rotating electrical machines 10 respectively including corresponding rotation angle sensors 135. Hereinafter, a first one of the rotating electrical machines 10 is also referred to as a (first) rotating electrical machine 10a, and a second one is also referred to as a (second) rotating electrical machine 10b. Further, a first one of the rotation angle sensors 135 is also referred to as a first rotation angle sensor 135a, and a second one of the rotation angle sensors 135 is also referred to as a second rotation angle sensor 135b.

A first one of the wheels 131a which are drive wheels is driven by the (first) rotating electrical machine 10a, and a second one of the wheels 131a is driven by the (second) rotating electrical machine 10b. The wheel speed sensor 134 is provided so as to correspond to one of the driven wheels 131b as shown in FIG. 28.

Figure 29:
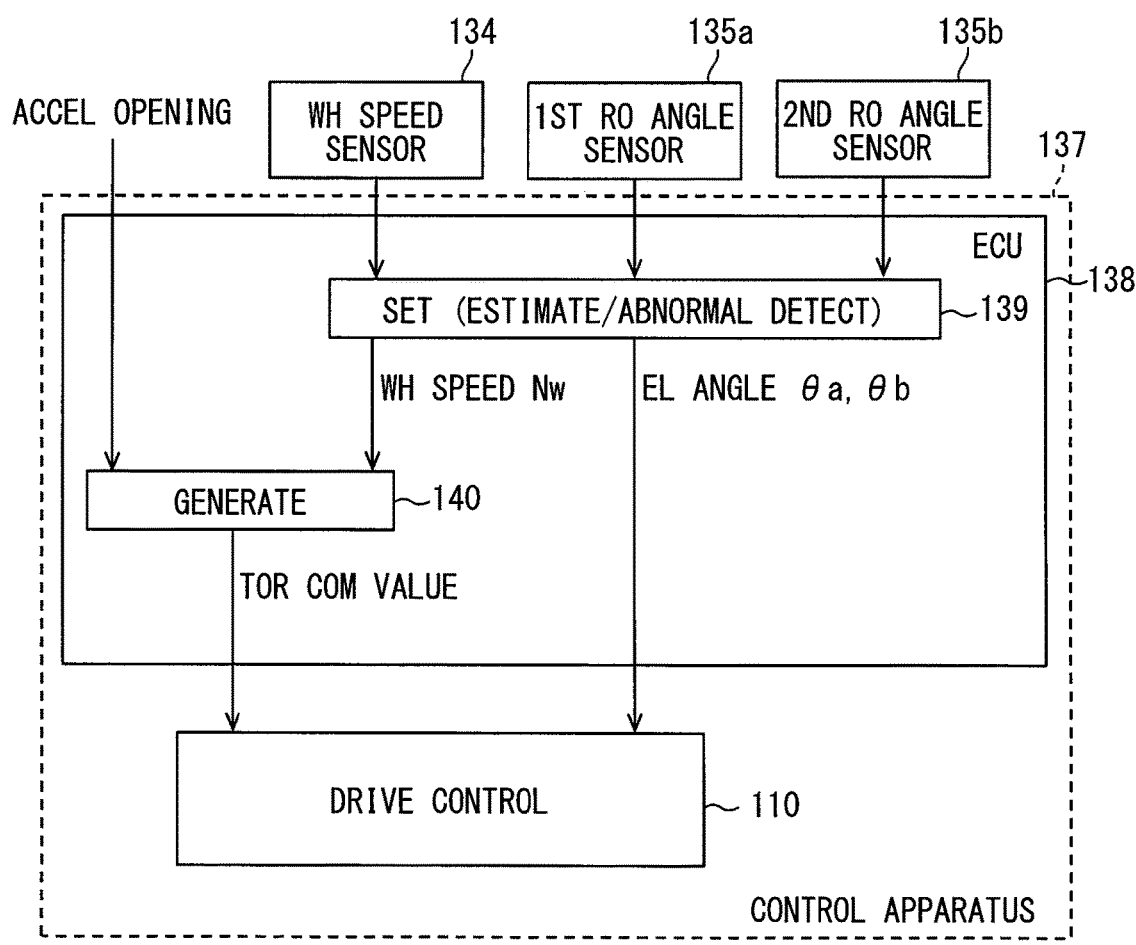
FIG. 29 is a functional block diagram showing a control apparatus.

As shown in FIG. 29, the setting unit 139 of the present embodiment sets the wheel speed Nw and the electrical angles θa and θb based on the detection value of the wheel speed sensor 134, the detection value of the first rotation angle sensor 135a, and the detection value of the second rotation angle sensor 135b. The electrical angle θa is an electrical angle of the first rotating electrical machine 10a, and the electrical angle θb is an electrical angle of the second rotating electrical machine 10b.

Figure 30:
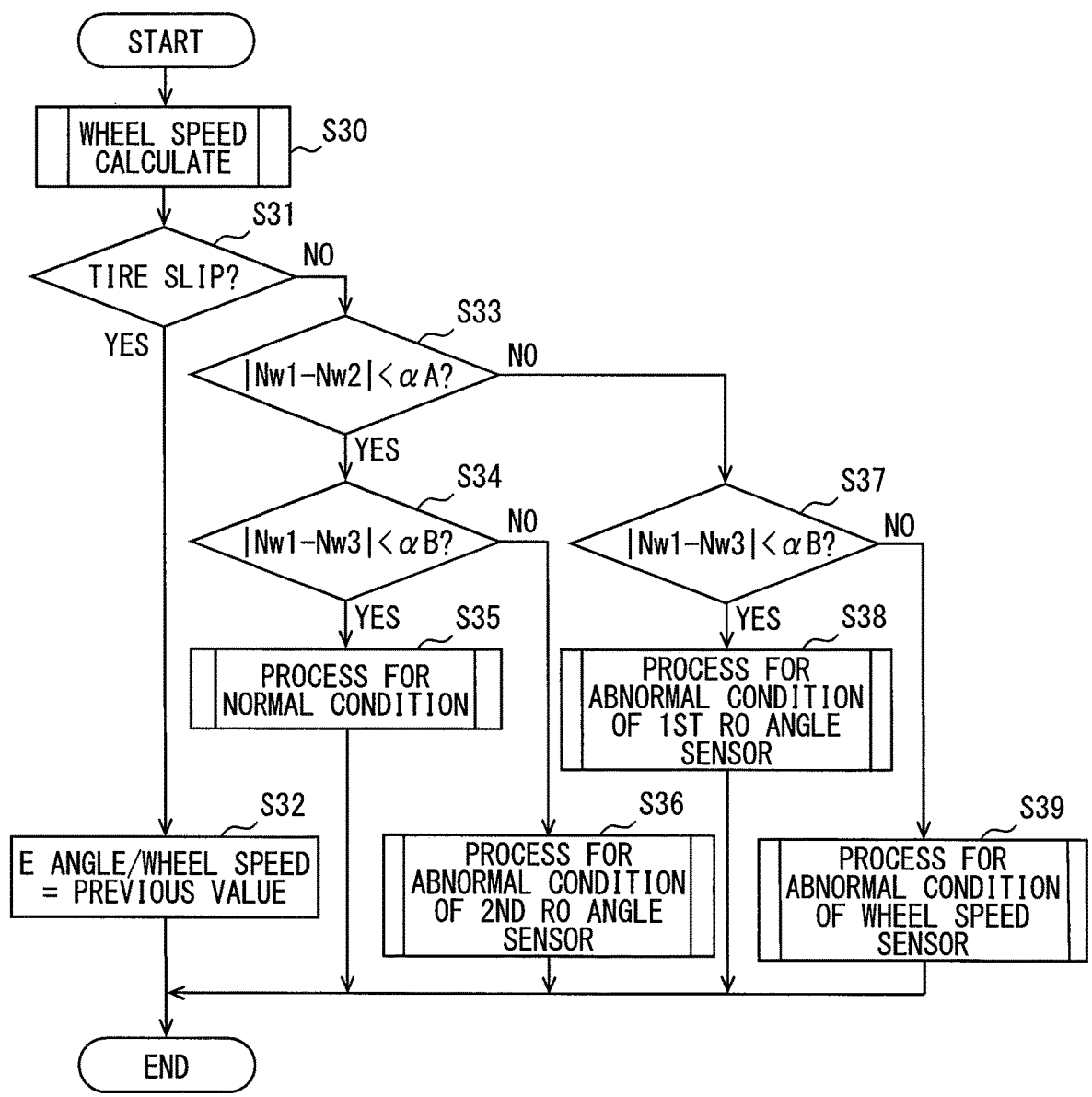
FIG. 30 is a flowchart showing processing executed by a setting unit.

FIGS. 30 to 35 are flowcharts showing processing performed by the setting unit 139. As shown in FIG. 30, first, the setting unit 139 executes a wheel speed calculation process (S30).

Figure 31:
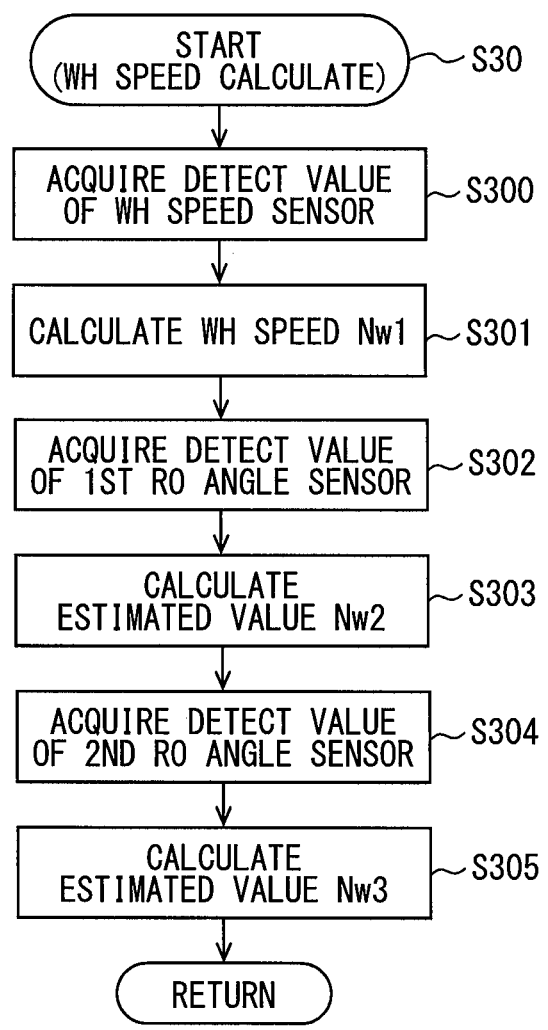
FIG. 31 is a flowchart diagram showing a wheel speed calculation process.

FIG. 31 is a flowchart showing the wheel speed calculation process (the processing in S30). The setting unit 139 acquires the detection value of the wheel speed sensor 134 (S300), and calculates the wheel speed Nw1 based on the acquired detection value (S301). Next, the setting unit 139 acquires the detection value of the first rotation angle sensor 135a (S302), and calculates the estimated value Nw2 of the wheel speed based on the acquired detection value (S303). The setting unit 139 also acquires the detection value of the second rotation angle sensor 135b (S304), and calculates the estimated value Nw3 of the wheel speed based on the acquired detection value (S305). Then, the processing returns to the main sequence shown in FIG. 30.

After the wheel speed calculation process ends, the setting unit 139 determines whether a tire slip has occurred (S31). When a slip occurs, the rotation speed of the wheel 131 rapidly increases, and the back electromotive force increases in proportion to the rotation speed. This causes the current to fluctuate. Therefore, for example, the current (phase current) flowing through the rotating electrical machine 10 can be monitored, and the slip of the tire can be detected based on the variation in the current.

If the slip of the tire has occurred, the abnormality determination process is not performed. As an example, the setting unit 139 sets values previously set as the electrical angles θa and θb and the wheel speed Nw (S32). That is, the previous values are held. Then, a series of processing is ended.

In contrast, when it is determined in S31 that the slip of the tire has not occurred, the setting unit 139 determines whether the absolute value of the difference between the wheel speed Nw1 and the estimated value Nw2 is less than a predetermined value αA set in advance (S33). Hereinafter, the absolute value of the difference between the wheel speed Nw1 and the estimated value Nw2 is referred to as a first difference.

When the first difference is less than the predetermined value αA, then the setting unit 139 determines whether the absolute value of the difference between the wheel speed Nw1 and the estimated value Nw3 is less than the predetermined value αB set in advance (S34). The absolute value of the difference between the wheel speed Nw1 and the estimated value Nw3 is hereinafter referred to as a second difference. If αB is equal to αA, it can be stored in the memory as a common value. For example, in order to increase the accuracy of determination, αB may be a value different from αA.

When the second difference is less than the predetermined value αB, it is determined that no abnormality occurs in any of the wheel speed sensor 134 and the rotation angle sensors 135a and 135b; the setting unit 139 executes a process for a normal condition (a normal condition process) (S35).

Figure 32:
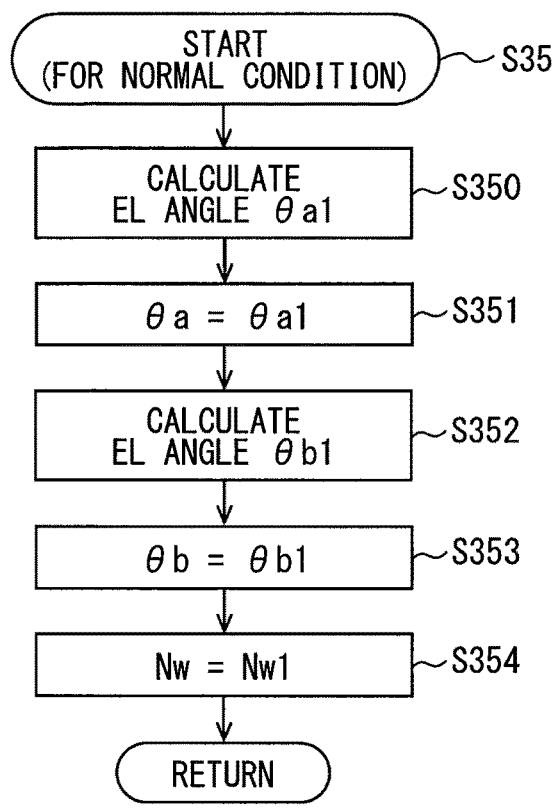
FIG. 32 is a flowchart diagram showing a process for a normal condition.

FIG. 32 is a flowchart showing the normal condition process (processing in S35). The setting unit 139 calculates the electrical angle θa1 based on the detection value of the first rotation angle sensor 135a acquired in S302 (S350), and sets the calculated electrical angle θa1 as the electrical angle θa of the rotating electrical machine 10a (S351).

Next, the setting unit 139 calculates the electrical angle θb1 based on the detection value of the second rotation angle sensor 135b acquired in S304 (S352), and sets the calculated electrical angle θb1 as the electrical angle θb of the rotating electrical machine 10b (S353). Then, Nw1 calculated in S301 is set as the wheel speed Nw (S354), and the processing returns to the main sequence. Then, a series of processing is ended.

When the second difference is greater than or equal to the predetermined value αB in S34, it is determined that the estimated value Nw3, i.e., the second rotation angle sensor 135b, has an abnormality, and the setting unit 139 performs a process for an abnormal condition of the second rotation angle sensor 135b (S36).

Figure 33:
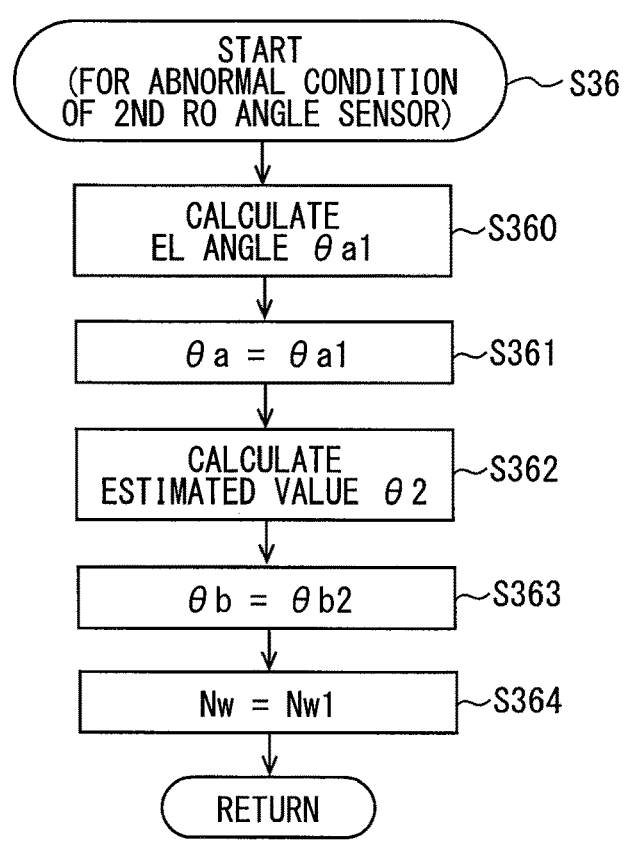
FIG. 33 is a flowchart diagram showing a process for an abnormal condition of a second rotation angle sensor.

FIG. 33 is a flowchart showing a process (processing in 836) for an abnormal condition of the second rotation angle sensor 135b. Here, S360 and S361 are the same processing as S350 and S351 described above.

After execution of S361, the setting unit 139 calculates an estimated value θb2 of the electrical angle θb of the rotating electrical machine 10b based on the detection value of the wheel speed sensor 134 acquired in S300 (S362), and sets θb2 as the electrical angle θb (S363). S364 is the same processing as S354 described above. After the execution of S364, the processing returns to the main sequence and ends a series of processing.

When the first difference is greater than or equal to the predetermined value αA in S33, then the setting unit 139 executes the processing in S37. Here, S37 is the same processing as S34. When the second difference is less than the predetermined value αB in S37, it is determined that the first rotation angle sensor 135a is abnormal, and the setting unit 139 executes a process for an abnormal condition of the first rotation angle sensor 135a (S38).

Figure 34:
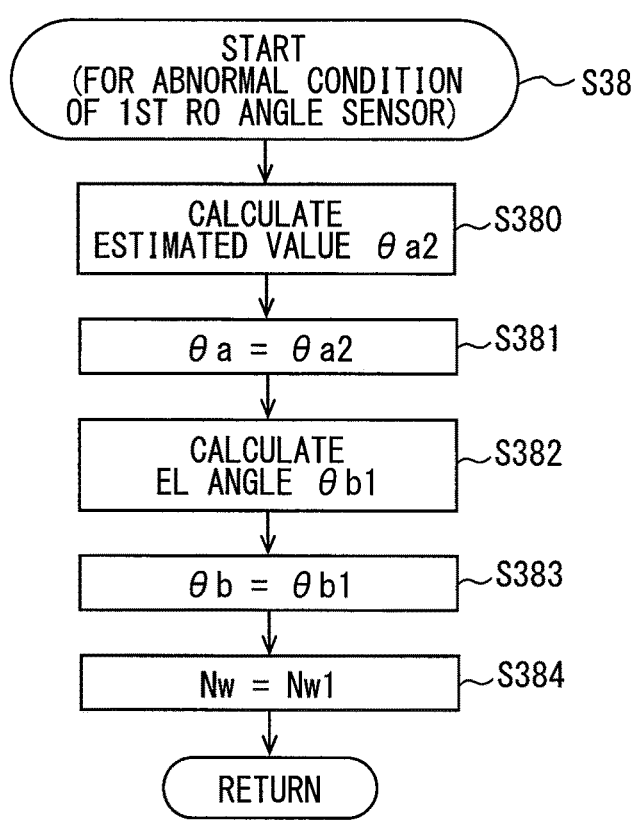
FIG. 34 is a flowchart diagram showing a process for an abnormal condition of a first rotation angle sensor.

FIG. 34 is a flowchart showing a process (processing in S38) for an abnormal condition of the first rotation angle sensor 135a. First, the setting unit 139 calculates an estimated value θa2 of the electrical angle θa of the rotating electrical machine 10a based on the detection value of the wheel speed sensor 134 acquired in S300 (S380), and sets θa2 as the electrical angle θa (S381).

Next, the setting unit 139 sequentially executes the processing in S382, S383, and S384. S382, S383, and S384 are the same as the processing in S352, S353, and S354 described above. After the execution of S384, the processing returns to the main sequence, and a series of processing is ended.

When the second difference is greater than or equal to the predetermined value αB in S37, it is determined that the wheel speed Nw1, that is, the wheel speed sensor 134, is abnormal, and the setting unit 139 executes a process for an abnormal condition of the wheel speed sensor 134 (S39).

Figure 35:
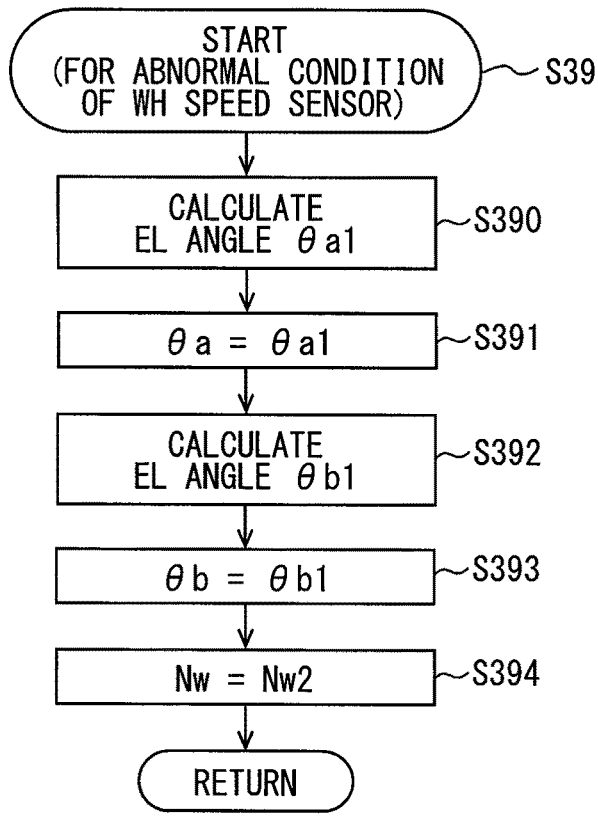
FIG. 35 is a flowchart diagram showing a process for an abnormal condition of a wheel speed sensor.

FIG. 35 is a flowchart showing a process (processing in S39) of an abnormal condition of the wheel speed sensor 134. The setting unit 139 sequentially executes the processing in S390, S391, S392, and S393. S390, S391, S392, and S393 are the same processing as S350, S351, S352, and S353 described above.

After execution of S393, the setting unit 139 sets the estimated value Nw2 calculated in S303 as the wheel speed Nw (S394). Then, the processing returns to the main sequence; a series of processing is ended.

As described above, according to the present embodiment, even if the wheel speed sensor 134 and the rotation angle sensors 135a and 135b do not have an abnormality self-diagnosis function, it can be determined whether any one of the wheel speed sensor 134 and the rotation angle sensors 135a and 135b has an abnormality. Thereby, the cost can be reduced in the configuration in which the vehicle drive system 136 includes the wheel speed sensor 134 and the rotation angle sensors 135a and 135b. Moreover, since the wheel speed sensor 134 and the rotation angle sensors 135a and 135b can be substituted for each other as in the first embodiment, mutual compatibility can be ensured.

The number of rotating electrical machines 10 provided, respectively, with the corresponding rotation angle sensors 135 is not limited to the above example. The present embodiment can also be applied to a configuration including three or more rotating electrical machines 10 provided, respectively, with the corresponding rotation angle sensors 135. The present embodiment can also be applied to a configuration including a plurality of wheel speed sensors 134, for example, a configuration in which each wheel is provided with a sensor serving as a sensor for ABS. That is, the present embodiment can be applied to a configuration including at least a plurality of wheel speed sensors 134 or at least a plurality of rotation angle sensors 135. For example, the present embodiment can be applied to a configuration in which two wheel speed sensors 134 and one rotation angle sensor 135 are provided.

Although the comparison target for abnormality detection is the wheel speed, an electrical angle (rotation angle) may be a comparison target.

The execution order of the processing by the setting unit 139 is not limited to the above example. The comparison between the second difference and the predetermined value αB may be performed first, and then the comparison between the first difference and the predetermined value αA may be performed. In the wheel speed calculation process, the calculation order of the wheel speed Nw1 and the estimated values Nw2 and Nw3 is not limited to the above-described example. In at least one of four processes (i.e., a first process is a process for a normal condition, a second process is a process for an abnormal condition of the second rotation angle sensor 135b, a third process is a process for an abnormal condition of the first rotation angle sensor 135a, and a fourth process is a process for an abnormal condition of the wheel speed sensor 134), the setting order of the electrical angles θa and θb and the wheel speed Nw is not limited to the above-described example.

In the above, an example is shown where the estimated value Nw2 based on the detection value of the first rotation angle sensor 135a is set as the wheel speed Nw when an abnormality occurs in the wheel speed sensor 134. The estimated value Nw3 based on the detection value of the second rotation angle sensor 135b may be set as the wheel speed Nw.

When an abnormality occurs in the first rotation angle sensor 135a, the estimated value of the electrical angle θa of the rotating electrical machine 10a may be calculated based on the detection value of the second rotation angle sensor 135b, and the calculated estimated value may be set as the electrical angle θa. Similarly, when an abnormality occurs in the second rotation angle sensor 135b, the estimated value of the electrical angle θb of the rotating electrical machine 10b may be calculated based on the detection value of the first rotation angle sensor 135a, and the calculated estimated value may be set as the electrical angle θb.

Fourth Embodiment

The present embodiment can refer to the preceding embodiments. Therefore, the description of the parts common to the rotating electrical machine 10, the vehicle drive system 136, and the control apparatus 137 shown in the preceding embodiments will be omitted.

Figures 36, 37:
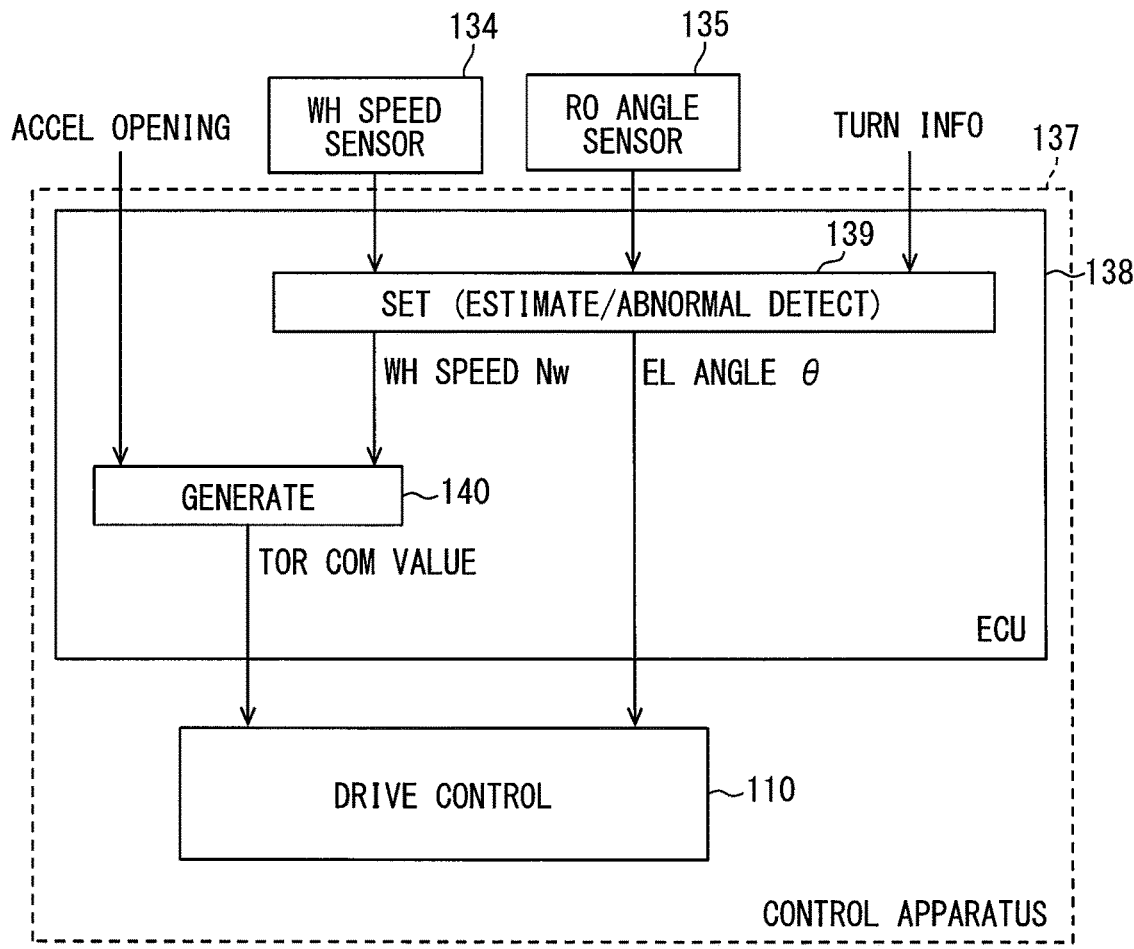
FIG. 36 is a functional block diagram showing a control apparatus according to a fourth embodiment.
FIG. 37 is a view showing a relationship between a steering angle and a predetermined value α.

In the present embodiment, as shown in FIG. 36, the setting unit 139 detects that one of the wheel speed sensor 134 and the rotation angle sensor 135 has an abnormality based on turning information of the vehicle. Using the turning information of the vehicle enables the detection of an abnormality in consideration of the speed difference between the inner wheel and the outer wheel while the vehicle is traveling at a corner (curve).

In this embodiment, a steering angle is acquired from a steering angle sensor (not shown) as turning information. Then, the predetermined value α (see, for example, FIG. 27 and FIG. 30) used also for the abnormality determination is switched depending on the steering angle. Specifically, as shown in FIG. 37, when the steering angle is less than the threshold, the reference value α0 is set as the predetermined value α; when the steering angle is equal to or greater than the threshold, α1 larger than the reference value α0 is set. Suppose a case that (i) during corner travel, a speed difference arises between the inner wheel and the outer wheel, and (ii) due to such a speed difference, the absolute value of the difference between the wheel speed Nw1 and the estimated value (Nw2 or Nw3) during corner travel becomes larger than that during linear travel. Even in such a case, by switching the predetermined value α, an abnormality can be detected with high accuracy.

The turning information of the vehicle is not limited to the above-described steering angle. For example, the turning information may be acquired based on an in-vehicle camera or GPS information. Specifically, curvature radius information of a point where the vehicle travels may be acquired; then, the predetermined value α may be switched (selectively set).

Further, setting of the predetermined value α is not limited to two levels. Three levels or more may be also employed. Further, the predetermined value α may be set steplessly by a predetermined function using the steering angle as a variable. For example, it can be set by α=a× steering angle+b.

Although the example is described in which switches the predetermined value α which is a threshold value of abnormality determination by using the turning information, it is not limited to this. For example, the wheel speed Nw1 may be corrected based on the turning information.

Fifth Embodiment

The present embodiment can refer to the preceding embodiments. Therefore, the description of the parts common to the rotating electrical machine 10, the vehicle drive system 136, and the control apparatus 137 shown in the preceding embodiments will be omitted.

Figure 38:
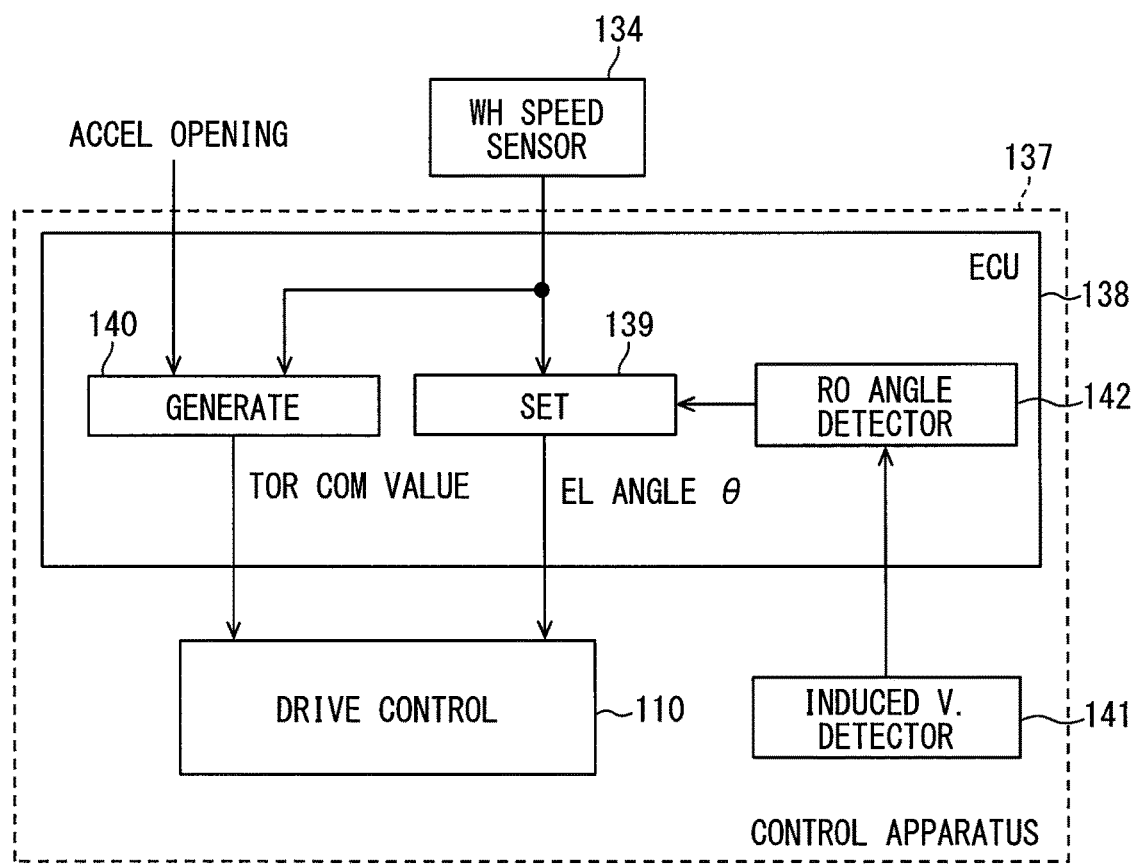
FIG. 38 is a functional block diagram showing a control apparatus according to a fifth embodiment.

In the present embodiment, as shown in FIG. 38, the control apparatus 137 includes (i) an induced voltage detector 141 that detects an induced voltage generated in the stator winding 51 of each phase; and (ii) a rotation angle detector 142 that detects the electrical angle (rotation angle) of the rotating electrical machine 10 based on the detected induced voltage. As one example, in FIG. 38, the ECU 138 includes the rotation angle detector 142.

The rotating electrical machine 10 has a sensorless structure without the rotation angle sensor 135. The setting unit 139 sets the electrical angle θ based on the detection value of the wheel speed sensor 134 and the detection value of the rotation angle detector 142.

Figure 39:
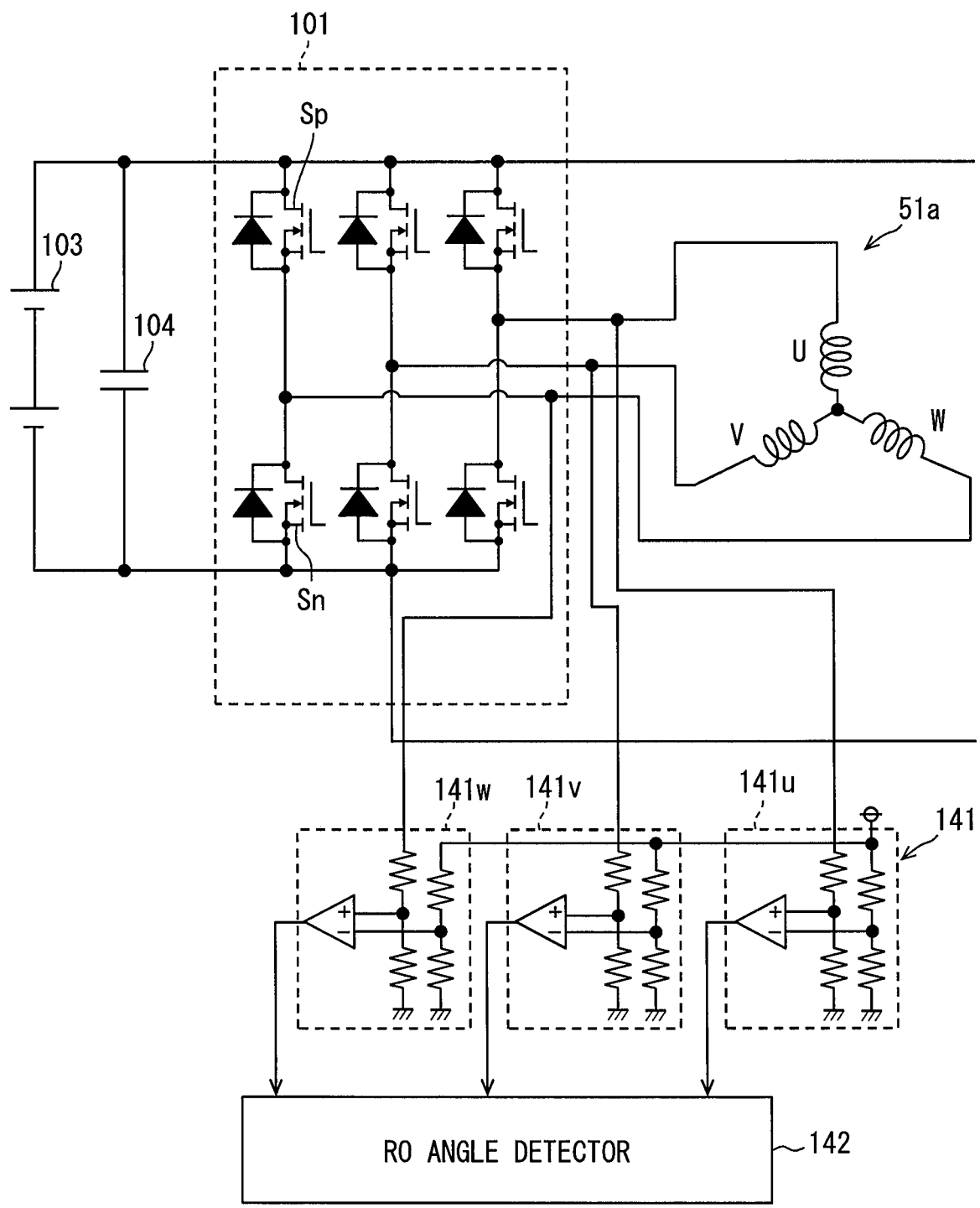
FIG. 39 is a circuit diagram showing an induced voltage detector.

As shown in FIG. 39, the induced voltage detector 141 includes a U phase induced voltage detector 141$u$, a V phase induced voltage detector 141$v$, and a W phase induced voltage detector 141$w$. Each of the induced voltage detectors 141$u$, 141$v$, and 141$w$ compares the induced voltage of each phase with the reference voltage. Each of the induced voltage detectors 141$u$, 141$v$, and 141$w$ outputs a high level signal when the induced voltage is higher than the reference voltage, and outputs a low level signal when the induced voltage is less than the reference voltage. Although only the UVW phases are illustrated in FIG. 39 for the sake of convenience, the same applies to XYZ phases.

Figure 40:
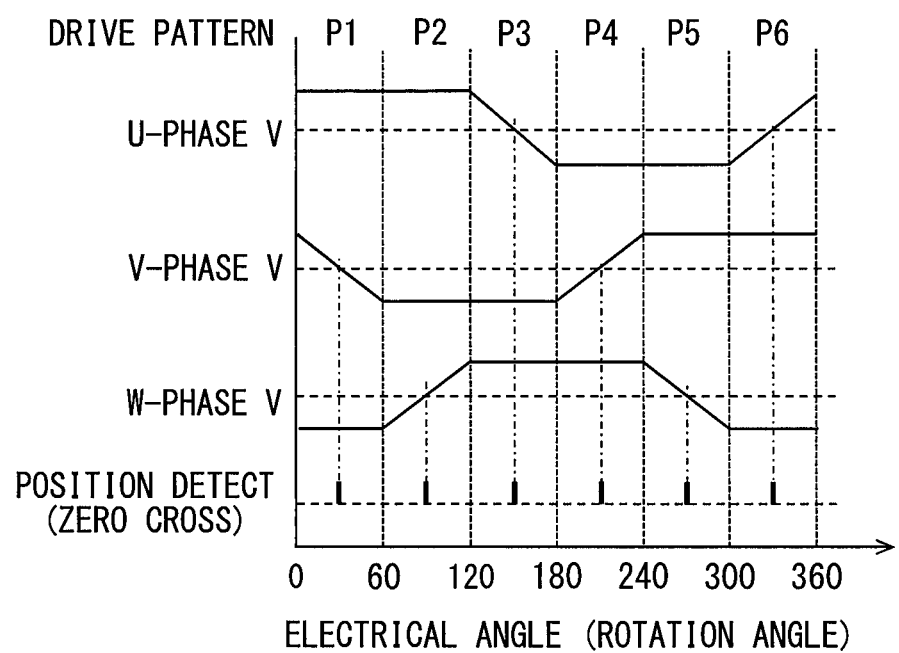
FIG. 40 is a diagram showing voltage of each phase and position detection timing.

FIG. 40 shows (i) the waveform of the induced voltage of each phase and (ii) the position detection timing (zero cross). The induced voltage is output in a range of the electrical angle between 120 degrees and 180 degrees and between 300 degrees and 360 degrees. The range of the electrical angle corresponds to the drive patterns P3 and P6 in which the U phase is not energized. Within the range, the polarity of the U-phase voltage is switched. That is, there are zero crossings.

The induced voltage is output in a range of the electrical angle between 0 degree and 60 degrees and between 180 degrees and 240 degrees. The range of the electrical angle corresponds to the drive patterns P1 and P4 in which the V phase is not energized. Within the range, the polarity of the V-phase voltage is switched. That is, there are zero crossings.

The induced voltage is output in a range of the electrical angle between 60 degrees and 120 degrees and between 240 degrees and 300 degrees. The range of the electrical angle corresponds to the drive patterns P2 and P5 in which the W phase is not energized. Within the range, the polarity of the W-phase voltage is switched. That is, there are zero crossings. Therefore, six zero crossings exist within one rotation.

The rotation angle detector 142 detects the electrical angle θ of the rotating electrical machine 10 based on the signal output from the induced voltage detector 141. As described above, the output signal of each phase switches between the high level and the low level at the zero crossing. Therefore, the electrical angle θ can be detected based on the time point (i.e., timing) at which the level of the output signal switches.

Figure 41:
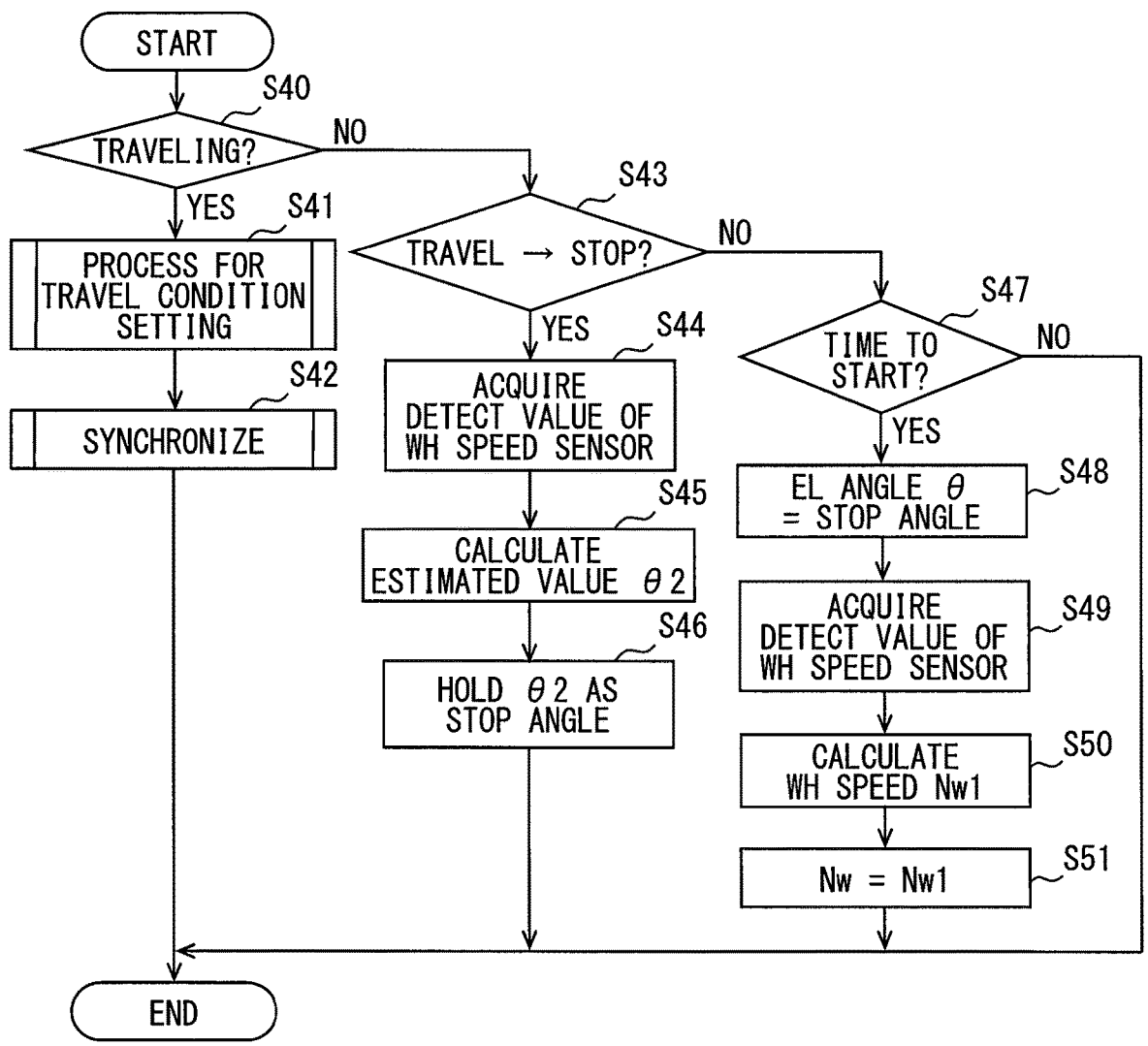
FIG. 41 is a flowchart diagram showing processing executed by a setting unit.

FIG. 41 is a flowchart showing processing performed by the setting unit 139 after travel start of the vehicle. The setting unit 139 repeatedly executes the process described below in a predetermined cycle.

First, the setting unit 139 determines whether the vehicle is traveling (S40). When it is determined that the vehicle is traveling, the setting unit 139 executes a traveling condition setting process (S41).

Figure 42:
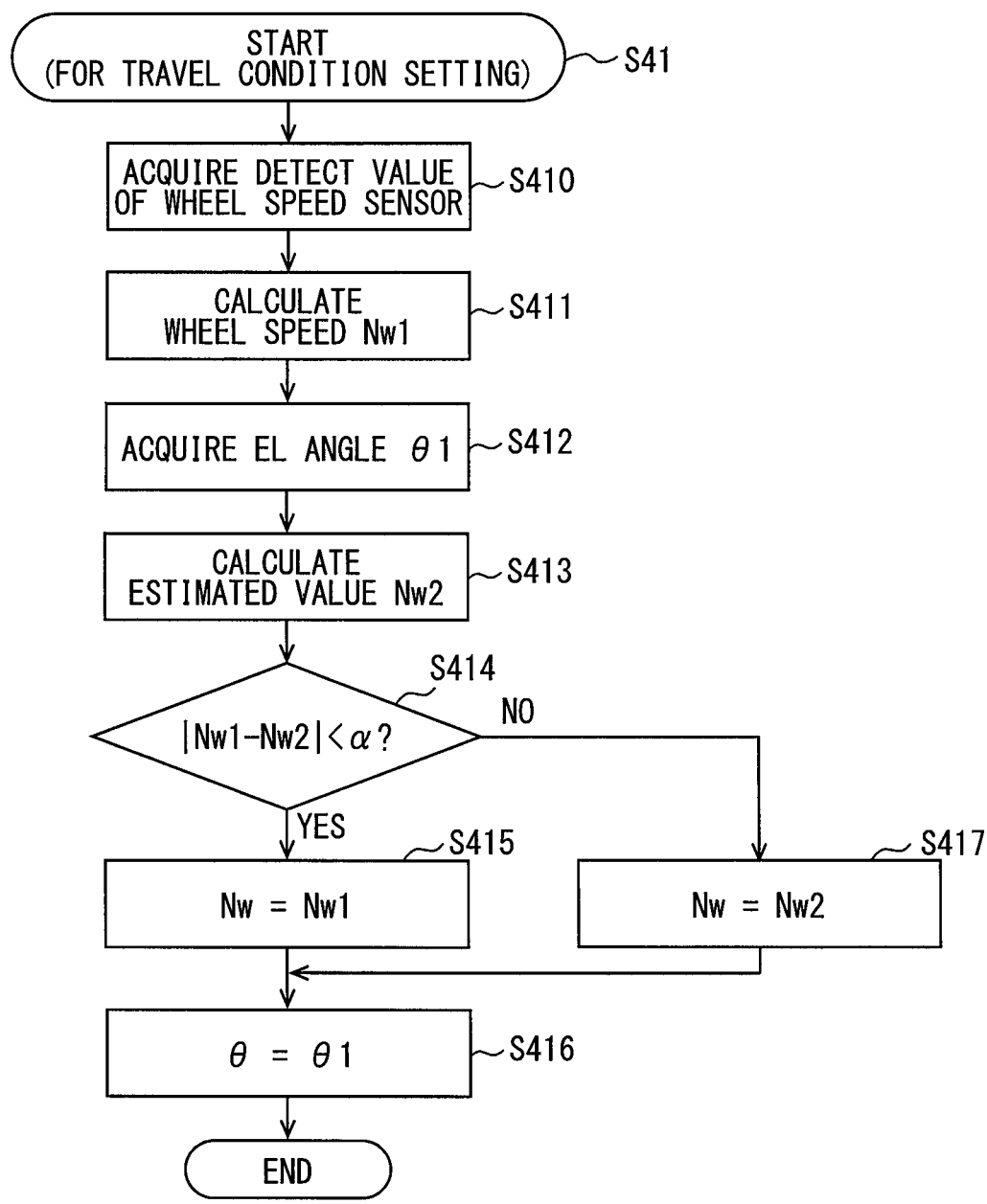
FIG. 42 is a flowchart diagram showing a traveling condition setting process.

FIG. 42 is a flowchart showing a traveling condition setting process. First, the setting unit 139 acquires the detection value of the wheel speed sensor 134 (S410). Then, the wheel speed Nw1 is calculated based on the acquired detected value (S411).

Next, the setting unit 139 acquires the electrical angle θ1 from the rotation angle detector 142 (S412). Then, the estimated value Nw2 of the wheel speed is calculated based on the acquired electrical angle θ1 (S413).

Next, the setting unit 139 determines whether the absolute value of the difference between the wheel speed Nw1 and the estimated value Nw2 is less than a predetermined value α (S414). When it is less than the predetermined value α, it is determined that the wheel speed sensor 134 is normal; then, the setting unit 139 sets the calculated value Nw1 as the wheel speed Nw (S415). Next, the electrical angle θ1 is set as the electrical angle θ (S416), and the processing returns to the main sequence shown in FIG. 41.

In contrast, when it is determined in S414 that the value is equal to or greater than the predetermined value α, that is, when it is determined that the wheel speed sensor 134 is abnormal, the setting unit 139 sets the estimated value Nw2 as the wheel speed Nw (S417). Then, the processing in S416 described above is performed, and the processing returns to the main sequence.

Figure 43:
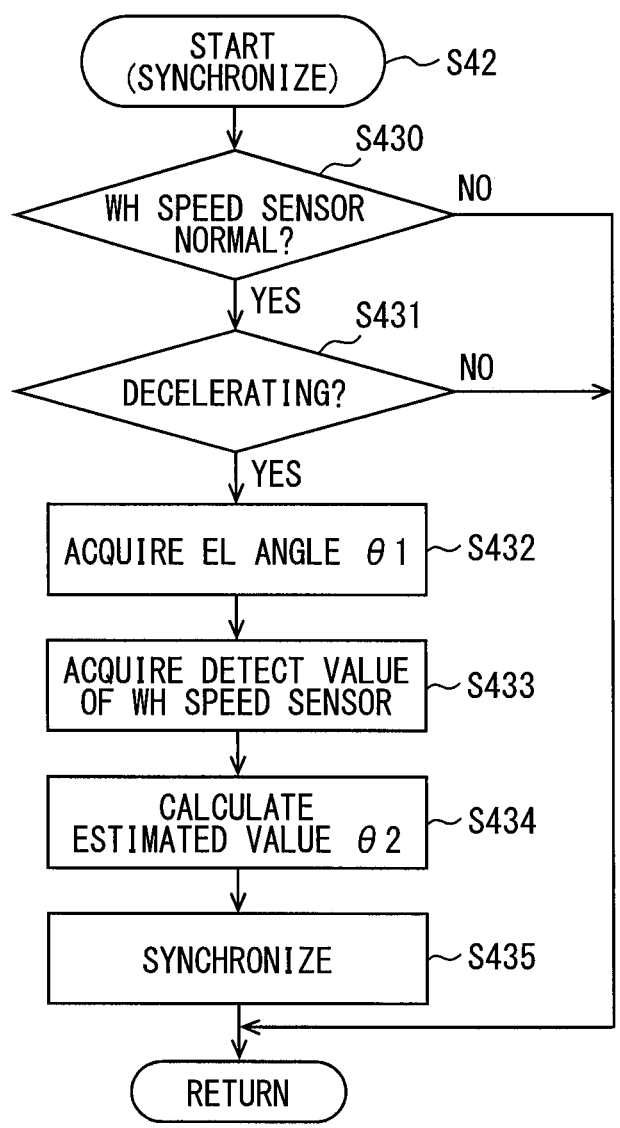
FIG. 43 is a flowchart diagram showing synchronization processing.

When the traveling condition setting process is completed, the setting unit 139 executes the synchronization process (S42). FIG. 43 is a flowchart showing the synchronization process.

In the synchronization process, first, the setting unit 139 determines whether the wheel speed sensor 134 is normal (S430). When the wheel speed sensor 134 is abnormal, that is, when the determination is NO in S414 described above, the processing returns to the main sequence, and a series of processing is ended.

When the wheel speed sensor 134 is normal, that is, when the total value of the above difference is less than the predetermined value α, the setting unit 139 determines whether the vehicle is decelerating (S431). When not decelerating, the processing returns to the main sequence. Then, a series of processing is ended.

When decelerating, the setting unit 139 acquires the electrical angle θ1 from the rotation angle detector 142 (S432). Next, the detection value of the wheel speed sensor 134 is acquired (S433), and the estimated value θ2 is calculated based on the acquired detection value of the wheel speed sensor 134 (S434). Then, the setting unit 139 executes an electrical angle synchronization process (S435). The setting unit 139 synchronizes the acquired electrical angle θ1 with the calculated estimated value θ2. While the electrical angle θ1 based on the induced voltage is supposed to be the absolute position, the estimated value θ2 is corrected so that the estimated value θ2 matches the electrical angle θ1. After the synchronization process, the estimated value θ2 is calculated in consideration of the correction, so that the estimated value θ2 substantially matches the electrical angle θ1 in a predetermined period after the synchronization process. When S435 ends, the processing returns to the main sequence, and a series of processing is ended.

When it is determined in S40 shown in FIG. 41 that the vehicle is not traveling, the setting unit 139 determines whether the vehicle shifts from the traveling state to the stop state (S43). When it is determined that the vehicle shifts to the stop state, the setting unit 139 acquires a detection value of wheel speed sensor 134 (S44), and computes an estimated value θ2 based on an acquired detection value (S45). Then, the calculated estimated value θ2 is held as a stop angle which is an electrical angle when the vehicle stops (S46), and a series of processing is ended.

When it is determined in S43 that the vehicle does not shift to the stop state, the setting unit 139 determines whether it is time to start the vehicle (the rotating electrical machine 10) (S47). That is, it is determined whether it is the time point (i.e., the time to start) when the vehicle shifts from the stop state to the traveling state. When it is determined that it is the time to start, the setting unit 139 sets the stop angle held, that is, the estimated value θ2 as the electrical angle θ (S48). Next, the setting unit 139 acquires the detection value of the wheel speed sensor 134 (S49), and calculates the wheel speed Nw1 based on the detection value (S50). Since it is just before traveling, the wheel speed Nw1 becomes zero. Then, the calculated value Nw1 is set as the wheel speed Nw (S51), and a series of processing is ended.

As described above, according to the present embodiment, while adopting the sensorless rotating electrical machine 10 without the rotation angle sensor 135, the electrical angle θ is estimated based on the detection value of the wheel speed sensor 134 and the drive of the rotating electrical machine 10 can thus be controlled.

In a known rotating electrical machine of sensorless structure, position detection based on the induced voltage cannot be performed in the stop state of the rotating electrical machine. At the time of startup of the rotating electrical machine, it is necessary to rotate the rotating electrical machine 10 in order to detect the position, and the vehicle may pop out.

Thus, in the present embodiment, while the vehicle is traveling, the estimated value θ2 (i.e., the estimated electrical angle θ2) based on the detection value of the wheel speed sensor 134 is synchronized with the electrical angle θ1 based on the induced voltage. The estimated value θ2 calculated when the vehicle is stopped is held as a stop angle. Then, the rotating electrical machine 10 is started using this stop angle. As described above, by using the detection value of the wheel speed sensor 134, the stop angle (electrical angle) at the time of stopping the vehicle can be detected. This can suppress the vehicle from popping out at the startup. In particular, in the present embodiment, the synchronization process is performed at the time of deceleration of the vehicle. This can suppress deviation between (i) the estimated value θ2 when the vehicle is stopped and (ii) the electrical angle.

Further, in the present embodiment, the abnormality of the wheel speed sensor 134 can be detected based on the detection value of the rotation angle detector 142. Therefore, the wheel speed sensor 134 need not to have a self-diagnosis function for abnormality. This can reduce the cost. When the wheel speed sensor 134 is abnormal, the estimated value Nw2 estimated based on the detection value of the rotation angle detector 142 is set as the wheel speed Nw. Therefore, the control using the wheel speed Nw can be continued. The present embodiment can also be applied to a configuration including a plurality of wheel speed sensors 134.

When the induced voltage is small due to low inductance and sensorless driving by the induced voltage is thus difficult, the induced voltage detector 141 and the rotation angle detector 142 may not be provided. In this case, the drive of the rotating electrical machine 10 may be controlled by estimating the electrical angle θ based on the detection value of the wheel speed sensor 134 as well as at startup.

Although the example in which the ECU 138 includes the rotation angle detector 142 is shown, the present embodiment is not limited to this. For example, the induced voltage detector 141 and the rotation angle detector 142 may be provided integrally into the circuit constituting the drive control unit 110. The setting unit 139 may be provided integrally with the drive control unit 110.

The traveling condition setting process is not limited to the above example. For example, S412 and S413 may be executed before S410 and S411 are executed.

The synchronization process is not limited to the above example. For example, the processing in S433 and S434 may be performed before the execution of S432.

Other Examples/Embodiments

The disclosure in this specification is not limited to the illustrated embodiments. The disclosure encompasses the illustrated embodiments and variations based on the illustrated embodiments by those skilled in the art. For example, the disclosure is not limited to the combination of parts and/or elements shown in the embodiments. The disclosure may be implemented in various combinations. The disclosure may have additional parts that may be added to the embodiments. The disclosure includes those in which parts and/or elements of the embodiments have been omitted. The disclosure includes replacements or combinations of parts and/or elements between one embodiment and another embodiment. The disclosed technical scope is not limited to the description of the embodiments. Several technical scopes disclosed are indicated by descriptions in the claims and should be understood to include all modifications within the meaning and scope equivalent to the descriptions in the claims.

Figure 44:
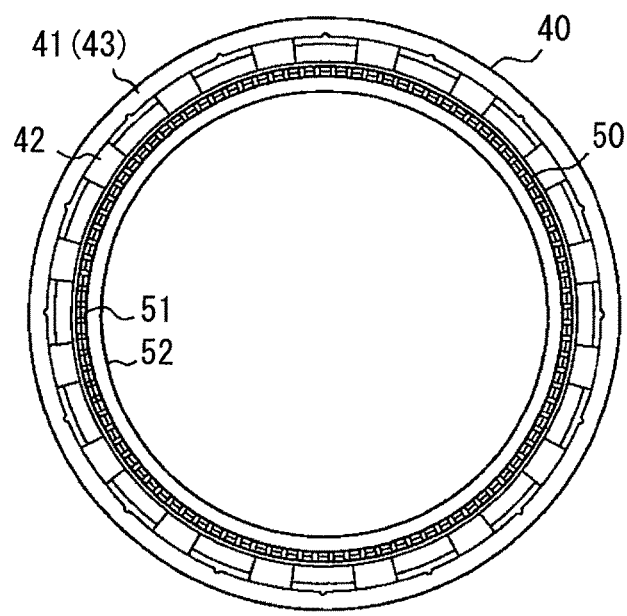
FIG. 44 is a transverse sectional view of a rotor and a stator in another example.
Figure 45:
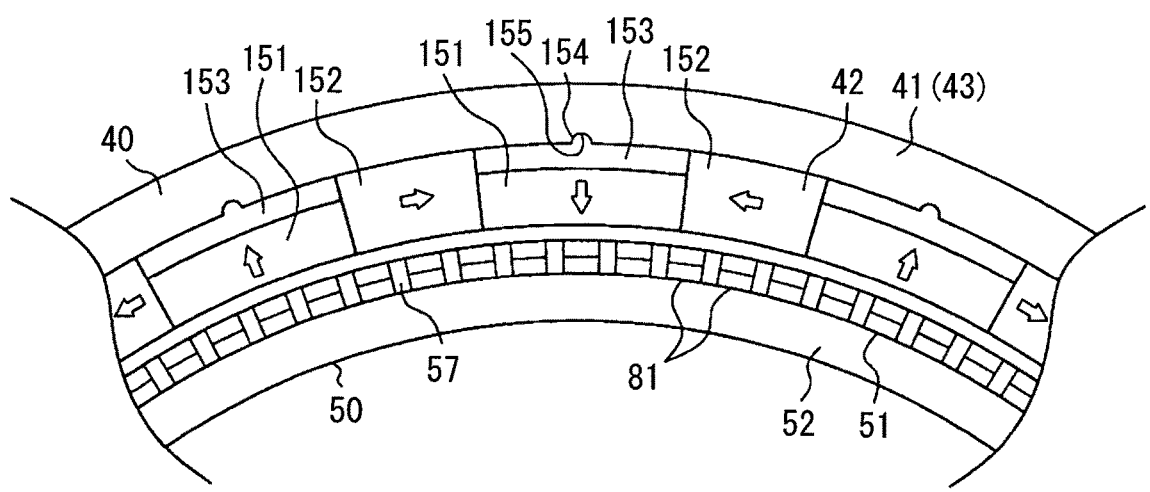
FIG. 45 is an enlarged view of a part of FIG. 44.

The pole anisotropic structure of the magnet unit 42 is not limited to the example of the embodiments. In the example shown in FIGS. 44 and 45, the magnet unit 42 is configured using a magnet array called a Halbach array. The magnet unit 42 includes (i) first magnets 151 whose magnetization direction (direction of the magnetic pole) is in the radial direction and (ii) second magnets 152 whose magnetization direction (direction of the magnetic pole) is in the circumferential direction. The first magnets 151 are disposed at predetermined intervals in the circumferential direction, and each of the second magnets 152 are disposed at a position between the adjacent first magnets 151 in the circumferential direction. That is, the first magnets 151 and the second magnets 152 are aligned along the circumferential direction alternately. The first magnets 151 and the second magnets 152 are permanent magnets made of a rare earth magnet such as a neodymium magnet, for example.

The first magnets 151 are spaced apart from each other in the circumferential direction such that poles on the side (radially inner side) facing toward the stator 50 are alternately N pole and S pole. Further, the second magnets 152 are arranged adjacent to the respective first magnets 151 such that the directions of the magnetic poles in the circumferential direction are alternately reversed.

Further, a magnetic body 153 made of a soft magnetic material is disposed radially outside the first magnet 151, that is, on the side facing toward the magnet holding portion 43 of the rotor main body 41. For example, the magnetic body 153 may be made of a magnetic steel sheet, a soft iron, or a powdered iron core material. In this case, the circumferential length of the magnetic body 153 is the same as the circumferential length of the first magnet 151, in particular, the circumferential length of the outer peripheral side of the first magnet 151. Further, the thickness in the radial direction of the one-piece where the first magnet 151 and the magnetic body 153 are integrated is the same as the thickness in the radial direction of the second magnet 152. In other words, the thickness of the first magnet 151 in the radial direction is thinner than that of the second magnet 152 by the amount (or thickness) of the magnetic body 153. Each magnet 151, 152 and the magnetic body 153 are mutually fixed, for example, by an adhesive material. In the magnet unit 42, the first magnet 151 is disposed to be interposed between the magnetic body 153 and the stator 50 in the radial direction. Further, the first magnet 151 has, in the radial direction, two sides that are the radially inner side and the radially outer side. The stator 50 is on the radially inner side of the first magnet 151, whereas the magnetic body 153 is on the radially outer side of the first magnet 151. In other words, the magnetic body 153 is disposed, in the radial direction, on one side (opposite-stator side) of the first magnet 151 opposite the stator 50.

On the outer peripheral surface of the magnetic body 153, a key 154 is formed as a convex portion protruding radially outward, that is, on the side facing toward the magnet holding portion 43 of the rotor main body 41. Further, on the inner peripheral surface of the magnet holding portion 43, a key groove 155 is formed as a concave portion for receiving the key 154 of the magnetic body 153. The groove shape of the key groove 155 is formed to receive the protruding shape of the key 154; namely, the groove shape (outline shape) of the key groove 155 is the same as the protruding shape (outline shape) of the key 154. The number of key grooves 155 in the outer peripheral surface in the magnetic holding portion 43 is the same as the number of keys 154 on the entire magnetic bodies 153.

The engagement between the key 154 and the key groove 155 suppresses positional deviation of the first magnet 151 and the second magnet 152 with respect to the rotor main body 41 in the circumferential direction (rotational direction). Note that the key 154 and the key groove 155 (protrusions and depressions, or convex and concave) may be appropriately provided either (i) on the magnetic body 153 and the magnet holding portion 43, respectively, or (ii) on the the magnet holding portion 43 and the magnetic body 153, respectively. Contrary to the above, it is also possible to provide the key groove 155 in the outer peripheral side of the magnetic body 153 and provide the key 154 in the inner peripheral surface (i.e., side) of the magnet holding portion 43 of the rotor main body 41.

Here, in the magnet unit 42, the magnetic flux density of the first magnet 151 can be increased by alternately arranging the first magnet 151 and the second magnet 152. Therefore, in the magnet unit 42, the magnetic flux can be concentrated on one side, and the magnetic flux can be strengthened on the one side closer to the stator 50.

In addition, the magnetic body 153 is arranged on the radially outer side of the first magnet 151, that is, on the side opposite to the stator. This arrangement can suppress partial magnetic saturation on the radially outer side of the first magnet 151, and consequently suppress the demagnetization of the first magnet 151 that occurs due to the magnetic saturation. As a result, the magnetic force of the magnet unit 42 can be increased. In other words, the magnet unit 42 of the present embodiment provides a configuration in which a portion where demagnetization easily occurs in the first magnet 151 is replaced with the magnetic body 153.

Figure 46A:
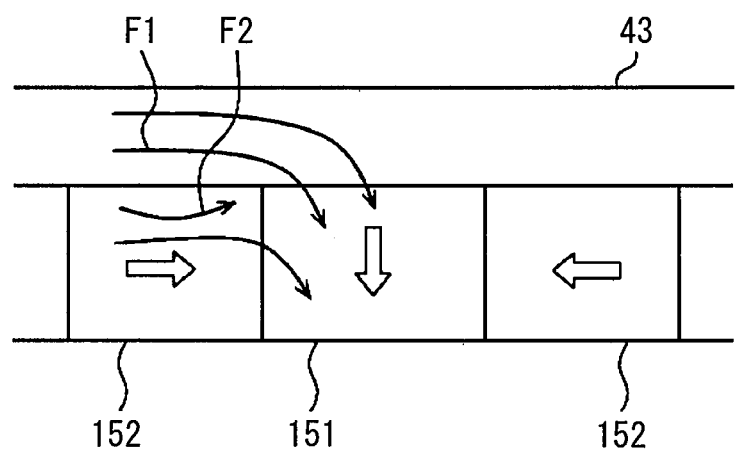
FIG. 46A is a view specifically showing the flow of magnetic flux in a magnet unit.
Figure 46B:
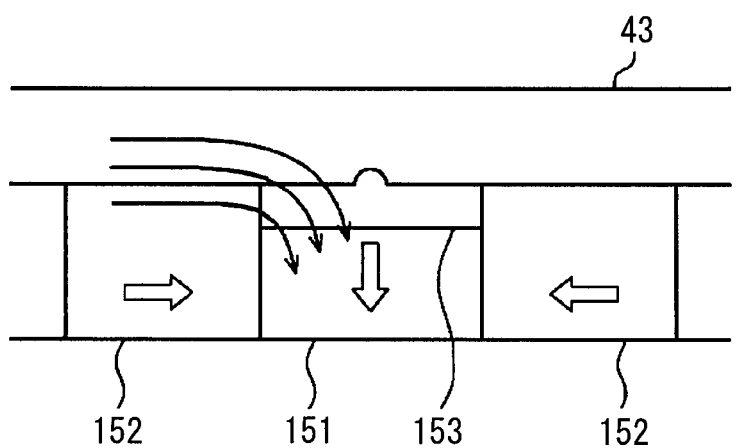
FIG. 46B is a view specifically showing the flow of magnetic flux in a magnet unit.

Each of FIGS. 46A and 46B is a diagram specifically showing the flow of magnetic flux in the magnet unit 42. FIG. 46A shows the case where a comparative configuration which does not have the magnetic body 153 in the magnet unit 42. FIG. 46B shows the case where the configuration according to this embodiment which has the magnetic body 153 in magnet unit 42. In FIGS. 46A and 46B, the magnet holding portion 43 of the rotor main body 41 and the magnet unit 42 are linearly expanded just for explanation; the lower side in FIGS. 46A and 46B is one side facing toward the stator (i.e., stator side) while the upper side is the other side opposite to the stator (i.e., opposite-stator side).

In the configuration of FIG. 46A, each of the magnetic pole surface of the first magnet 151 and the side surface of the second magnet 152 is in contact with the inner circumferential side of the magnet holing portion 43. Further, the magnetic pole surface of the second magnet 152 is in contact with the side surface of the first magnet 151. In this case, in the magnet holding portion 43, there is arising a combined flux of (i) a magnetic flux F1 entering the contact surface with the first magnet 151 through the path outside the second magnet 152 and (ii) a magnetic flux substantially parallel to the magnet holding portion 43 and attracting the magnetic flux F2 of the second magnet 152. Therefore, there is a concern that magnetic saturation may partially occur in the magnet holding portion 43 near the contact surface between the first magnet 151 and the second magnet 152.

In contrast, in the configuration of FIG. 46B, the magnetic body 153 is provided between (i) the magnetic pole surface of the first magnet 151 and (ii) the inner peripheral surface of the magnet holding portion 43 on the side opposite to the stator. The magnetic body 153 thus allows the passage of the magnetic flux. Therefore, the magnetic saturation in the magnet holding portion 43 can be suppressed, to enhance the resistance to demagnetization.

Also, the configuration of FIG. 46B eliminates F2 that promotes magnetic saturation, unlike in FIG. 46A. Thus, the permeance of the entire magnetic circuit can be effectively improved. This configuration can maintain the magnetic circuit characteristics even under severe high heat conditions.

Further, compared to the radial magnet in a known SPM (Surface Permanent Magnetic) rotor, the magnet path passing through the interior of the magnet is longer. Therefore, the magnet permeance is increased, and the magnetic force can be increased to increase the torque. Furthermore, the magnetic flux can be concentrated at the center of the d-axis to increase the sine wave matching rate. In particular, the torque can be more effectively enhanced by forming the current waveform to be sinusoidal or trapezoidal, or by using a switching IC with 120 degree conduction by the PWM control.

In the above embodiment, the outer peripheral surface of the stator core 52 is a curved surface having no unevenness, and a plurality of conductor groups 81 are arranged side by side at predetermined intervals on that outer peripheral surface. This configuration may be changed. For example, see the example shown in FIG. 47. The stator core 52 includes an annular yoke portion 161 and a protruding portion 162. The stator winding 51 has two sides in the radial direction; a first side faces the rotor and a second side is opposite to the rotor. The yoke portion 161 is provided on that second side (lower side in FIG. 47). The protruding portion 162 is protruding, from the yoke portion 161, toward between the straight portions 83 adjoining each other in the circumferential direction (i.e., toward an interval region (i.e., gap) between the straight portions 83 adjacent in the circumferential direction). The protruding portions 162 are provided on the radially outer side of the yoke portion 161, that is, on the side facing towards the rotor 40, at predetermined intervals. The conductor groups 81 of the stator winding 51 are engaged respectively with the protruding portions 162 in the circumferential direction, and are arranged in the circumferential direction using the protruding portions 162 as positioning portions.

Figure 47:
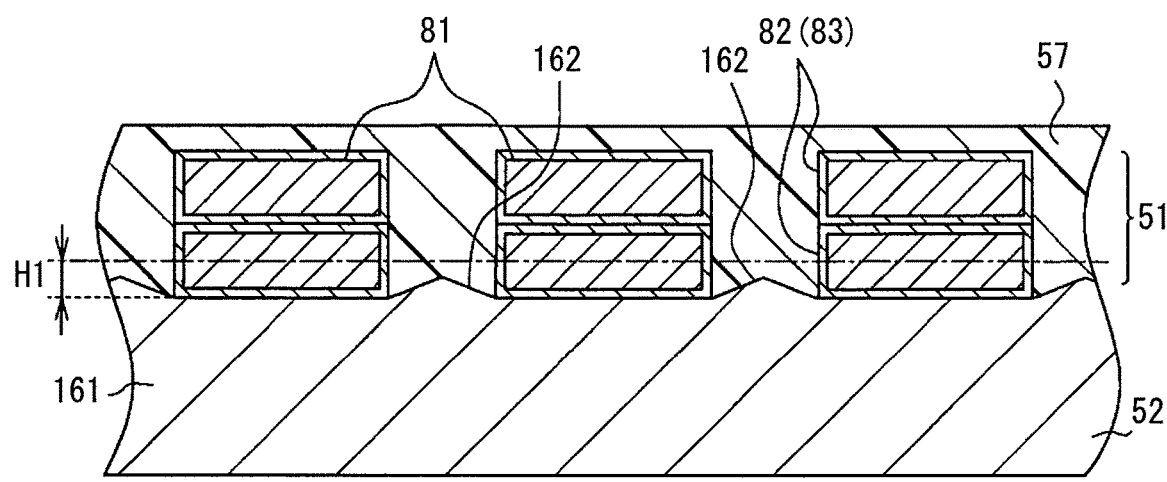
FIG. 47 is a sectional view of a stator according to another example.

The protruding portion 162 has a thickness dimension in the radial direction from the yoke portion 161 as follows. Now, of a plurality of layers of straight portions 83 of the conductors 82 disposed in the radial direction, a straight portion 83 adjacent to the yoke portion 161 in the radial direction is defined as an adjacent straight portion 83. The thickness dimension of the protruding portion 162 is configured to be less than half (½) (H1 in FIG. 47) of the thickness dimension in the radial direction of the adjacent straight portion 83. In FIG. 47, the conductor group 81 is configured to have two layers of the liner conductors 82 (i.e., the straight portions 83). Thus, the thickness dimension of the protruding portion 162 is configured to be less than one fourth (¼) of the thickness dimension in the radial direction of the conductor group 81. Due to such thickness restriction of the protruding portion 162, the protruding portion 162 does not function as teeth between the conductor groups 81 (that is, the straight portions 83) adjacent in the circumferential direction. The formation of the magnetic path due to the teeth is thus prevented. The protruding portion 162 may not be provided each of all the gaps between the conductor groups 81 aligned in the circumferential direction, and may be provided in at least one gap between two conductor groups 81 adjacent in the circumferential direction. The shape of the protruding portion 162 may be any shape such as a rectangular shape or an arc shape as needed.

The straight portion 83 may be provided in a single layer on the outer peripheral surface of the stator core 52. Therefore, in a broad sense, the thickness dimension of the protruding portion 162 in the radial direction from the yoke portion 161 may only need to be less than a half (½) of the thickness dimension of the straight portion 83 in the radial direction.

Assuming an imaginary circle centered on the axis of the rotating shaft 11 and passing through the radial center position of the straight portion 83 radially adjacent to the yoke portion 161. The protruding portion 162 may have a shape that protrudes from the yoke portion 161 within the range of the imaginary circle or a shape that does not protrude radially beyond the imaginary circle toward the rotor 40.

According to the above configuration, the thickness dimension in the radial direction of the protruding portion 162 is limited, and the protruding portion 162 does not function as the teeth between the straight portions 83 adjacent in the circumferential direction. As compared with the case where the teeth are provided between the straight portions 83, the adjacent straight portions 83 can be brought closer. Thus, the cross-sectional area of the conductor can be increased, and the heat generation caused by the energization of the stator winding 51 can be reduced. In such a configuration, the absence of teeth makes it possible to eliminate the magnetic saturation, and it is possible to increase the current supplied to the stator winding 51. In this case, an increase in the amount of heat generation as the current flows can be suitably coped with. Further, in the stator winding 51, since the turn portion 84 is shifted in the radial direction and has an interference avoidance portion for avoiding interference with other turn portions 84, the mutually different turn portions 84 are arranged to be separated from each other in the radial direction. Thereby, the heat dissipation can be improved also in the turn portions 84. As described above, the heat dissipation performance of the stator 50 can be optimized.

Further, if (i) the yoke portion 161 of the stator core 52 and (ii) the magnet unit 42 of the rotor 40 (i.e., the magnets 91 and 92) are separated from each other by a predetermined distance or more, the thickness dimension of the protruding portion 162 in the radial direction is not limited to H1 in FIG. 47. Specifically, as long as the yoke portion 161 and the magnet unit 42 are separated by 2 mm or more, the thickness dimension of the protruding portion 162 in the radial direction may be H1 in FIG. 47 or more. For example, suppose a configuration where the radial thickness dimension of the straight portion 83 exceeds 2 mm, and the conductor group 81 includes two layers of conductors 82 on the inner side and outer side in the radial direction. Under such a configuration, the protruding portion 162 may be provided within the half position in the radial direction of the straight portion 83 that is not adjacent to the yoke portion 161 (i.e., the second layer of the conductor 82 from the yoke portion 161). In this case, if the radial thickness dimension of the protruding portion 162 is "H1×3/2", the similar effect can be obtained to some extent by enlarging the conductor cross-sectional area in the conductor group 81.

Figure 48:
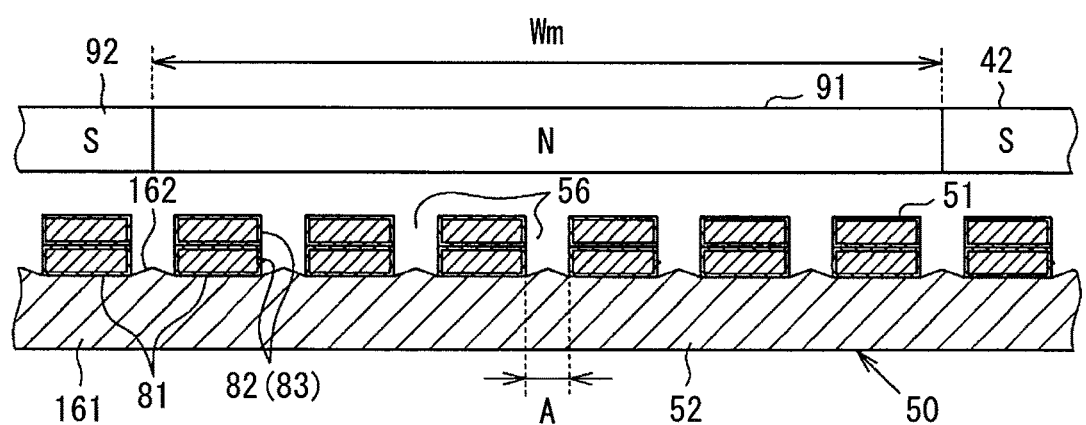
FIG. 48 is a sectional view of a stator according to another example.

The stator core 52 may have a configuration shown in FIG. 48. Although the sealing portion 57 is omitted in FIG. 48, the sealing portion 57 may be provided. In FIG. 48, for convenience, the magnet unit 42 and the stator core 52 are shown linearly arranged.

In the configuration of FIG. 48, the stator 50 has a protruding portion 162 as an inter-winding member between the circumferentially adjacent conductors 82 (i.e., the straight portions 83). Here, in the range corresponding to one pole of the magnet unit 42, assume that (i) the circumferential width dimension of one pole is Wm, (ii) the residual magnetic flux density of the magnet unit 42 is Br, (iii) the circumferential width dimension of the protruding portions 162 excited by energization of the stator winding 51 is Wt, and (iv) the saturation magnetic flux density of the protruding portions 162 is Bs. The protruding portions 162 are made of a magnetic material that fulfills Wt×Bs≤Wm×Br . . . (1).

Specifically, in the present embodiment, the three-phase winding of the stator winding 51 is a distributed winding. With respect to one pole of the magnet unit 42, in the stator winding 51, the number of the protruding portions 162, that is, the number of the gaps 56 between the conductor groups 81 is "3×m". Note that m is the number of the conductors 82 in the conductor group 81. In this case, when the stator winding 51 is energized in each phase in a predetermined order, the protruding portions 162 for two phases are excited in one pole. As described above, the circumferential width dimension of the protruding portions 162 excited by energization of the stator winding 51 in the range of one pole of the magnet unit 42 is referred to as Wt. The width dimension in the circumferential direction of the protruding portion 162 (that is, the gap 56) is referred to as A. The circumferential width dimension Wt is "2×A×m". Then, after the width dimension Wt is defined in this way, in the stator core 52, the protruding portion 162 is configured as a magnetic material that satisfies the relationship of the above expression (1). The width dimension Wt is also a circumferential dimension of a portion where the relative permeability can be larger than one (1) within one pole.

When the stator winding 51 is concentratedly wound, in the stator winding 51, the number of protruding portions 162 (i.e., the gaps 56) with respect to one pole pair (that is, two poles) of the magnet unit 42 is "3×m". In this case, when the stator winding 51 is energized in each phase in a predetermined order, the protruding portions 162 for one phase are excited in one pole. Therefore, the width dimension Wt in the circumferential direction of the protruding portions 162 excited by energization of the stator winding 51 in the range of one pole of the magnet unit 42 is "A×m". Then, after the width dimension Wt is defined in this manner, the protruding portion 162 is configured as a magnetic material that satisfies the relationship of the above (1).

By the way, in magnets with a BH product of 20 [MGOe (kJ/m^3)] such as neodymium magnets, samarium cobalt magnets, and ferrite magnets, Bd=1.0 [T] or more; in iron, Br=2.0 [T] or more. Therefore, as the high output motor, in the stator core 52, the protruding portions 162 may be a magnetic material that satisfies the relationship of Wt<½× Wm.

Figure 49:
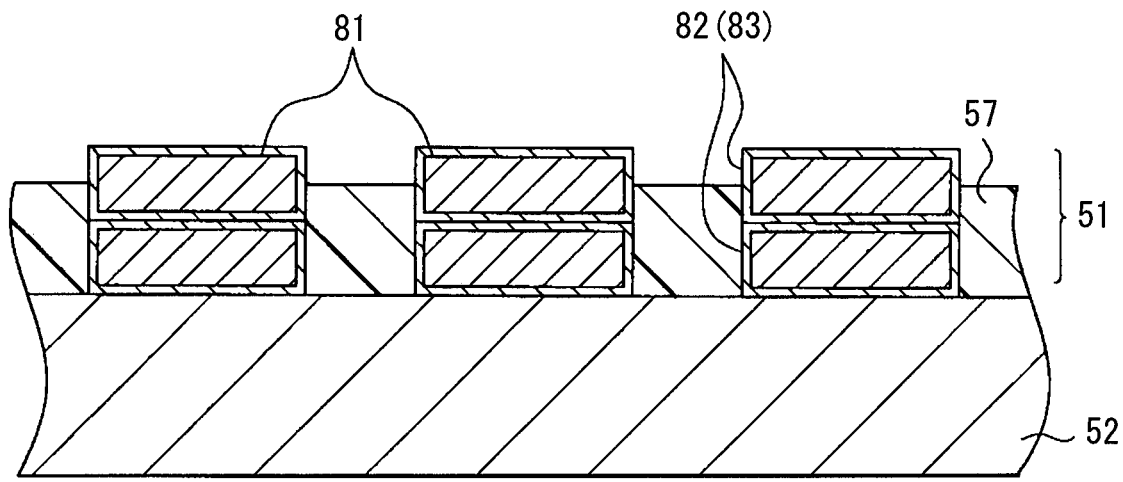
FIG. 49 is a sectional view of a stator according to another example.

In the above embodiment, on the radial outer side of the stator core 52, the sealing portion 57 covering the stator winding 51 is provided in a range including all the conductor groups 81. In other words, the thickness dimension in the radial direction of the sealing portion 57 is designed to be larger than the thickness dimension of the conductor group 81 in the radial direction. This may be changed. For example, as shown in FIG. 49, the sealing portion 57 is provided so that a part of the conductor 82 is exposed. More specifically, the sealing portion 57 is provided in a state in which a part of the conductor 82 which is the most radially outward in the conductor group 81 is exposed radially outward.

In this case, the radial thickness dimension of the sealing portion 57 may be the same as or less than the radial thickness dimension of each conductor group 81.

Figure 50:
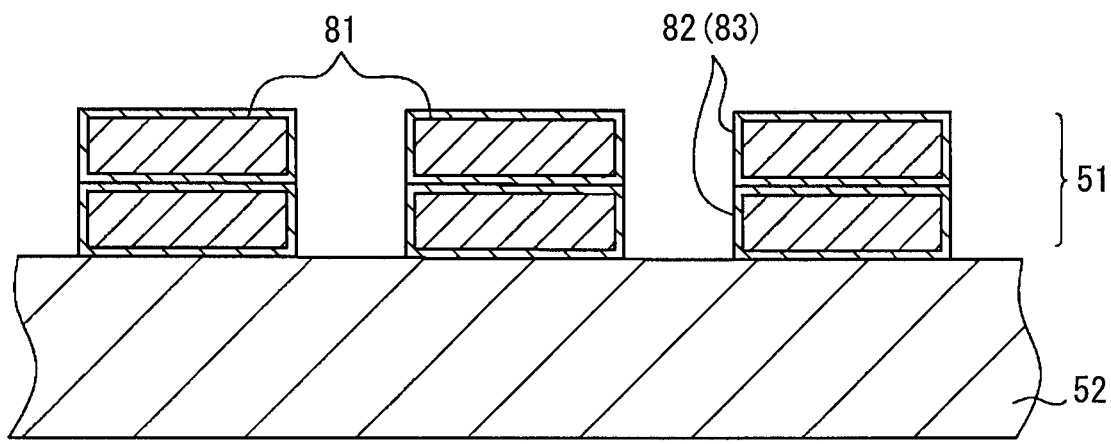
FIG. 50 is a sectional view of a stator according to another example.

Further, as shown in FIG. 50, each conductor group 81 may not be sealed by any sealing portion 57. That is, the sealing portion 57 covering the stator winding 51 is not used. In this case, an air gap (i.e., void space) is provided between the conductor groups 81 aligned in the circumferential direction.

The stator 50 may not have the stator core 52. In this case, the stator 50 is configured by the stator winding 51 shown in FIG. 12. In the stator 50 not having the stator core 52, the stator winding 51 may be sealed with a sealing material. Alternatively, instead of the stator core 52 made of a soft magnetic material, the stator 50 may be configured to include an annular winding holding portion made of a nonmagnetic material such as synthetic resin.

Figure 51A:
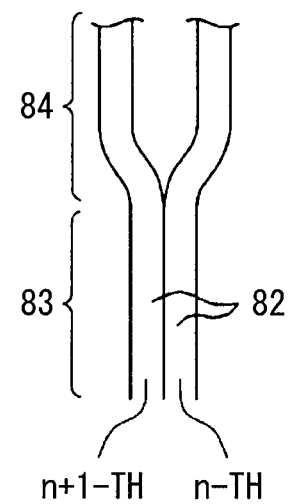
FIG. 51A is a side view showing conductors in the n-th layer and the n+1-th layer in another example.

A configuration for avoiding interference between the conductors 82 adjacent in the radial direction in the conductor group 81 of the stator winding 51 is provided as shown in FIG. 51A. That is, the direction of the shift of a first turn portion 84 in the n-th layer is opposite the direction of the shift of a second turn portions 84 in the n+1-th layer, That is, suppose a case where the turn portions 84, which are connected to the straight portions 83 in a plurality of layers, overlap each other in the radial direction. In such a case, the respective turn portions 84 may be bent toward mutually different directions (e.g., inward and outward) in the radial direction. As a result, the turn portions 84 can also be suitably spaced apart from each other. In addition, such a configuration may be employed to the part with the severest insulation, or to the last layer or the start layer among multiple layers.

Figure 51B:
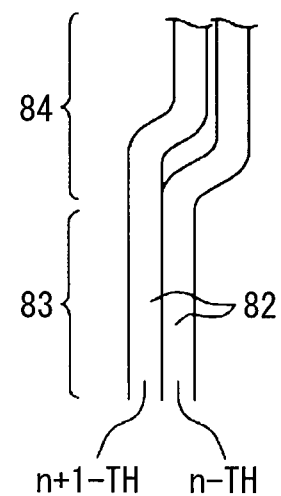
FIG. 51B is a side view showing conductors in the n-th layer and the n+1-th layer in another example.

Alternatively, as shown in FIG. 51B, the conductor shift positions in the axial direction (the positions in the vertical direction in FIG. 51B) may be different between the nth layer and the n+1-th layer. In this case, mutual interference can be suppressed even if the bending radiuses of the turn portions 84 in the respective layers are identical to each other.

The above embodiment provides a configuration where, in the stator winding 51, the straight portions 83 on the same pitch circle centered on the rotating shaft 11 are connected by the turn portion 84, and the turn portion 84 is provided with an interference avoidance portion. This configuration may be changed. For example, another configuration may be provided where, in stator winding 51, the straight portions 83 on mutually different pitch circles centered on rotating shaft 11, that is, straight portions 83 of mutually different layers may be connected by the turn portion 84. Any configuration needs to be provided where the turn portion 84 be configured to have an interference avoidance portion which is radially shifted to avoid interference with other turn portions 84.

Figure 52A:
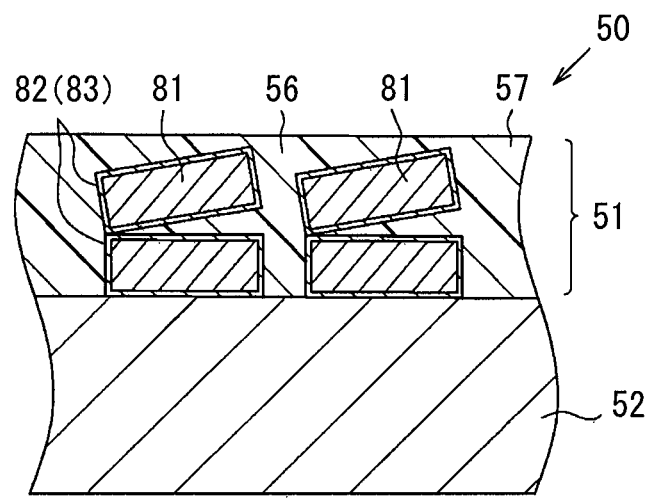
FIG. 52A is a sectional view of a stator according to another example.

As shown in FIG. 52A, in the conductor group 81 of the stator winding 51, the straight portions 83 of the respective conductors 82 may be provided such that a pair of the straight portions facing each other in the radial direction (vertical direction in the figure) are nonparallel to each other. In FIG. 52A, the conductor groups 81 are sealed by the sealing portion 57. According to this configuration, the sealing material as the non-heat generating portion can be interposed between the straight portions 83 aligned in the radial direction. In the non-heat generating portion, the heat generated in the straight portions 83 when the stator winding 51 is energized can be diffused. Thereby, the heat dissipation performance in the conductor group 81 can be enhanced.

In addition, even if the teeth are not interposed between the straight portions 83 adjacent in the circumferential direction, the sealing material is preferably inserted between the straight portions 83 of the respective conductor groups 81, and thus each straight portion 83 can be fixed well. However, in the configuration of FIG. 52A, the sealing portion 57 may not be provided. In this case, an air gap as a non-heat generating portion can be interposed between the straight portions 83 aligned in the radial direction. The heat radiation performance of the conductor group 81 can be enhanced also.

Figure 52B:
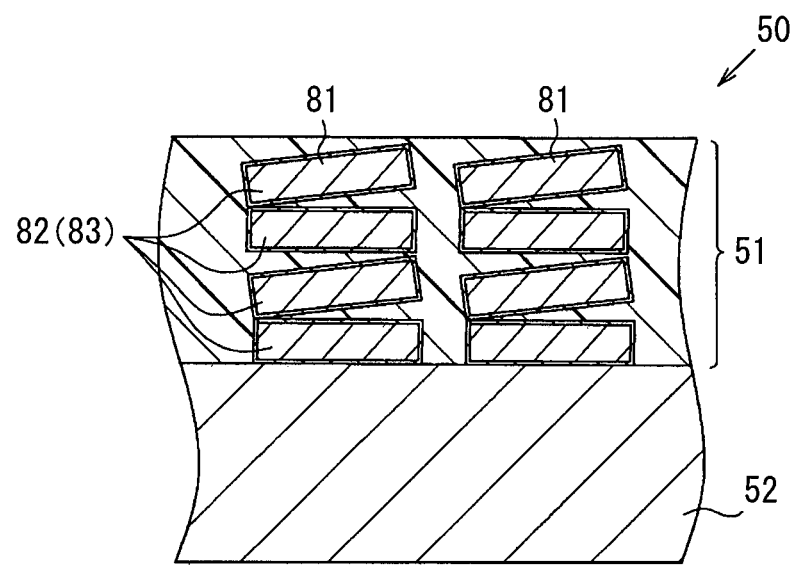
FIG. 52B is a sectional view of a stator according to another example.

As shown in FIG. 52B, in the conductor group 81 of the stator 50, the straight portions 83 of the conductors 82 are aligned in four layers in the radial direction. That is, one conductor group 81 has four straight portions 83 of the four conductors 82 in first to fourth layers from an inner side (lower side in FIG. 52B) to an outer side (upper side in FIG. 52B). The shape of the gap between the pair of facing sides of the straight portions 83 in the first and second layers is different (i.e., reversed) from the shape of the gap between the pair of facing sides of the straight portions 83 in the second and third layers, but the same as the shape of the gap between the pair of facing sides of the straight portions 83 in the third and fourth layers. In short, the two different shaped gaps are alternately arranged in the radial direction. In FIG. 52B, the conductor groups 81 are sealed by the sealing portion 57. The number of layers of the straight portions 83 may be three or more. According to this configuration, heat can be suitably diffused in the respective straight portions 83 aligned in the radial direction.

In addition, when the rotational directions are alternated during the operating state of the rotating electrical machine 10, the holding power for holding the straight portions 83 can be favorably obtained.

In the stator winding 51, the straight portion 83 of the conductor 82 may be provided in a single layer in the radial direction. Moreover, when aligning the straight portions 83 in multiple layers from inner to outer in the radial direction, the number of layers may be arbitrary, and may be three, four, five, six, or the like.

The above-described embodiment provides a configuration where the rotating shaft 11 is provided so as to protrude in both the one end side and the other end side of the rotating electrical machine 10 in the axial direction. Such a configuration may be changed such that the rotating shaft 11 protrudes in only one end side of the rotating shaft 11. In this case, the rotating shaft 11 may be provided so as to extend axially outward while a portion cantilevered by the bearing unit 20 is configured to be one end side. In this configuration, the rotating shaft 11 does not protrude into an internal space of the inverter unit 60. The internal space of the inverter unit 60, specifically, the internal space of the cylindrical portion 71 can be used more widely.

A configuration which supports the rotating shaft 11 rotatably may include a configuration where two bearings are disposed, respectively, in two positions of the one end side and the other end side of the rotor 40. In this case, in the configuration of FIG. 1, bearings may be provided along the axial direction at two positions of one end side and the other end side, between which the inverter unit 60 is interposed.

The above embodiments provides a configuration where the intermediate portion 45 of the rotor main body 41 in the rotor 40 has a step in the axial direction. Alternatively, this may be changed to eliminate the step of the intermediate portion 45 and to be flat.

The above embodiment provide a configuration where the conductor body 82a of the conductor 82 of the stator winding 51 formed as an assembly of a plurality of wires 86. Alternatively, this may be modified to use a rectangular conductor having a rectangular cross-section as the conductor 82. Further, as the conductor 82, a round conductor having a circular cross-section or an elliptical cross-section may be used.

The above embodiment provides a configuration where the inverter unit 60 is provided radially inside the stator 50. Alternatively, the inverter unit 60 may not be provided radially inside the stator 50. In this case, it is possible to use an inner area which is radially inside the stator 50 as a space. Moreover, it is possible to arrange components different from the inverter unit 60 in the internal area.

The rotating electrical machine 10 may be configured to lack the housing 30. In this case, for example, the rotor 40, the stator 50, and the like may be held at parts of the wheel or other vehicle parts.

For reference to further explain features of the present disclosure, the description is added as follows.

A related technique uses a resolver of a drive motor for vehicle traveling so as to detect a wheel speed of the vehicle, in place of a wheel speed sensor. This technique is provided with a speed reducer between the wheel and the drive motor in order to obtain the output torque required by the vehicle. The technique estimates the wheel speed by multiplying the rotation speed of the drive motor, which is detected by the resolver, by the reduction ratio due to the speed reducer.

Between the drive motor and the wheel, a difference arises in the number of rotations corresponding to the reduction ratio. In general, a magnetoresistive element (MR element) is used as a wheel speed sensor; the resolution of the wheel speed sensor is lower than that of a resolver. Increasing the resolution of the wheel speed sensor may pose issues such as an increase in manufacturing cost, or an increase in sensor size.

It is thus desired to provide a control apparatus and a vehicle drive system which can control a rotating electrical machine, without need of making a wheel speed sensor into high resolution.

Embodiments of the present disclosure described herein are set forth in the following clauses.

According to an embodiment of the present disclosure, a control apparatus is provided as follows. The control apparatus is applied to a vehicle including (i) a rotating electrical machine functioning as a vehicle traveling drive source and (ii) a wheel speed sensor detecting a wheel speed. The rotating electrical machine includes (i) a slotless stator containing a stator winding without slots formed by magnetic teeth, and (ii) a rotor containing a magnet unit. The control apparatus includes an electronic control circuit and a drive controller. The electronic control circuit sets a rotation angle of the rotating electrical machine based on an estimated value of the rotation angle which is estimated based on a detection value of the wheel speed sensor. The drive controller controls a drive of the rotating electrical machine based on the rotation angle set by the electronic control circuit.

This control apparatus may be applied to a vehicle equipped with a slotless rotating electrical machine. The rotating electrical machine can provide the maximum torque which is increased because there is no magnetic saturation at the teeth. That is, the torque is increased highly. Therefore, the speed reducer is not disposed between the rotating electrical machine and the wheel; alternatively, even if a speed reducer is disposed, the reduction ratio is less than that of a conventional one. As a result, the difference in the rotation speed between the wheel and the rotating electrical machine disappears or becomes less than in a known art. Therefore, even if the wheel speed sensor does not have high resolution, it is possible to estimate the rotation angle based on the output of the wheel speed sensor and to thereby control the rotating electrical machine.

According to another embodiment of the present disclosure, a vehicle drive system is provided as follows. The vehicle drive system is applied to a vehicle including a wheel speed sensor to detect a wheel speed. The vehicle drive system includes a rotating electrical machine and a control apparatus. The rotating electrical machine includes (i) a slotless stator having a stator winding and not having slots formed by magnetic teeth, and (ii) a rotor having a magnet unit. The control apparatus includes (i) an electronic control circuit configured to set a rotation angle of the rotating electrical machine based on an estimated value of the rotation angle which is estimated based on a detection value of the wheel speed sensor, and (ii) a drive controller configured to control a drive of the rotating electrical machine based on the rotation angle set by the electronic control circuit.

This vehicle drive system includes the rotating electrical machine with a slotless structure. Since there is no magnetic saturation at the teeth of the magnetic body, the maximum torque of the rotating electrical machine can be increased. This enables the increase of the torque of the rotating electrical machine. By using such a rotating electrical machine, the speed reducer needs not to be disposed between the rotating electrical machine and the wheel, or the reduction ratio is allowed to be less than that of a related art even if the speed reducer is disposed. As a result, the difference in the rotation speed between the wheels and the rotating electrical machine disappears or becomes less than in a known art. Therefore, even if the wheel speed sensor does not have high resolution, it is possible to estimate the rotation angle based on the output of the wheel speed sensor and to control the rotating electrical machine.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A control apparatus applied to a vehicle including (i) a rotating electrical machine functioning as a vehicle traveling drive source and (ii) a wheel speed sensor detecting a wheel speed, the rotating electrical machine including (i) a slotless stator containing a stator winding without slots by magnetic teeth, and (ii) a rotor containing a magnet unit,
the control apparatus comprising:
a setting circuit configured to set a rotation angle of the rotating electrical machine based on an estimated value of the rotation angle which is estimated based on a detection value of the wheel speed sensor; and
a drive controller configured to control a drive of the rotating electrical machine based on the rotation angle set by the setting circuit.

2. The control apparatus according to claim 1, wherein the rotating electrical machine included in the vehicle has a sensorless structure without a rotation angle sensor.

3. The control apparatus according to claim 1, wherein a speed reducer is not disposed between the rotating electrical machine and a wheel of the vehicle such that the rotating electric machine and the wheel rotate at substantially the same speed.

4. The control apparatus according to claim 1, wherein the wheel speed sensor includes a magnetoresistive element.

5. A control apparatus applied to a vehicle including (i) a rotating electrical machine functioning as a vehicle traveling drive source and (ii) a wheel speed sensor detecting a wheel speed, the rotating electrical machine including (i) a slotless stator containing a stator winding without slots by magnetic teeth and (ii) a rotor containing a magnet unit,
the control apparatus comprising:
a setting circuit configured to set a rotation angle of the rotating electrical machine based on an estimated value of the rotation angle which is estimated based on a detection value of the wheel speed sensor; and
a drive controller configured to control a drive of the rotating electrical machine based on the rotation angle set by the setting circuit, wherein
the rotating electrical machine is configured to satisfy at least one condition selected from a first condition, a second condition, a third condition, a fourth condition, and a fifth condition,
the first condition being that the rotor in the rotating electrical machine is an SPM (Surface Permanent Magnetic) type in which the magnet unit is disposed on a surface of the rotor,
the second condition being that (i) the magnet unit in the rotating electrical machine includes a first magnetic and a second magnetic that are polar anisotropic magnet, and (ii) the first magnet and the second magnet having mutually different magnetic poles from each other are alternately arranged in a circumferential direction of the rotating electrical machine,
the third condition being that the stator winding in the rotating electrical machine includes a conductor having a cross-section where a length in a radial direction of the rotating electrical machine is less than a length in the circumferential direction,
the fourth condition being that a magnetic flux density distribution of the magnetic unit in the rotating electrical machine has a sine wave matching rate being 40% or more,
the fifth condition being that the stator winding in the rotating electrical machine includes a conductor being formed by including a plurality of wires that are gathered.

6. The control apparatus according to claim 5, wherein the rotating electrical machine included in the vehicle has a sensorless structure without a rotation angle sensor.

7. A control apparatus applied to a vehicle including (i) a rotating electrical machine functioning as a vehicle traveling drive source and (ii) a wheel speed sensor detecting a wheel speed, the rotating electrical machine including (i) a slotless stator containing a stator winding without slots by magnetic teeth and (ii) a rotor containing a magnet unit,
the control apparatus comprising:
a setting circuit configured to set a rotation angle of the rotating electrical machine based on an estimated value of the rotation angle which is estimated based on a detection value of the wheel speed sensor;
a drive controller configured to control a drive of the rotating electrical machine based on the rotation angle set by the setting circuit; and
a process execution circuit configured to execute a predetermined process,
wherein:
the rotating electrical machine includes a rotation angle sensor configured to detect a rotation angle of the rotating electrical machine;
the setting circuit is configured to
(i) provide an estimate value of a wheel speed which is estimated based on a detection value of the rotation angle sensor,
(ii) detect that an abnormality occurs in either the wheel speed sensor or the rotation angle sensor, based on a detection value of the wheel speed sensor and the detection value of the rotation angle sensor,
(iii) set the rotation angle based on the detection value of the rotation angle sensor when the rotation angle sensor is normal, whereas setting the rotation angle based on the estimated value of the rotation angle which is estimated based on the detection value of the wheel speed sensor when the rotation angle sensor is abnormal, and
(iv) set the wheel speed based on the detection value of the wheel speed sensor when the wheel speed sensor is normal, whereas setting the wheel speed based on the estimated value of the wheel speed which is estimated based on the detection value of the rotation angle sensor when the wheel speed sensor is abnormal; and
the process execution circuit is configured to execute the predetermined process based on the wheel speed set by the setting circuit.

8. The control apparatus according to claim 7, wherein:
the process execution circuit includes a command generation circuit configured to generate a torque command to the rotating electrical machine;
the drive controller controls the drive of the rotating electrical machine based on the torque command and the detection value of the rotation angle sensor when the rotation angle sensor is normal, whereas the drive controller controls the drive of the rotating electrical machine based on the torque command and the estimated value of the rotation angle which is estimated based on the detection value of the wheel speed sensor when the rotation angle sensor is abnormal; and
the command generation circuit generates the torque command based on the detection value of the wheel speed sensor when the wheel speed sensor is normal, whereas the command generation circuit generates the torque command based on the estimated value of the wheel speed which is estimated based on the detection value of the rotation angle sensor when the wheel speed sensor is abnormal.

9. The control apparatus according to claim 7, wherein:
any one condition of first to third conditions is satisfied,
the first condition being that a plurality of the wheel speed sensors are included,
the second condition being that a plurality of the rotation angle sensors are included,
the third condition being that a plurality of the wheel speed sensors and a plurality of the rotation angle sensors are included; and
the setting circuit is configured to detect that an abnormality occurs in either the wheel speed sensor or the rotation angle sensor based on the detection value of the wheel speed sensor and the detection value of the rotation angle sensor.

10. The control apparatus according to claim 7, wherein the setting circuit is configured to detect that an abnormality occurs in either the wheel speed sensor or the rotation angle sensor based on turning information of the vehicle.

11. A control apparatus applied to a vehicle including (i) a rotating electrical machine functioning as a vehicle traveling drive source and (ii) a wheel speed sensor detecting a wheel speed, the rotating electrical machine including (i) a slotless stator containing a stator winding without slots by magnetic teeth and (ii) a rotor containing a magnet unit,
the control apparatus comprising:
a setting circuit configured to set a rotation angle of the rotating electrical machine based on an estimated value of the rotation angle which is estimated based on a detection value of the wheel speed sensor;
a drive controller configured to control a drive of the rotating electrical machine based on the rotation angle set by the setting circuit;
an induced voltage detector configured to detect an induced voltage generated in the stator winding; and
a rotation angle detector configured to detect a rotation angle of the rotating electrical machine based on the induced voltage,
wherein:
the rotating electrical machine included in the vehicle has a sensorless structure without a rotation angle sensor, and
the setting circuit is further configured to
(i) synchronize a detection value of the rotation angle detector with an estimated value of the rotation angle which is estimated based on the detection value of the wheel speed sensor while the vehicle is traveling,
(ii) set, as a stop angle, the estimated value of the rotation angle which is estimated based on the detection value of the wheel speed sensor when the vehicle is stopped, the stop angle being the rotation angle during stop of the vehicle, and
(iii) set the rotation angle based on the detection value of the rotation angle detector after activation of the rotating electrical machine.

12. The control apparatus according to claim 11, wherein:
the setting circuit is further configured to
(i) estimate the wheel speed based on the detection value of the rotation angle detector,
(ii) detect an abnormality of the wheel speed sensor based on the detection value of the rotation angle detector,
(iii) set the wheel speed based on the detection value of the wheel speed sensor when the wheel speed sensor is normal, and
(iv) set the wheel speed based on the estimated value of the wheel speed which is estimated based on the detection value of the rotation angle detector when the wheel speed sensor is abnormal.

13. A vehicle drive system applied to a vehicle including a wheel speed sensor to detect a wheel speed,
the vehicle drive system comprising:
a rotating electrical machine including (i) a slotless stator having a stator winding and not having slots formed by magnetic teeth, and (ii) a rotor having a magnet unit; and
a control apparatus including
(i) an electronic control circuit configured to set a rotation angle of the rotating electrical machine based on an estimated value of the rotation angle which is estimated based on a detection value of the wheel speed sensor; and
(ii) a drive controller configured to control a drive of the rotating electrical machine based on the rotation angle set by the electronic control circuit, wherein
the rotating electrical machine is configured to satisfy at least one condition selected from a first condition, a second condition, a third condition, a fourth condition, and a fifth condition,
the first condition being, that the rotor in the rotating electrical machine is an SPM (Surface Permanent Magnetic) type in which the magnet unit is disposed on a surface of the rotor,
the second condition being that (i) the magnet unit in the rotating electrical machine includes a first magnetic and a second magnetic that are polar anisotropic magnet, and (ii) the first magnet and the second magnet having mutually different magnetic poles from each other are alternately arranged in a circumferential direction of the rotating electrical machine,
the third condition being that the stator winding in the rotating electrical machine includes a conductor having a cross-section where a length in a radial direction of the rotating electrical machine is less than a length in the circumferential direction,
the fourth condition being that a magnetic flux density distribution of the magnet unit in the rotating electrical machine has a sine wave matching rate being 40% or more, the fifth condition being that the stator winding in the rotating electrical machine includes a conductor being formed by including a plurality of wires that are gathered.

14. A control apparatus applied to a vehicle including (i) a rotating electrical machine functioning as a vehicle traveling drive source and (ii) a wheel speed sensor detecting a wheel speed, the rotating electrical machine including (i) a slotless stator containing a stator winding without slots by magnetic teeth; and (ii) a rotor containing a magnet unit, the control apparatus comprising:

an electronic control circuit configured to set a rotation angle of the rotating electrical machine based on an estimated value of the rotation angle which is estimated based on a detection value of the wheel speed sensor; and a drive controller configured to control a drive of the rotating electrical machine based on the rotation angle set by the electronic control circuit, wherein the rotating electrical machine is configured to satisfy at least one condition selected from a first condition, a second condition, a third condition, a fourth condition, and a fifth condition, the first condition being that the rotor in the rotating electrical machine is an SPM (Surface Permanent Magnetic) type in which the magnet unit is disposed on a surface of the rotor, the second condition being that (i) the magnet unit in the rotating electrical machine includes a first magnetic and a second magnetic that are polar anisotropic magnet, and (ii) the first magnet and the second magnet having mutually different magnetic poles from each other are alternately arranged in a circumferential direction of the rotating electrical machine, the third condition being that the stator winding in the rotating electrical machine includes a conductor having a cross-section where a length in a radial direction of the rotating electrical machine is less than a length in the circumferential direction, the fourth condition being that a magnetic flux density distribution of the magnet unit in the rotating electrical machine has a sine wave matching rate being 40% or more, the fifth condition being that the stator winding in the rotating electrical machine includes a conductor being formed by including a plurality of wires that are gathered.

* * * * *